United States Patent
Barto et al.

(10) Patent No.: US 7,127,310 B1
(45) Date of Patent: Oct. 24, 2006

(54) METHOD AND APPARATUS FOR DETERMINING COST FUNCTIONS USING PARAMETERIZED COMPONENTS

(75) Inventors: Larry D. Barto, Austin, TX (US); Yiwei Li, Austin, TX (US); Steven C. Nettles, Johnson City, TX (US); H. Van Dyke Parunak, Ann Arbor, MI (US)

(73) Assignee: Advanced Micro Devices, Inc., Austin, TX (US)

( * ) Notice: Subject to any disclaimer, the term of this patent is extended or adjusted under 35 U.S.C. 154(b) by 415 days.

(21) Appl. No.: 10/231,849

(22) Filed: Aug. 30, 2002

(51) Int. Cl.
*G06F 19/00* (2006.01)
(52) U.S. Cl. .......................... 700/100; 700/121; 705/9
(58) Field of Classification Search ................ 700/28, 700/36, 95, 96, 99–104, 121; 705/9
See application file for complete search history.

(56) References Cited

U.S. PATENT DOCUMENTS

| | | | |
|---|---|---|---|
| 4,796,194 A | 1/1989 | Atherton ..................... 364/468 |
| 4,912,624 A * | 3/1990 | Harth et al. .................. 700/36 |
| 5,093,794 A * | 3/1992 | Howie et al. ............... 700/100 |
| 5,369,570 A | 11/1994 | Parad .......................... 364/401 |
| 5,375,061 A | 12/1994 | Hara et al. .................. 364/468 |
| 5,444,632 A | 8/1995 | Kline et al. ................. 700/100 |
| 5,446,671 A | 8/1995 | Weaver et al. ............. 700/100 |
| 5,548,535 A | 8/1996 | Zvonar ........................ 702/81 |
| 5,586,021 A | 12/1996 | Fargher et al. ............. 700/100 |
| 5,835,688 A | 11/1998 | Fromherz .................. 358/1.13 |
| 5,890,134 A | 3/1999 | Fox ................................ 705/9 |
| 5,953,229 A * | 9/1999 | Clark et al. ................. 700/100 |
| 5,963,911 A * | 10/1999 | Walker et al. ................. 705/7 |
| 6,038,539 A | 3/2000 | Maruyama et al. ............ 705/8 |
| 6,088,626 A | 7/2000 | Lilly et al. .................. 700/100 |
| 6,091,998 A | 7/2000 | Vasko et al. ................ 700/100 |
| 6,128,542 A | 10/2000 | Kristoff et al. ............... 700/97 |
| 6,148,239 A | 11/2000 | Funk et al. ..................... 700/1 |
| 6,202,062 B1 | 3/2001 | Cameron et al. .............. 707/3 |
| 6,263,255 B1 | 7/2001 | Tan et al. .................... 700/121 |
| 6,356,797 B1 | 3/2002 | Hsieh et al. ................ 700/101 |
| 6,374,144 B1 | 4/2002 | Viviani et al. ................ 700/12 |
| 6,400,999 B1 | 6/2002 | Kashiyama et al. ........ 700/100 |
| 6,434,443 B1 | 8/2002 | Lin ............................. 700/100 |
| 6,584,369 B1 * | 6/2003 | Patel et al. .................. 700/100 |
| 6,662,063 B1 * | 12/2003 | Hunter et al. ............... 700/100 |

OTHER PUBLICATIONS

U.S. Appl. No. 10/331,715, filed Dec. 30, 2002, Nettles et al.
U.S. Appl. No. 10/331,598, filed Dec. 30, 2002, Barto et al.
U.S. Appl. No. 10/331,596, filed Dec. 30, 2002, Barto et al.

(Continued)

*Primary Examiner*—Paul Rodriguez
(74) *Attorney, Agent, or Firm*—Williams, Morgan & Amerson, P.C.

(57) ABSTRACT

A method for generating a cost function includes providing a resource for processing a workpiece. A plurality of cost function parameters is provided. A library of parameterized cost function components is acessed based on the plurality of cost function parameters to generate a cost function for processing the workpiece using the resource. A system includes a resource for processing a workpiece and at least one scheduling agent. The scheduling agent is configured to provide a plurality of cost function parameters and access a library of parameterized cost function components based on the plurality of cost function parameters to generate a cost function for processing the workpiece using the resource.

16 Claims, 18 Drawing Sheets

OTHER PUBLICATIONS

U.S. Appl. No. 10/284,705, filed Oct. 31, 2002, Nettles et al.
U.S. Appl. No. 10/233,197, filed Aug. 30, 2002, Barto et al.
U.S. Appl. No. 10/232,145, filed Aug. 30, 2002, Barto et al.
U.S. Appl. No. 10/231,930, filed Aug. 30, 2002, Barto et al.
U.S. Appl. No. 10/231,888, filed Aug. 30, 2002, Barto et al.
U.S. Appl. No. 10/231,648, filed Aug. 30, 2002, Barto et al.
U.S. Appl. No. 10/231,561, filed Aug. 30, 2002, Barto et al.
U.S. Appl. No. 10/190,194, filed Jul. 3, 2002, Li et al.
U.S. Appl. No. 10/160,990, filed May 31, 2002, Mata et al.
U.S. Appl. No. 10/160,956, filed May 31, 2002, Li et al.
U.S. Appl. No. 10/135,145, filed Apr. 30, 2002, Mata et al.
Resende, "Shop Floor Scheduling of Semiconductor Wafer Manufacturing," *University of California*, Berkeley (1987).
Glassey et al., "Closed-Loop Job Release Control for VLSI Circuit Manufacturing," *IEEE Transactions on Semiconductor Manufacturing* 1:36-46 (1988).
"Agent-Enhanced Manufacturing System Initiative," *Technologies for the Integration of Manufacturing Applications (TIMA)* (Oct. 1997).
"Factory Integration," *The National Technology Roadmap for Semiconductors: Technology Needs* (1997).
SALSA Enhancements for next Swarm Release (Apr. 22, 1999).
SALSA Exceptions—Minutes from May 11, 1999.
Starvation Avoidance Lot Start Agent (SALSA) (Overview: May 15, 1999).
Starvation Avoidance Lot Start Agent, *Fab25 AEMSI/SALSA Review Meeting* (May 26, 1999).
Starvation Avoidance Lot Start Agent, *Iteration 1 Requirements Kickoff* (May 3, 1999).
Van Parunak, "Review of Axtell and Epstein" (Jun. 23, 1999).
Baumgärtel et al., "Combining Multi-Agent Systems and Constraint Techniques in Production Logistics" (1996).
Bonvik et al., "Improving a Kanban Controlled Production Line Through Rapid Information Dissemination" (Jul. 10, 1995).
Hynynen, "BOSS: An Artificially Intelligent System for Distributed Factory Scheduling," *Computer Applications in Production and Engineering*, pp. 667-677 (1989).
Li et al., "Minimum Inventory Variability Schedule with Applications in Semiconductor Fabrications," *IEEE Transactions on Semiconductor Manufactuing* 9:145-149 (1996).
Lin et al., "Integrated Shop Floor Control Using Autonomous Agents," *IIE Transactions* 24:57-71 (1992).
Lu et al., "Efficient Scheduling Policies to Reduce Mean and Variance of Cycle-Time in Semiconductor Manufacturing Plants," *IEEE Transactions Semiconductor Manufacturing* 7:374-388 (1994).
Martin-Vega et al., "Applying Just-In-Time in a Wafer Fab: A Case Study," *IEEE Transactions on Semiconductor Manufacturing* 2:16-22 (1989).
Van Parunak et al., "Agents Do It In Time—Experiences with Agent-Based Manufacturing Scheduling" (1999).
Hollister, "Schedule Paper #17 Summary" (Jun. 23, 1999).
Hollister, "Schedule Paper #19 Summary" (Jun. 23, 1999).
Hollister, "Schedule Paper #23 Summary" (Jun. 23, 1999).
Hollister, "Schedule Paper #32 Summary" (Jun. 23, 1999).
Vaario et al., "An Emergent Modelling Method for Dynamic Scheduling," *Journal of Intelligent Manufacturing* 9:129-140 (1998).
Wellman et al., "Auction Protocols for Decentralized Scheduling" (May 22, 1998).
Weber, "Material Traceability—The Missing Link in TAP Systems," *Test, Assembly and Packaging Automation and Integration '99 Conference*.
"ObjectSpace Fab Solutions Semiconductor Product Development Overview" (presented at SEMICON Southwest 1998).
"Agent Enhanced Manufacturing Systems Initiative (AEMSI) project" (presented by Dan Radin, ERIM CEC Nov. 12-13, 1998).
Weber, "APC Framework: Raising the Standard for Fab Automation and Integration," *Equipment Automation Conference 1st European Symposium on Semiconductor Manufacturing* (Apr. 14, 1999).
Wein, "Scheduling Semiconductor Wafer Fabrication," *IEEE Transactions on Semiconductor Manufacturing* 1:115-130 (1988).
Bonvik, "Performance Analysis of Manufacturing Systems Under Hybrid Control Policies" (Sep. 22, 1995).
Bonvik, "Performance Analysis of Manufacturing Systems Under Hybrid Control Policies" (Oct. 3, 1995).
Sikora et al., "Coordination Mechanisms for Multi-Agent Manufacturing Systems: Applications to Integrated Manufacturing Scheduling," *IEEE Transactions on Engineering Management* 44:175-187 (1997).
Sousa et al., "A Dynamic Scheduling Holon for Manufacturing Orders," *Journal of Intelligent Manufacturing* 9:107-112 (1998).
Upton et al., "Architectures and Auctions in Manufacturing," *Int. J. Computer Integrated Manufacturing* 4:23-33 (1991).
Gere, "Heuristics in Job Shop Scheduling," *Management Science* 13:167-190 (1966).
Ehteshami et al., "Trade-Offs in Cycle Time Management: Hot Lots," *IEEE Transactions on Semiconductor Manufacturing* 5:101-106 (1992).
Axtell et al., "Distributed Computation of Economic Equilibria via Bilateral Exchange" (Mar. 1997).
International Search Report dated Sep. 30, 2003 (PCT/US02/41777; TT4739-PCT).
Ehteshami et al., "Trade-Offs in Cycle Time Management: Hot Lots", IEEE Transactions on Semiconductor Manufacturing, vol. 5, No. 2, May 1992.
Burke et al., "The Distributed Asynchronous Scheduler," pp. 309-339 (1994).
Butler et al., "ADDYMS: Architecture for Distributed Dynamic Manufacturing Scheduling," pp. 199-213 (1996).
Fordyce et al., "Integrating Decision Technologies for Dispatch Scheduling in Semiconductor Manufacturing," *Logistics Management System (LMS)*, pp. 473-156 (1994).
Juba et al., "Production Improvements Using a Forward Scheduler" (1995).
Murthy et al., "Agent Based Cooperative Scheduling," pp. 112-117 (1997).
Ramos et al., "Scheduling Manufacturing Tasks Considering Due Dates: A New Method Based on Behaviours and Agendas" (1995).
Shen et al., "An Agent-Based Approach for Dynamic Manufacturing Scheduling" (1998).
Fordyce et al., "Logistics Management System (LMS): An Advanced Decision Support System for the Fourth Decision Tier-Dispatch or Short Interval Scheduling,", pp. 1-58 (1994).

* cited by examiner

METHOD AND APPARATUS FOR DETERMINING COST FUNCTIONS USING PARAMETERIZED COMPONENTS

The United States Government has a paid-up license in this invention and the right in limited circumstances to require the patent owner to license others on reasonable terms as provided for by the terms of Cooperative Agreement No. 70NANB7H3041 awarded by the United States Department of Commerce, National Institute of Standards and Technology ("NIST"), Advanced Technology Program ("ATP").

BACKGROUND OF THE INVENTION

1. Field of the Invention

This invention pertains to automated manufacturing environments, such as semiconductor manufacturing, and, more particularly, to a method and apparatus for determining cost functions using parameterized components.

2. Description of the Related Art

Growing technological requirements and the worldwide acceptance of sophisticated electronic devices have created an unprecedented demand for large-scale, complex, integrated circuits. Competition in the semiconductor industry requires that products be designed, manufactured, and marketed in the most efficient manner possible. This requires improvements in fabrication technology to keep pace with the rapid improvements in the electronics industry. Meeting these demands spawns many technological advances in materials and processing equipment and significantly increases the number of integrated circuit designs. These improvements also require effective utilization of computing resources and other highly sophisticated equipment to aid, not only design and fabrication, but also the scheduling, control, and automation of the manufacturing process.

Turning first to fabrication, integrated circuits, or microchips, are manufactured from modern semiconductor devices containing numerous structures or features, typically the size of a few micrometers. The features are placed in localized areas of a semiconducting substrate, and are either conductive, non-conductive, or semi-conductive (i.e., rendered conductive in defined areas with dopants). The fabrication process generally involves processing a number of wafers through a series of fabrication tools. Each fabrication tool performs one or more of four basic operations discussed more fully below. The four basic operations are performed in accordance with an overall process to finally produce the finished semiconductor devices.

Integrated circuits are manufactured from wafers of a semiconducting substrate material. Layers of materials are added, removed, and/or treated during fabrication to create the integrated, electrical circuits that make up the device. The fabrication essentially comprises the following four basic operations:

layering, or adding thin layers of various materials to a wafer from which a semiconductor is produced;
 patterning, or removing selected portions of added layers;
 doping, or placing specific amounts of dopants in selected portions of the wafer through openings in the added layers; and
 heat treating, or heating and cooling the materials to produce desired effects in the processed wafer.

Although there are only four basic operations, they can be combined in hundreds of different ways, depending upon the particular fabrication process. See, e.g., Peter Van Zant, *Microchip Fabrication A Practical Guide to Semiconductor Processing* (3d Ed. 1997 McGraw-Hill Companies, Inc.) (ISBN 0-07-067250-4).

Efficient management of a facility for manufacturing products, such as semiconductor chips, requires monitoring of various aspects of the manufacturing process. For example, it is typically desirable to track the amount of raw materials on hand, the status of work-in-process and the status and availability of machines and tools at every step in the process. One of the most important decisions in controlling the manufacturing process is selecting which lot should run on each process tool at any given time. Additionally, most machines used in the manufacturing process require scheduling of routine preventative maintenance (PM) procedures and equipment qualification (Qual) procedures, as well as other diagnostic and reconditioning procedures that must be performed on a regular basis, such that the performance of the procedures does not impede the manufacturing process itself.

One approach to this issue implements an automated "Manufacturing Execution System" (MES). An automated MES enables a user to view and manipulate, to a limited extent, the status of machines and tools, or "entities," in a manufacturing environment. In addition, an MES enables the dispatching and tracking of lots or work-in-process through the manufacturing process to enable resources to be managed in the most efficient manner. Specifically, in response to MES prompts, a user inputs requested information regarding work-in-process and entity status. For example, when a user performs a PM on a particular entity, the operator logs the performance of the PM (an "event") into an MES screen to update the information stored in the database with respect to the status of that entity. Alternatively, if an entity is to be taken down for repair or maintenance, the operator logs this information into the MES database, which then prevents use of the entity until it is subsequently logged back up to a production ready state.

Although MES systems are sufficient for tracking lots and machines, such systems suffer several deficiencies, the most obvious of which are their passive nature, lack of advance scheduling, and inability to support highly automated factory operations. Current MES systems largely depend on manufacturing personnel for monitoring factory state and initiating activities at the correct time. For example, a lot does not begin processing until a wafer fab technician (WFT) issues the appropriate MES command. And, prior to processing, a WFT must issue an MES command to retrieve the lot from the automated material handling system (AMHS) with sufficient advance planning that the lot is available at the process tool when the process tool becomes available. If the WFT does not retrieve the lot soon enough, or neglects to initiate processing at the earliest available time, the process tool becomes idle and production is adversely impacted.

These types of deficiencies in the typical automated MES emphasize the importance of the wafer fabrication technician (WFT) in the efficient operation of the manufacturing process. WFTs perform many vital functions. For instance, WFTs initiate dispatching, transport, and processing as their attention and time permits. They make scheduling decisions such as whether to run an incomplete lot, as opposed to waiting for approaching lots, or performing PM or qualification instead of processing lots. However, the presence of WFTs also inevitably introduces some inefficiencies. Typically, there may be a significant difference between the performance of the best WFT and the performance of the worst WFT. A WFT typically simultaneously monitors the processing of many tools, making it difficult to focus on an individual lot or tool. Furthermore, the size and complexity of the modern fabrication process flows makes it exceedingly difficult for a WFT to foresee and prevent downstream bottlenecks or shortages arising from upstream bottlenecks. Shift changes, rest breaks, and days off for the WFT also create inefficiencies or downtime that adversely impact the manufacturing process flow. Just as the importance of the WFT is magnified by the deficiencies of the automated MES, so are the inefficiencies of the WFT magnified by his importance.

Thus, factory control systems utilized in today's wafer fabs are passive and do not enable a high degree of automation. These systems are very dependent on wafer fab technicians and other factory staff to monitor the state of the factory, to instantaneously react to constant change, to make rapid logistical decisions and to initiate and coordinate factory control activity in a timely manner. These wafer fab technicians are agents, providing the active "glue" that is lacking in factory control systems. As a result, factory effectiveness in the highly competitive semiconductor industry is quite dependent on the availability, productivity, skill level and consistency of these human agents. Wafer fab technicians must monitor and operate a number of tools located in various bays in a fab. They are forced to multiplex across tools, bays, material handling systems and a variety of factory control systems. As a fab's production ramps and more complex processes are introduced, it is difficult to achieve the scalability required to meet the increased complexity. Wafer fab tech visibility of upstream and downstream operations, tool state, work-in-process and resource availability is limited.

However, key logistical decisions are frequently based on this limited and dated information, which is only partially provided by factory control systems. Wafer fab techs spend an inordinate amount of time interacting with systems, performing non-value added functions. Shift changes disrupt the operation of the fab as the technicians are temporarily unable to provide required monitoring and coordination. Despite the best efforts of the technicians, utilization of tools suffers, adversely impacting other key factory metrics including cycle time, inventory levels, factory output and mix. With the need for intrabay material handling to transport 12-inch wafers in new 300 mm wafer fabs, significant additional complexity is introduced. Factory control systems are not capable of providing this level of detailed scheduling and execution control.

The present invention is directed to overcoming, or at least reducing the effects of, one or more of the problems set forth above.

SUMMARY OF THE INVENTION

One aspect of the present invention is seen in a method for generating a cost function. The method includes providing a resource for processing a workpiece. A plurality of cost function parameters is provided. A library of parameterized cost function components is acessed based on the plurality of cost function parameters to generate a cost function for processing the workpiece using the resource.

Another aspect of the present invention is seen in a system including a resource for processing a workpiece and at least one scheduling agent. The scheduling agent is configured to provide a plurality of cost function parameters and access a library of parameterized cost function components based on the plurality of cost function parameters to generate a cost function for processing the workpiece using the resource.

BRIEF DESCRIPTION OF THE DRAWINGS

The invention may be understood by reference to the following description taken in conjunction with the accompanying drawings, in which like reference numerals identify like elements, and in which.

Figure 1:
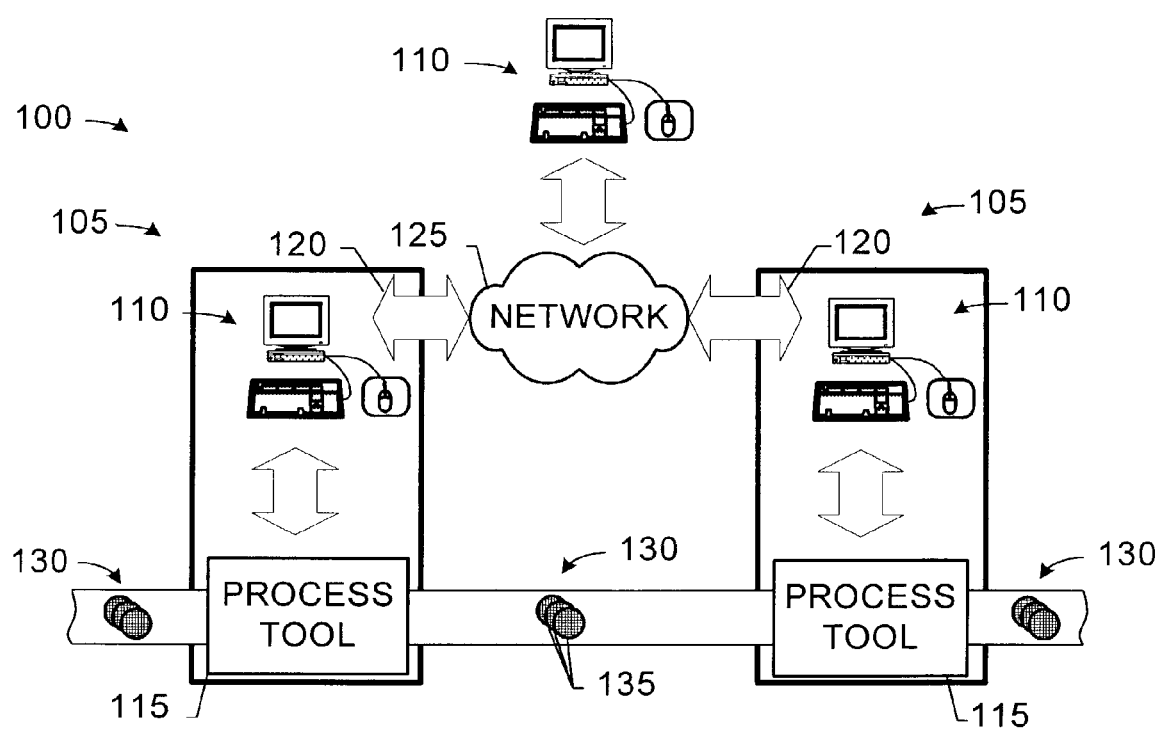
FIG. 1 is a diagram of a portion of one particular embodiment of a process flow constructed and operated in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which may vary from one implementation to another. Moreover, it will be appreciated that such a development effort might be complex and time-consuming, but would nevertheless be a routine undertaking for those of ordinary skill in the art having the benefit of this disclosure.

FIG. 1 conceptually illustrates a portion of one particular embodiment of a process flow 100 constructed and operated in accordance with the present invention. The process flow 100 fabricates semiconductor devices. However, the invention may be applied to other types of manufacturing processes. Thus, in the process flow 100 discussed above, the lots 130 of wafers 135 may more generically referred to as "workpieces." The term workpiece may refer to one wafer or one lot of wafers. The process tools 115 and any process-operation performed thereon need not necessarily be related to the manufacture of semiconductor devices in all embodiments. However, for the sake of clarity and to further an understanding of the invention, the terminology pertaining to semiconductor fabrication shall be retained in disclosing the invention in the context of the illustrated embodiments.

The illustrated portion of the process flow 100 includes two stations 105, each station 105 including a computing device 110 communicating with a process tool 115. The stations 105 communicate with one another over communications links 120. In the illustrated embodiment, the computing devices 110 and the communications links 120 comprise a portion of a larger computing system, e.g., a network 125. The process tools 115 are shown in FIG. 1 processing lots 130 of wafers 135 that will eventually become integrated circuit devices. The process tool 115 may be adapted to process more than one of lots 130 simultaneously. Such a process tool 115 is referred to as a batching tool.

Figure 2:
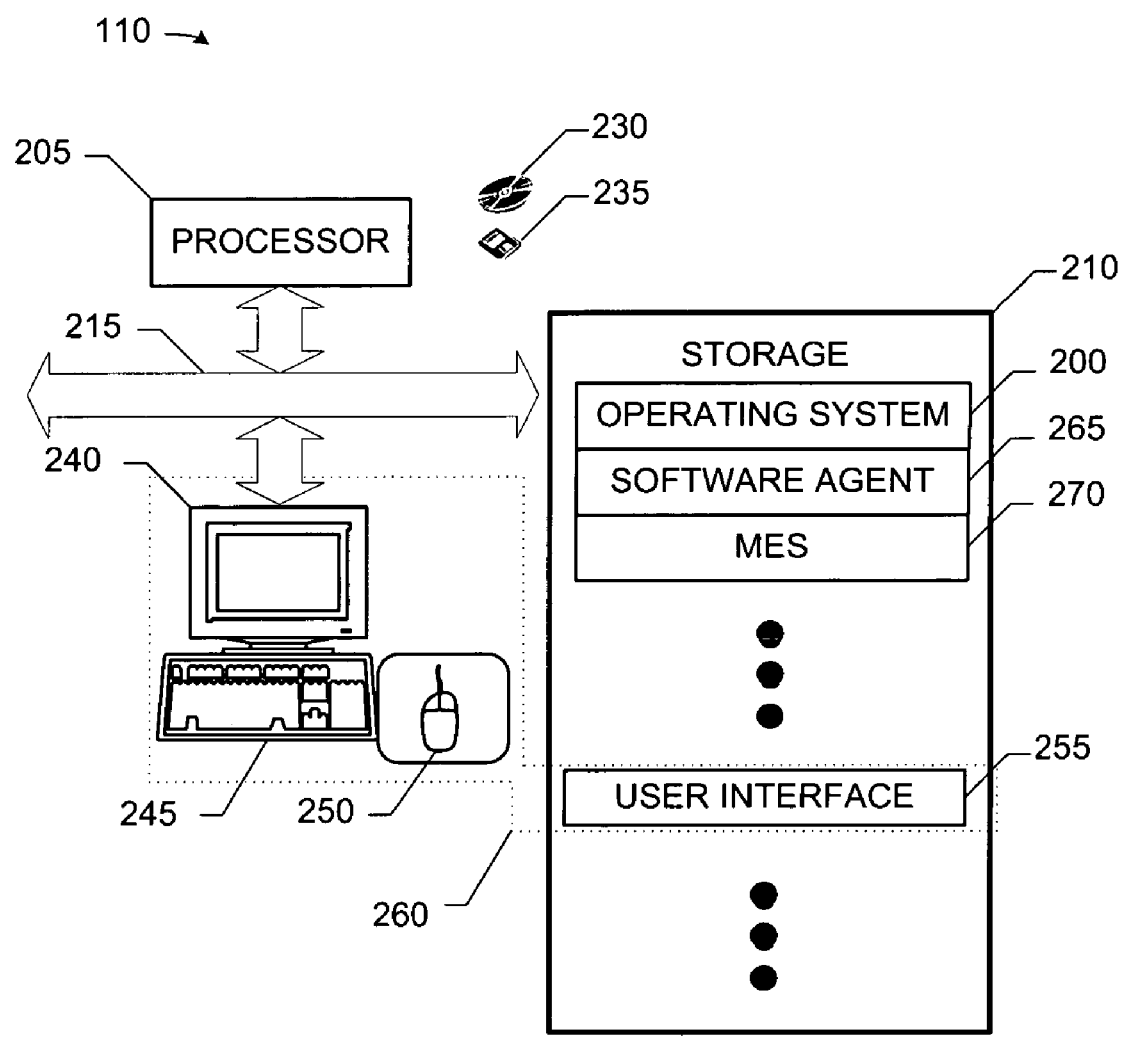
FIG. 2 is a partial block diagram illustrating selected portions of the hardware and software architectures of the computing devices in FIG. 1.

FIG. 2 depicts selected portions of the hardware and software architectures, respectively, of the computing devices 110 programmed and operated in accordance with the present invention. Some aspects of the hardware and software architecture (e.g., the individual cards, the basic input/output system (BIOS), input/output drivers, etc.) are not shown. These aspects are omitted for the sake of clarity, and so as not to obscure the present invention. As will be appreciated by those of ordinary skill in the art having the benefit of this disclosure, however, the software and hardware architectures of the computing devices 110 may include many such routine features.

In the illustrated embodiment, the computing device 110 is a workstation, employing a UNIX-based operating system 200, but the invention is not so limited. The computing device 110 may be implemented in virtually any type of electronic computing device such as a notebook computer, a desktop computer, a mini-computer, a mainframe computer, or a supercomputer. The computing device 110 may even be, in some alternative embodiments, a processor or controller embedded in the process tool 115. The invention also is not limited to UNIX-based operating systems. Alternative operating systems (e.g., Windows™-based or disk operating system (DOS)-based) may also be employed. The invention is not limited by the particular implementation of the computing device 110.

The computing device 110 also includes a processor 205 communicating with storage 210 over a bus system 215. The storage 210 typically includes at least a hard disk (not shown) and random access memory (RAM) (not shown). The computing device 110 may also, in some embodiments, include removable storage such as an optical disk 230, a floppy electromagnetic disk 235, or some other form, such as a magnetic tape (not shown) or a zip disk (not shown). The computing device 110 includes a monitor 240, keyboard 245, and a mouse 250, which together, along with their associated user interface software 255 comprise a user interface 260. The user interface 260 in the illustrated embodiment is a graphical user interface (GUI), although this is not necessary to the practice of the invention.

The processor 205 may be any suitable processor known to the art. For instance, the processor may be a general purpose microprocessor or a digital signal processor (DSP). In the illustrated embodiment, the processor 205 is an Athlon™ 32-bit processor commercially available from Advanced Micro Devices, Inc. (AMD), but the invention is not so limited. The 64-bit UltraSPARC™ or the 32-bit microSPARC™ from Sun Microsystems, or any of the Itanium™, Pentium™, or Alpha™-class processors from Intel Corporation might alternatively be employed.

Each computing device 110 includes, in the illustrated embodiment, a software agent 265 residing in the storage 210. Note that the software agents 265 may reside in the process flow 100 in places other than the computing devices 110. The situs of the software agent 265 is not material to the practice of the invention. Note also that, since the situs of the software agents 265 is not material, some computing devices 110 may have multiple software agents 265 residing thereon while other computing devices 110 may not have any. An automated MES 270, such as WORKSTREAM™, resides on at least one computing device 110.

The computing devices 110 may also be part of a larger network 125 by a connection over the communications links 120. Exemplary computing systems in such an implementation include local area networks (LANs), wide area networks (WANs), system area networks (SANs), intranets, or even the Internet. The network 125 employs a networked client/server architecture, but alternative embodiments may employ a peer-to-peer architecture. Thus, in some alternative embodiments, the computing devices 110 may communicate directly with one another. The communications links 120 may be wireless, coaxial cable, optical fiber, or twisted wire pair links, for example. The network 125, in embodiments employing one, and the communications links 120 are implementation specific and may be implemented in any suitable manner known to the art. The network 125 may employ any suitable communications protocol known to the art, e.g., Transmission Control Protocol/Internet Protocol (TCP/IP).

Turning now to FIGS. 1 and 2, the software agents 265, collectively, are responsible for efficiently scheduling and controlling the lots 130 of wafers 135 through the fabrication process. Each process tool 115 represents a resource that may be employed for this purpose. For instance, the process tool 115 may be a fabrication tool used to fabricate some portion of the wafers 135, i.e., layer, pattern, dope, or heat treat the wafers 135. Or, the process tool 115 may be a metrology tool used to evaluate the performance of various parts of the process flow 100. Thus, the software agents 265 are capable of assessing a plurality of resources for subsequent processing of the lots 130 of wafers 135, allocating the resources represented by the process tools 115, and negotiating among themselves for the allocation of those resources for subsequent processing of the lot 130 of wafers 135.

In the illustrated embodiment, the software agents 265 are state aware, and are imbued with specific goals that they autonomously initiate behaviors to achieve. The software agents 265 are implemented as objects in an object oriented programming (OOP) environment, but the invention may be implemented using techniques that are not object oriented. Their behavior is relatively simple and is script or rules-based. The behavior is designed to achieve selected goals such as achieving an assigned lot due date, achieving a predefined level of quality, maximizing process tool utilization, and scheduling opportunistic preventive maintenance. In furtherance of these objectives, the software agents 265 interface with the MES 270 and are integrated with other existing factory control systems (not shown). As will be apparent to those skilled in the art having the benefit of this disclosure, the manner in which this interface and integration occurs is implementation specific, depending upon the particular makeup and configuration of the MES 270 and the factory control systems.

Collectively, the software agents 265 schedule ahead for each lot 130 one or more operations on a specific qualified process tool 115, including transports and required resources, as discussed further below. This includes making optimizing decisions such as running an incomplete batch, as opposed to waiting for an approaching lot 130, and scheduling opportunistic preventive maintenance or qualifications tests to meet specifications. The software agents 265 schedule activities such as initiating lot transport and processing, performing MES transactions, monitoring processing and transport, and reacting to deviations from scheduled activities or unscheduled activities. More particularly, the software agents 265 may, for instance:

schedule and initiate execution of interbay material transport required for a next lot processing engagement at a specified process tool 115;

monitor transport activity and react to deviations;

schedule and initiate automated material handling system (AMHS) intrabay transport to a reserved process tool port by a specified time;

detect process tool port carrier arrival via auto-identification or equipment event;

initiate loading, recipe download, processing, and unloading on a process tool 115 via an equipment interface;

perform MES transactions;

monitor processing activity and notify WFTs of abnormalities;

detect near completion of processing via an equipment event;

initiate AMHS intrabay transport to the nearest stocker or a nearby process tool 115;

detect carrier departure and release the port;

schedule preventive maintenance procedures and notify maintenance technicians (MTs) at the appropriate time; and schedule qualification procedures and notify WFTs at the appropriate time.

Note that, depending on the level of implementation, a given embodiment may implement any or all of these functions, or even functions not listed above.

Figure 3A:
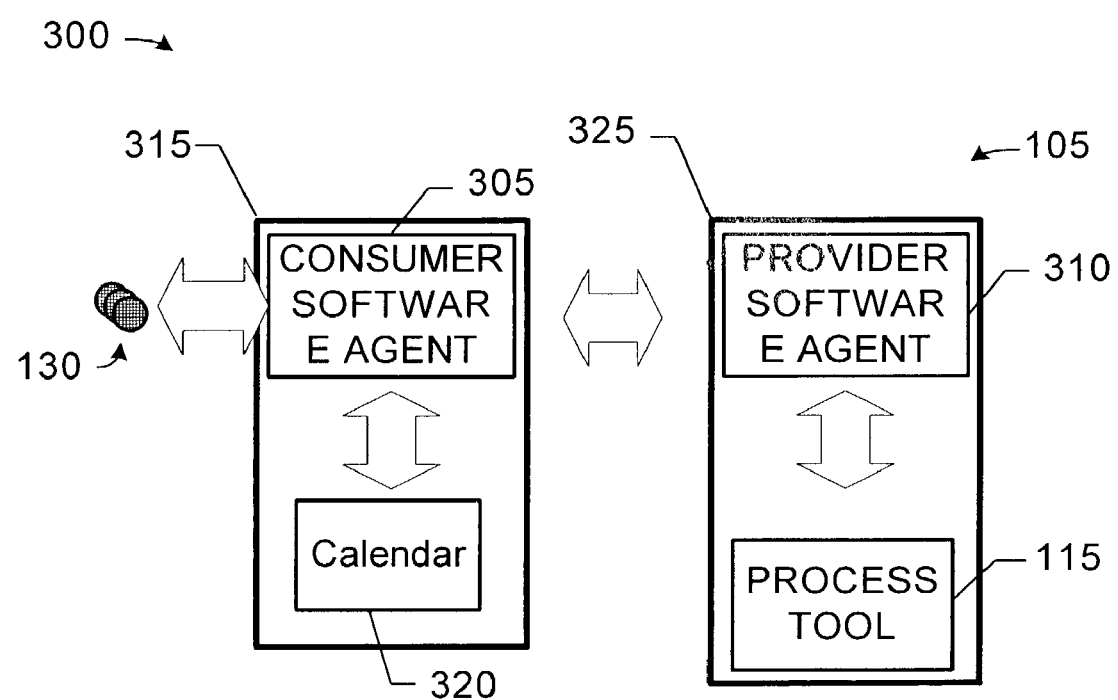
FIG. 3A is a simplified block diagram of a system including provider and consumer software agents in accordance with the present invention.

Referring now to FIG. 3A, in a general sense, the software agents 265 can typically be classed as "consumer agents" 305 and "provider agents" 310. Consumer agents 305 represent the interests of consumers 315, e.g., the PM procedures in performing preventative maintenance within the allowable windows or the lots 130 in advancing through the process flow 100 in a timely and efficient manner. Provider agents 310 represent the interests of providers 325, e.g., machines such as the process tool 115, in meeting the demands of consumers for processing resources in advancing the lots 130 through the process flow 100 in a timely and efficient manner. For instance, a software agent 265 representing a lot 130 of wafers 135 would be considered a "consumer" agent 305 and a software agent 265 representing a process tool 115 would be considered a "provider" agent because the process tool 115 is "providing" processing resources "consumed" by the lot 130. A software agent 265 may be classed as a provider agent 310 in one context and a consumer agent 305 in another context.

As noted above, the distinction between consumer agents 305 and provider agents 310 is particularly apt in the context of scheduling. The scheduling of actions initiated by the software agents 265 revolve around budgets, costs, and ratios associated with the processing.

More particularly, to further the implementation of a negotiation protocol for allocating resources, a combination of budgets, costs, and ratios are used to implement a scheduling system. The combination is structured to encourage "desirable" behavior, e.g., meeting due dates, effective utilization of machines, etc.

Figure 3B:
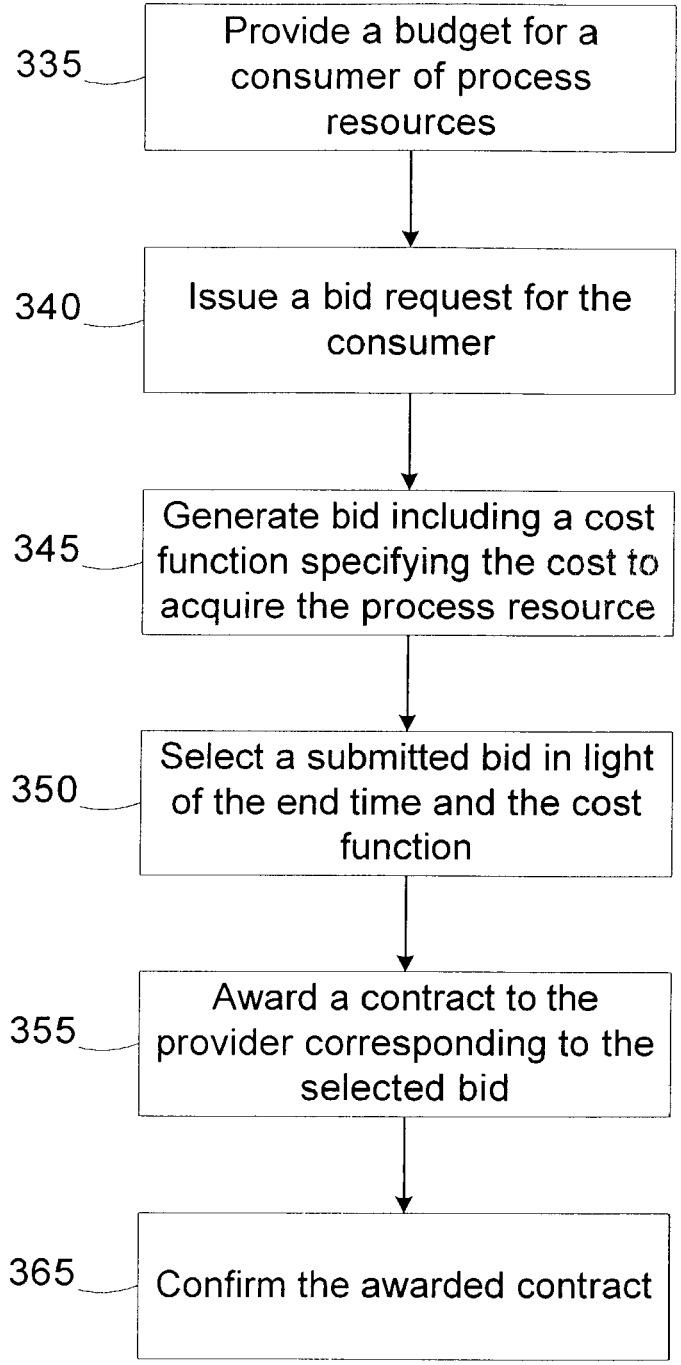
FIG. 3B is a simplified flow diagram of a method for scheduling resources that may be employed by the software agents of FIG. 3A.

Turning now to FIG. 3B, there is illustrated a method 330 practiced in accordance with the present invention. The method 330 may be practiced in a variety of embodiments and implementations, a particular one of which is disclosed below. The consumer software agents 305 and provider software agents 310 use a "contract net negotiation protocol" approach to schedule the consumers 315 for the providers 325. The consumer agents 305 negotiate with provider agents 310 to reserve access for the consumer 315 to the resources of the provider 325. This reserved access is referred to as an "engagement." In this particular embodiment, both the consumer agent 305 and the provider agent 310 schedule the engagement.

The method 330 begins by providing a budget for the consumer 315 for a particular process resource, e.g., process time on the process tool 115 it next wants to consume, as set forth in box 335. The budget can be structured to affect the operation of the process flow 300. For instance, consumers 315 having a higher priority for completing the process flow 300 may be afforded greater budgets to increase their chances of successfully acquiring the desired process resource. In general, the budget depends on the processing time of the process step, lot priority, lateness with respect to meeting its due date, and other factors. In some embodiments, a consumer 315 may provide a budget calculator to the provider 325. The budget calculator permits the provider 325 to determine the priority of the consumer 315 relative to other engagements previously booked by the provider 325.

The consumer 315 then issues, through its consumer software agent 305, a bid request for the consumer 315 to acquire the process resource, as set forth in box 340. In one implementation, the consumer software agent 305 requests bids from all eligible providers 325 on behalf of a consumer 315. When a consumer software agent 305 requests a bid, it gives the provider software agent 310 pertinent information such as: the earliest time to begin transport from the last machine; the process-operation to be scheduled; the latest completion time acceptable to the consumer 315, and the location from which the consumer 315 will be transported to the provider 325.

The provider 325 then, through its provider software agent 310, submits to the consumer 315 at least one bid responsive to the bid request, as set forth in box 345. The bid includes a cost function from which the consumer 315 may determine a cost to acquire the process resource from the provider 325. The provider 325 attempts to maximize its "profits" by adjusting the prices it offers in its bids.

An engagement includes a "commitment window" (CW), which is a time interval during which the provider 325 commits to meet the engagement. A "kernel" (k) is a time period representing the actual time required by the provider 325 to complete the task. A "working window" (WW) is a subset of the commitment window that the provider software agent 310 may use to constrain the engagement to accommodate other engagements and avoid overcommitting its resources. The provider software agent 310 may shift the edges of the working window such that it is smaller than the commitment window. If no shifting is required to accommodate other engagements, the working window remains the same size as the commitment window.

The consumer 315, through the consumer software agent 305, then selects a submitted bid in light of the end time of the candidate bid and the cost function of the provider 325, as set forth in box 350. The selection process is described in greater detail below with reference to FIGS. 6A and 6B. A particular consumer 315 might accept a more expensive bid to ensure a more timely delivery of the purchased resource.

The consumer 315 awards a contract to the provider 325 corresponding to the selected bid, as set forth in box 355, through the consumer software agent 305. However, the provider 325 typically is negotiating with several consumers 315. It is possible that the provider 325 scheduled another consumer 315 in such a manner that the cost to secure the submitted bid has increased. Thus, the provider 325, through its provider software agent 310, determines the actual cost of the bid (i.e., based on the current schedule of engagements) and accepts the contract if the consumer 315 can still afford the updated cost. The provider 325 then confirms the awarded contract, as set forth in box 360. If not, it notifies the consumer 315 who can then select a second bid or begin the bidding process all over again. The consumer 315 may maintain a schedule or calendar 320 of scheduled engagements and transport activities (i.e., to move it to the next process tool 115) to facilitate scheduling of engagements beyond the current process step.

Thus, decision-making in the process flow 300 is guided by economic forces of supply and demand. More particularly, consumer software agents 305 are designed to acquire resources more or less aggressively depending on selected factors, such as priority or lateness. Provider software agents 310 are designed to provide such resources more or less aggressively depending on a number of factors, such as the level of utilization ("congestion"). Note that these decisions can be manipulated externally though configurable curves supplied for costs and budgets on which the decisions are made. Working in concert, the consumer and provider software agents 305. 310 cooperate to advance the consumers 315 through the process flow 300 in a timely and efficient manner.

Figure 4:
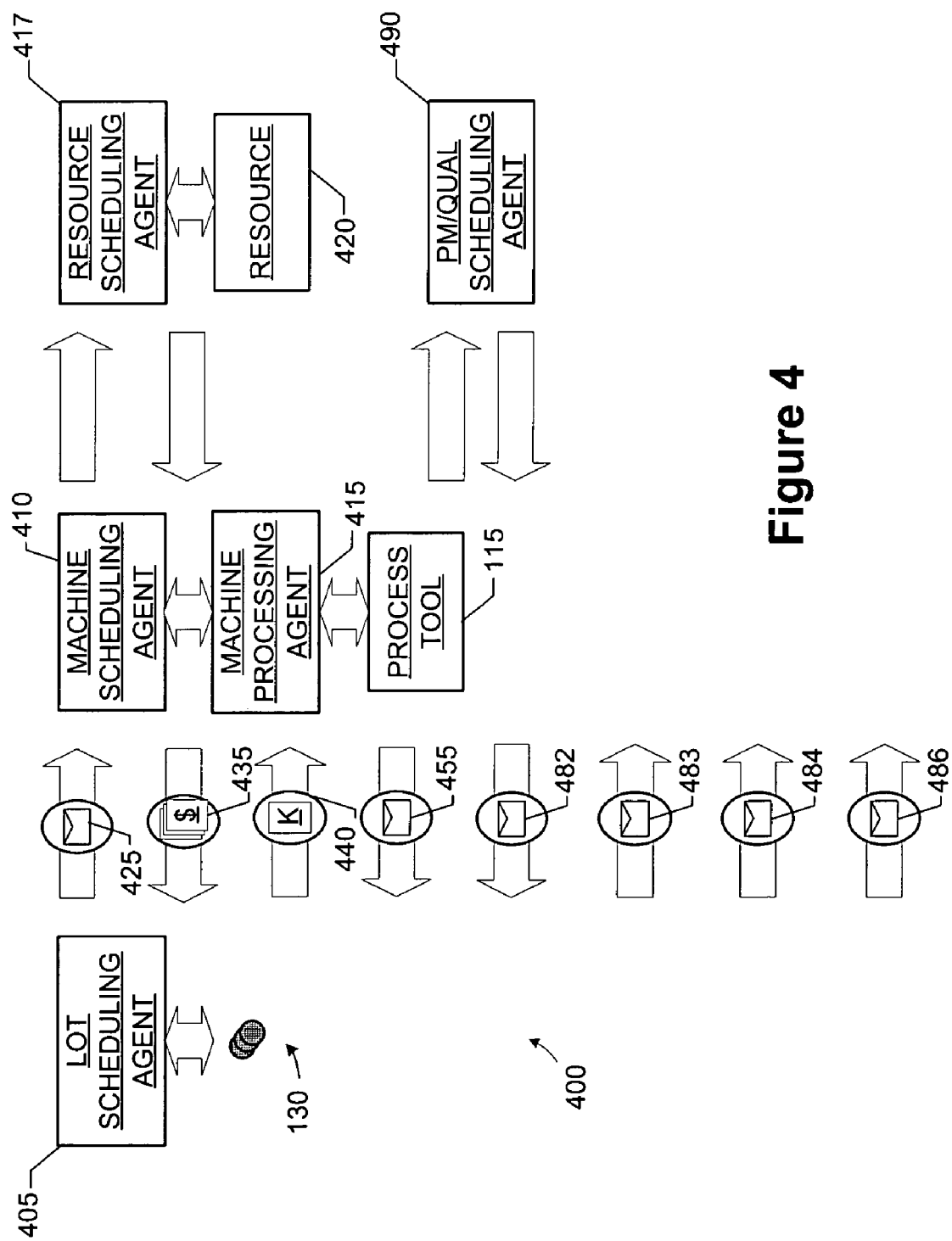
FIG. 4 is a simplified block diagram illustrating interactions between specialized scheduling and processing agents adapted to schedule and control processing of workpieces, such as lots of semiconductors, through the process flow of FIG. 1.

FIG. 4 depicts a portion of a semiconductor fabrication process flow 400 in which these concepts are further illustrated. The process flow 400 implements the contract net negotiation protocol discussed above relative to FIG. 3A and FIG. 3B in one particular embodiment thereof. More particularly, the process flow 400 includes:

a lot scheduling agent 405, which is a consumer software agent representing the lot 130 for scheduling purposes;

a machine scheduling agent 410, which is both a consumer and a provider software agent, depending on the context in which it is operating, representing the process tool 115 for scheduling purposes;

a machine processing agent 415, which is a provider software agent that takes actions to initiate activities scheduled by the machine scheduling agent 410; and a resource scheduling agent 417, which is a provider software agent representing a resource 420 that may be needed by the process tool 115 to perform the scheduled activity.

The lot scheduling agent 405 tries to minimize costs while staying on schedule. The machine scheduling agent 410 tries to optimize tool utilization while maximizing profits.

The lot 130 and resource 420 may also have corresponding processing agents (not shown) to whom the scheduling agents 405, 417 pass control when it is time for a scheduled activity to begin. Note that resource scheduling agents 417 can represent other types of resources, e.g., dummy wafers, empty cassettes, wafer fabrication technicians (WFT), maintenance technicians (MT), etc.

The agents 405, 410, 415, 417 employ negotiation techniques that apply market dynamics to scheduling decisions. These decisions are generally influenced by a schedule of prices for a variable that encourages some assignments over others. In the illustrated embodiment, such price schedules are generated from a toolkit of parameterized exponential functions (PEFs). In some cases, the parameters of an individual function can be adjusted to generate the desired schedule, while other applications employ a sum of these functions. The following discussion of the parameterized exponential function toolkit is referenced in the subsequent detailed discussions that follow.

In general, exponential functions can be characterized as Increasing vs. Decreasing (i.e., inc or dec), and as Concave vs. Convex (i.e., C or V). FIGS. 5A through 5D illustrate the four possible combinations of these characteristics. Each of these functions is a function of one variable, x. These functions may be tuned using four parameters:

The steepness, s, determines how quickly the function climbs or falls.

The x-reference, $x_0$, and y-reference, $y_0$, define a point the curve must pass through $(x_0, y_0)$.

The asymptote, a, shifts the line y=a that the curve approaches as it flattens out. For a convex curve, $a<y_0$, and for a concave curve, $a>y_0$.

Figure 5A:
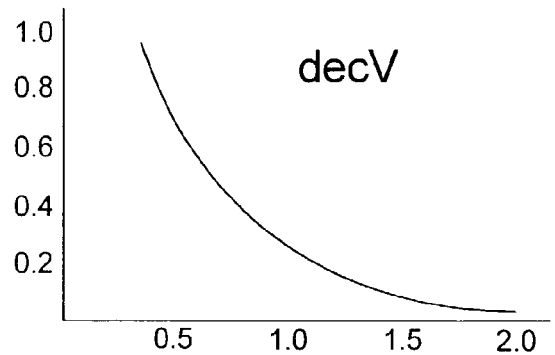
FIGS. 5A through 5D illustrate parameterized exponential functions.

FIG. 5A illustrates a decreasing convex function defined by the equation:

$$decV(x,s,x_0,y_0,a)=a+(y_0-a)e^{s(x_0-x)}.$$

Figure 5B:
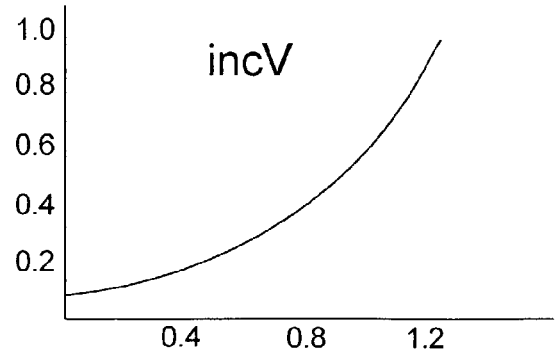

FIG. 5B illustrates an increasing convex function defined by the equation:

$$incV(x,s,x_0,y_0,a)=a+(y_0-a)e^{s(x-x_0)}.$$

Figure 5C:
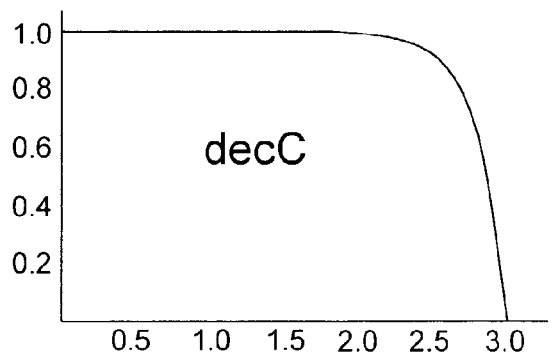

FIG. 5C illustrates a decreasing concave function defined by the equation:

$$decC(x,s,x_0,y_0,a)=a+(a-y_0)e^{s(x_0-x)}.$$

Figure 5D:
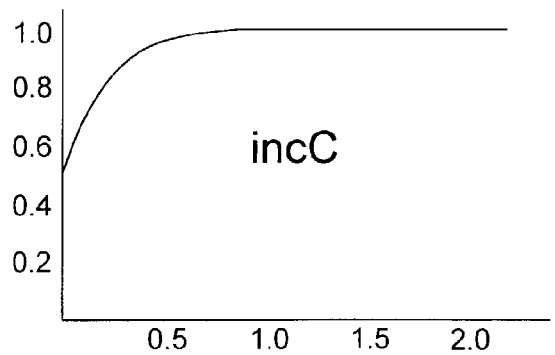

FIG. 5D illustrates an increasing concave function defined by the equation:

$$incC(x,s,x_0,y_0,a)=a+(a-y_0)e^{s(x_0-x)}.$$

Although the functions are described as having exponential form, it is contemplated that other parameterized function forms may be used to generate cost functions having similar characteristics (i.e., increasing, decreasing, concave up, concave down, etc.).

In some applications, several PEF components of the same or different variables may be added together and the resulting sum normalized to meet various performance requirements. Specifying such a normalized sum requires a list of PEF components. For each normalized sum, the following is specified:

- type (dec or inc, V or C) for each PEF;
- parameter values (s, $x_0$, $y_0$, a) for each PEF;
- the variable over which each PEF is computed (x);
- the desired maximum value, desMax, of the normalized sum, and, for sums including convex PEFs, the range within which each variable is limited in searching for this maximum; and
- the desired minimum value, desMin, of the normalized sum, and, for sums including concave PEFs, the range within which each variable is limited in searching for this minimum.

If Max is defined as the maximum of the sum of PEF components within the range of desMax and Min is defined as the minimum of the sum of PEF components within the range of desMin, the formula for the entire function is:

desMin+(desMax−desMin)(sum(PEFs)−Min)/(Max−Min)

Such a composite function may be communicated by sending the type, variable, and four parameters for each PEF and three constants A, B, and C, such that the normalized function is:

$A+B*$(sum(PEFs)−C), where:

A=desMin−Min(desMax−desMin)/(Max−Min)
B=(desMax−desMin)/(Max−Min)
C=Min

In some cases, a partial function may be passed in a response. In such a partial function the arguments of some of the PEFs are fixed. For example, a bid from a process tool 115 includes a rate per time unit function (RTU) with a fixed $ccDiff_{avg}$ (described in greater detail below). Such a fixed argument can affect the overall function in two ways. The argument may have its own PEF. In such a case, instead of passing the complete PEF (type, argument, and four parameters), only the value of the PEF at the fixed parameters are passed, and the fixed values are summed together with the other PEFs. This has the same effect as subtracting the value of the PEF for the fixed function from C. In a second case, the fixed argument may need to be summed with a variable argument within the same PEF. In this case, the fixed portion is subtracted from $x_0$. Note that whether the argument to the exponential is $(x-x_0)$ or $(x_0-x)$, the effect of replacing x with (x+d) for constant d is the same as replacing $x_0$ with $(x_0-d)$.

Returning to FIG. 4, the negotiation techniques employed by the lot scheduling agent 405 and the machine scheduling agent 410 are described in greater detail. A particular lot scheduling agent 405 may negotiate with a number of pieces of equipment, e.g., process tools 115. The lot scheduling agent 405 tries to find a process tool 115 that will allow the lot 130 to meet its due date. The goals of the lot scheduling agent 405 are to select a process tool 115 that provides the right type of processing and can support its due date requirements. At the same time, the machine scheduling agent 410 tries to acquire lots 130 for processing in a way that optimizes its utilization. Overall, the goals of the machine scheduling agent 410 are to maximize its overall utilization, respect the relative priority of lots 130, reduce setup or recipe changes, and optimize its batch size. This collaboration of agent interaction results in the scheduling of a lot 130 on a particular process tool 115 within a specified time window.

During the negotiation for a particular process step, each lot 130 is assigned a budget. The lot scheduling agent 405 uses the funds in its budget to secure the resources needed to complete the desired process step, also referred to as a process-operation. The budget for the lot 130 may be determined by a budget tool (not shown), or "Budget Calculator" function, that can be called by the scheduling agents 405, 410, 417. Each lot 130 of wafers 135 has a budget for each Process Step (Process-Operation). Each lot 130 has an assigned priority. Typically, priorities are assigned manually, although the priority may be set autonomously in accordance with preprogrammed parameters and classifications. The priority assigned to a lot 130 has a significant influence on its budget.

The budget tool receives as inputs an identification of the process step and the ending date/time for which it is called. From these inputs, the budget tool determines a budget for the lot 130 to complete the process step at a specific future time. In some embodiments, the budget may also have a component designed to deal with expiring lots 130, i.e., lots 130 that need to be processed within a certain time to avoid rework. In some processes, the time between steps becomes important to the outcome of the overall process. If the time between process steps is too long, then additional processing is needed or previous process steps are repeated. Process steps where the previous processing creates expiring lots 130 may have a higher budget that reflects the cost of rework. The budget may grow at a rate that allows the lot 130 to purchase processing before the expiration period. Budget components may also be provided to advance lots 130 that are behind schedule or that are necessary for feeding a downstream bottleneck.

In one particular implementation, budgets come in two types-lot budgets and PM/Qual budgets. Whereas the lot budgets are dependent on priority, process time, and various ratios, the PM/Qual budgets depend on primarily on duration and position in the calendaring window. The composite PM/Qual budgets are determined similarly to the composite lot budgets, but with emphasis on duration and position in the calendaring window instead of priority, process time, and the various ratios.

The lot scheduling agent 405 begins the negotiation by sending a "request bid" message 425 to all machine scheduling agents 410 representing process tools 115 capable of performing a desired manufacturing operation. At this point, the machine scheduling agent 410 is acting as a provider software agent because the process tool 115 is providing process resources, i.e., processing time. The lot scheduling agent 405 requests bids 435 from all eligible process tools 115 on behalf of a lot 130. As will be appreciated by those in the art having the benefit of this disclosure, eligibility is primarily predicated on whether a process tool 115 possesses or can acquire the resources needed to perform the process step the lot 130 seeks to enter. When a lot scheduling agent 405 requests a bid 435, it provides the process tools 115 with the:

- transport start time (TST), or earliest time to begin transport from the last location;
- process-operation (PO) and process-step (PS) to be scheduled;
- consumer's latest delivery time ($LDT_C$), or latest completion time acceptable to the lot 130;

identity of the last location or "source" location from which the consumer will be transported to the subsequent process tool 115; and identity of the lot 130 requesting the bid 435.

In some embodiments, the lot scheduling agent 405 may provide a budget calculator to the machine scheduling agent 410 agent. The budget calculator permits the machine scheduling agent 410 agent to determine if the lot 130 can still afford the cost of the engagement when the bid 435 is accepted.

A critical ratio may be defined for a lot 130 that indicates the degree to which the lot 130 is ahead, behind, or on schedule. The Critical Ratio, CR, for a time slot that ends at time $T_e$ is defined as:

$$CR = (\text{Time until Due Date} - CR\text{Adjust})/(\text{Standard Cycle Time Remaining} * \beta)$$

or $$CR = (\text{Due Date} - T_e - CR\text{Adjust})/(SCTR * \beta);$$

where:

$\beta$=a cycle time compression factor based on lot priority

CRAdjust=CRA*DFLTLD+CRB;

SCTR=sum (standard process and queue times of all remaining process-operations);

DFLTLD=expected lead-time for the product (i.e., expected total cycle time);

CRA=configurable control A for CR adjustment; and

CRB=configurable control B for CR adjustment.

CRAdjust provides a configurable means to encourage lots 130 to finish early to improve on-time delivery. Unexpected events near the end of the processing sequence can suddenly put a lot 130 behind schedule, and there may not be enough time to recover unless the lot 130 is targeted to finish early. DFLTLD is used to set the Due Date for lot starts, i.e., Due Date=Start Date+DFLTLD. The preceding definition of Critical Ratio, CR, leads to the following conditions:

| | |
|---|---|
| CR > 1.0 | the lot 130 is ahead of schedule; |
| CR = 1.0 | the lot 130 is on schedule; |
| 0 ≤ CR < 1.0 | the lot 130 is behind schedule; and |
| CR < 0 | the lot 130 has missed the Due Date and is late. |

In one particular implementation, the lot scheduling agent 405 calculates the initial value of $LDT_C$ as the time at which the lot 130 will fall behind schedule, i.e., where the target critical ratio CR=1.0. The corresponding $LDT_C$ is determined using the following equation:

$$LDT_C = \text{DueDate} - (CRA*DFLTLD+CRB) - \text{TargetCR}*(SCTR*\beta)$$

where:

DueDate=the time at which the lot 130 is due to complete the process flow 400;

SCTR=a sum of the standard process and queue times of all the remaining process-operations;

$\beta$=a cycle time compression factor based on lot priority;

CRA=a configurable control A for CR adjustment proportional to expected cycle time;

CRB=a configurable control B for CR adjustment to accommodate disruption near the end of the process flow 400;

DFLTLD=an expected lead-time for the lot 130, i.e., expected total cycle time; and TargetCR=a target Critical Ratio for $LDT_C$, a configurable variable whose initial value is set by lot priority and defaults to 1.0.

If the lot 130 is behind schedule the initial value calculated for $LDT_C$ may be in the past or may not allow sufficient time for transport, loading, and processing. The kernel of the commitment window, k, represents the actual process duration for the process-operation. The kernel does not include any setup time, since the lot 130 cannot know at the time of bidding whether or not it will require a separate setup. The machine scheduling agent 410 may therefore calculate a revised minimum LDT, $LDT_{min}$, that considers the estimated transport time (ETT) for moving the lot 130 to the process tool 115 from its last location, the transport start time (TST), the estimated loading time (ELT), and the kernel as follows:

$$LDT_{min} = ETT + TST + ELT + k.$$

In some instances it may be desirable to constrain $LDT_C$ so a lot 130 that is ahead of schedule does not immediately consider alternatives that would cause it to give up all of its lead and immediately regress back to "on schedule." A configurable parameter (i.e., also referred to as a control knob), CRLoss, that specifies a percentage reduction of the Critical Ratio that is acceptable at a single process-operation may be used. Instead of calculating LDT based on CR=1, LDT is calculated based on a TargetCR using the following equation:

$$\text{TargetCR} = \text{CurrentCR}*(1-\text{CRLoss}).$$

This alternate formula is generally only used when the resulting. TargetCR>1. If TargetCR<1, then the $LDT_C$ is calculated based on CR=1 and increased to $LDT_{min}$, if necessary.

Referring again to FIG. 4, the eligible process tools 115 formulate bids 435 and attempt to maximize their "profits" by adjusting the prices they offer in the bids 435. As mentioned above, the machine scheduling agent 410 maintains a schedule of engagements.

Bids 435 from the machine scheduling agents 410 include the following information:

BCF=Basic Cost Function for the time window [EST, LDT];

EST=Earliest Start Time for processing=Transport Start Time (TST)+Estimated Transport Time (ETT)+Estimated Loading Time (ELT);

ccSameSetup$_{avg}$=average committed capacity of engagements of the same setup type within the time window [EST, LDT];

RTU$_{ccDiff}$=Rate per unit time function based on committed capacity, with ccDiffSetup (i.e., committed capacity of engagements with a different setup type) fixed at ccDiffSetup$_{avg}$, the average committed capacity of engagements not of the same setup type within the time window [EST, LDT]; and FDF=flexibility discount function.

If the process tool 115 is a batching machine (i.e., can process more than one lot 130 simultaneously), the bid 435 also includes:

ccSameBatch$_{avg}$=the average committed capacity of engagements of the same batch type within the time window [EST, LDT]; and RTU$_{ccDiff}$ is computed with ccDiffBatch fixed at ccDiffBatch$_{avg}$ as well as ccDiffSetup fixed at ccDiffSetup$_{avg}$.

The use of averages in computing RTU$_{ccDiff}$ is a simplifying assumption. In some embodiments, such averages may not be used.

The BCF, as described in greater detail below, defines the cost of processing per unit time (hourly rate) as a function of the date/time when processing occurs. In some instances the BCF may be represented as a table of x-y values at evenly spaced time intervals (x).

The RTU function, as described in greater detail below, defines the cost of processing per unit time (hourly rate) as a function of committed capacity. The RTU is represented as a list of PEFs and normalization parameters with $ccDiff_{avg}$, fixed as described above. When evaluated, summed, and normalized, these yield the rate per unit time at the specified $ccSame_{avg}$ and the current $ccDiff_{avg}$ of the process tool 115.

The FDF, as described in greater detail below, is a PEF specifying the penalty imposed by the process tool 115 for overly narrow commitment windows. Typically, the FDF is a single, unnormalized incV function of the ratio between kernel, k, and commitment window widths.

After receiving the bids 435 from the machine scheduling agents 410, the lot scheduling agent 405 generates a collection of candidate bids for each process tool 115 by sampling the BCF for commitment windows with varying sizes, start times and end times in accordance with a BCF search algorithm. The lot scheduling agent 405 first calculates the maximum and minimum size of the commitment windows to be considered. The theoretical minimum size commitment window is k, the kernel, but practically a minimum window size larger than k should be chosen. Assume β is an externally configurable factor applied to the kernel, k, to determine the minimum size of the commitment window. The minimum and maximum size commitment windows are calculated by:

$$CW_{min}=(\beta+1)*k \text{ for } 0<\beta<K_p$$

$$CW_{max}=LDT-EST,$$

where $$K_p=[(LDT-EST)/k]-1.$$

The BCF search algorithm employed by the lot scheduling agent 405 starts with the largest commitment window, $CW_{max}$, and gradually reduces the commitment window to $CW_{min}$. The number of window size samples, S, is determined by a configurable parameter CWSamples. In the illustrated embodiment, the initial value is:

$$CWSamples=5.$$

The lot scheduling agent 405 calculates a corresponding shrink factor, α, using the equation:

$$\alpha = \left(\frac{CW_{min}}{CW_{max}}\right)^{1/(S-1)},$$

where S is the desired number of window size samples.

The BCF search algorithm generates a series of commitment window sizes $CW_i$ between $CW_{min}$ and $CW_{max}$ as follows:

$$CW_1=CW_{max}$$

$$CW_i=CW_{i-1}*\alpha \text{ (for } i=2, \ldots S)$$

or alternatively, $$CW_i=CW_{max}*\alpha^{(i-1)} \text{ (for } i=1, \ldots S).$$

For each commitment window size $CW_i$, the BCF search algorithm generates a series of $J_i$ window start times $TS_{i,j}$ and window end times $TE_{i,j}$. The number of pairs of ($TS_{i,j}$, $TE_{i,j}$) depends on the window size. For the first window of size, $CW_{max}$, only 1 pair of starting and ending times is possible. For smaller window sizes, more pairs may be possible. The algorithm for generating the number of these pairs for each $CW_i$ and the starting and ending times of these pairs is described below.

A reasonable minimum time shift, $S_{min}$, of the start/end time is k/2, although larger or smaller values may be used. For each commitment window size, $CW_i$, the maximum time shift, $S_{max}$, for the window $CW_i$ within the larger interval [EST, LDT] is:

$$S_{max}=LDT-EST-CW_i$$

$$S_{min}=k/2.$$

The number of different window positions, $N_p$, for $CW_i$ is determined using:

$$N_p=1+[S_{max}/S_{min}] \text{ (the division is rounded off to an integer value).}$$

Next, the minimum shift, $S_{min}$, is adjusted such that $S_{max}$ is an exact $N_p$ multiple:

$$S_{min}=S_{max}/N_p.$$

The starting and ending times for each window of size, $CW_i$, are generated using:

$$TS_{i,j}=EST+(j-1)*S_{min} \text{ for } j=1, \ldots N_p$$

$$TE_{i,j}=TS_{i,j}+CW_i \text{ for each } TS_{i,j}$$

The combination of varying commitment window sizes with unique start times and end times produces a collection of commitment windows described by start time, end time pairs (TS, TE).

The lot scheduling agent 405 calculates a cost for each of the candidate bids associated with the commitment windows described by the pairs (TS, TE). To save computation resources, approximations may be used in calculating the cost. Of course, a more exact and resource intensive computational approach may be used.

First, the lot scheduling agent 405 calculates the approximate increase, h, in committed capacity that is caused by a candidate bid. This depends only on the kernel, k, and the size of the commitment window, $CW_i$. Note that the factor, h, is the measure of (in)flexibility for which the FDF computes a penalty.

$$h=k/CW_i$$

Next, the change in the rate of the RTU function, $R_{delta}$, caused by an increase, h, in committed capacity is estimated. This approximation assumes the RTU is a well-behaved function that is easy to compute (i.e., compared to committed capacity or BCF). The average committed capacities for an engagement are estimated ($ccSameSetup_e$, and $ccSameBatch_e$ if batching) using a window size, $CW_i$, anywhere within the larger window [EST LDT] based on the average committed capacities, $ccSameSetup_{avg}$ and $ccSameBatch_{avg}$ if batching, provided in the candidate bid and the increased density, h, caused by the engagement.

$$ccSameSetup_e=ccSameSetup_{avg}+h$$

$$ccSameBatch_e=ccSameBatch_{avg}+h$$

The $RTU_{ccDiff}$ function is used to calculate the rate for committed capacity $ccSameSetup_{avg}$ and $ccSameSetup_e$, and $ccSameBatch_{avg}$ and $ccSameBatch_e$, if batching. Note that the $RTU_{ccDiff}$ already incorporates the $ccDiffSetup_{avg}$ and $ccDiffBatch_{avg}$ for the process tool 115. The difference, $R_{delta}$, is computed using:

$$R_{delta} = RTU_{ccDiff}(cc\text{SameSetup}_e, cc\text{SameBatch}_e) - RTU_{ccDiff}(cc\text{SameSetup}_{avg}, cc\text{SameBatch}_{avg}).$$

Note that for RTUs that are positive monotonic in ccSameX, $R_{delta}$ is positive. $R_{delta}$ approximates the change in the cost of the engagement due to the change in committed capacity caused by the addition of the engagement to the existing schedule of engagements for the process tool 115. This cost adjustment, $C_{delta}$, is simply the product of the rate change and the size of the commitment window:

$$C_{delta} = R_{delta} * CW_i$$

The total estimated cost, $C_e$, for adding the engagement starting at time TS and ending at time TE is then:

$$C_e = FDF(h) * \left[ C_{delta} + \left[ h * \int_{t=TS}^{TE} BCF(t) dt \right] \right].$$

The cost approximation, $C_e$, should be reasonably accurate even when the kernel ratio, h, is high. Note that if the RTU function is the same for all process tools 115 in the same family, $C_{delta}$ can be calculated once for each commitment window size, $CW_i$, and then used in the cost estimate of every candidate engagement of size $CW_i$ regardless of the process tool 115. In this case the lot scheduling agent 405 may wish to evaluate all commitment windows of size, $CW_i$, across all process tools 115 before shrinking the commitment window size and evaluating a new set of candidate engagements.

The integral $\int BCF(t)dt$ is calculated as the area under the BCF curve. For each whole interval, $\Delta t$, of the BCF table that falls within the range $TS \leq t < TE$, the contribution to the area is $\Delta t * BCF(t)$. For the partial interval of the BCF table containing the boundary point TS, the contribution to the area is $(t_{i+1} - TS) * BCF(TS)$, where $t_{i+1}$ is the end of the interval containing TS (i.e., $t_i \leq TS < t_{i+1}$). For the partial interval of the BCF table containing the boundary point TE, the contribution to the area is $(TE - t_i) * BCF(TE)$, where $t_i$ is the start of the interval containing TE (i.e., $t_i \leq TE < t_{i+1}$). The integral is approximated as the sum of these contributions in the range $TS \leq t < TE$. As discussed in greater detail below, if $\Delta t$ is small enough, BCF(t) can be considered constant within the interval $[t_i, t_{i+1}]$ and the value of BCF(t) can be approximated as the value of $BCF(t_i)$, where $t_i \leq t < t_{i+1}$.

The lot scheduling agent 405 uses an "objective function" to evaluate the bids 435 formulated above. This objective function has the following form:

$$F = COL(BidEndTime) * PO\_Budget * COLF + BidCost,$$

where the cost of lateness (COL) is a function of the bid end time (TE) and COLF is a configurable weight. The BidCost is the cost of the engagement, $C_e$. In the illustrated embodiment, the cost of lateness is a decV function of the critical ratio of the end time.

The lot scheduling agent 405 minimizes the value of its Objective Function, F. The lot scheduling agent 405 selects bids 435 according to the minimum cost, F, for bids 435 it can afford with its applicable budget ($C_e \leq$ total budget). Note that the lot scheduling agent 405 need only have sufficient budget to pay for the bid cost, $C_e$, but the lot scheduling agent 405 selects bids 435 based on the total cost, F.

Figure 6A:
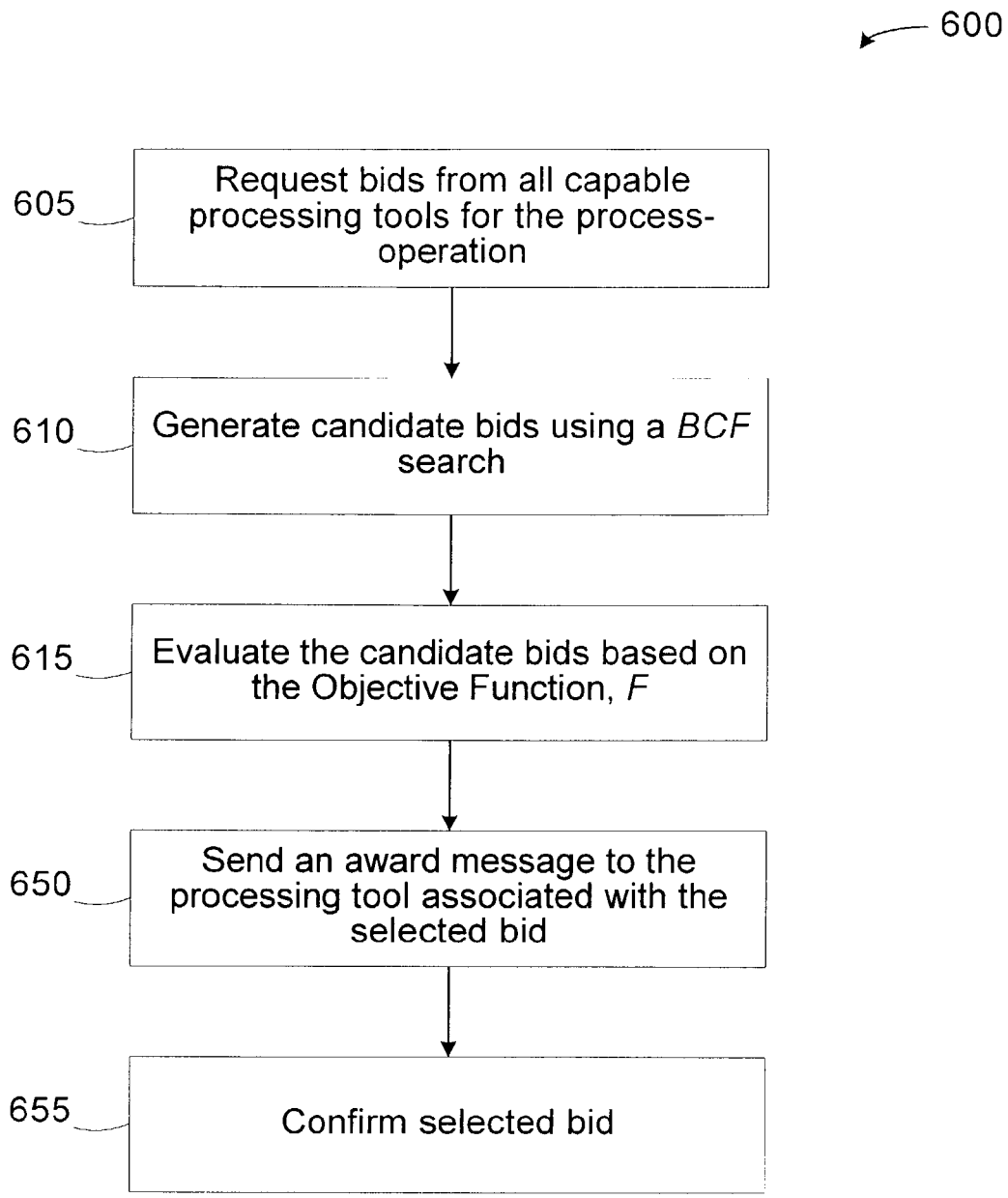
FIGS. 6A and 6B are a simplified flow diagram illustrating the overall negotiation strategy used by the lot scheduling agent of FIG. 4.
Figure 6B:
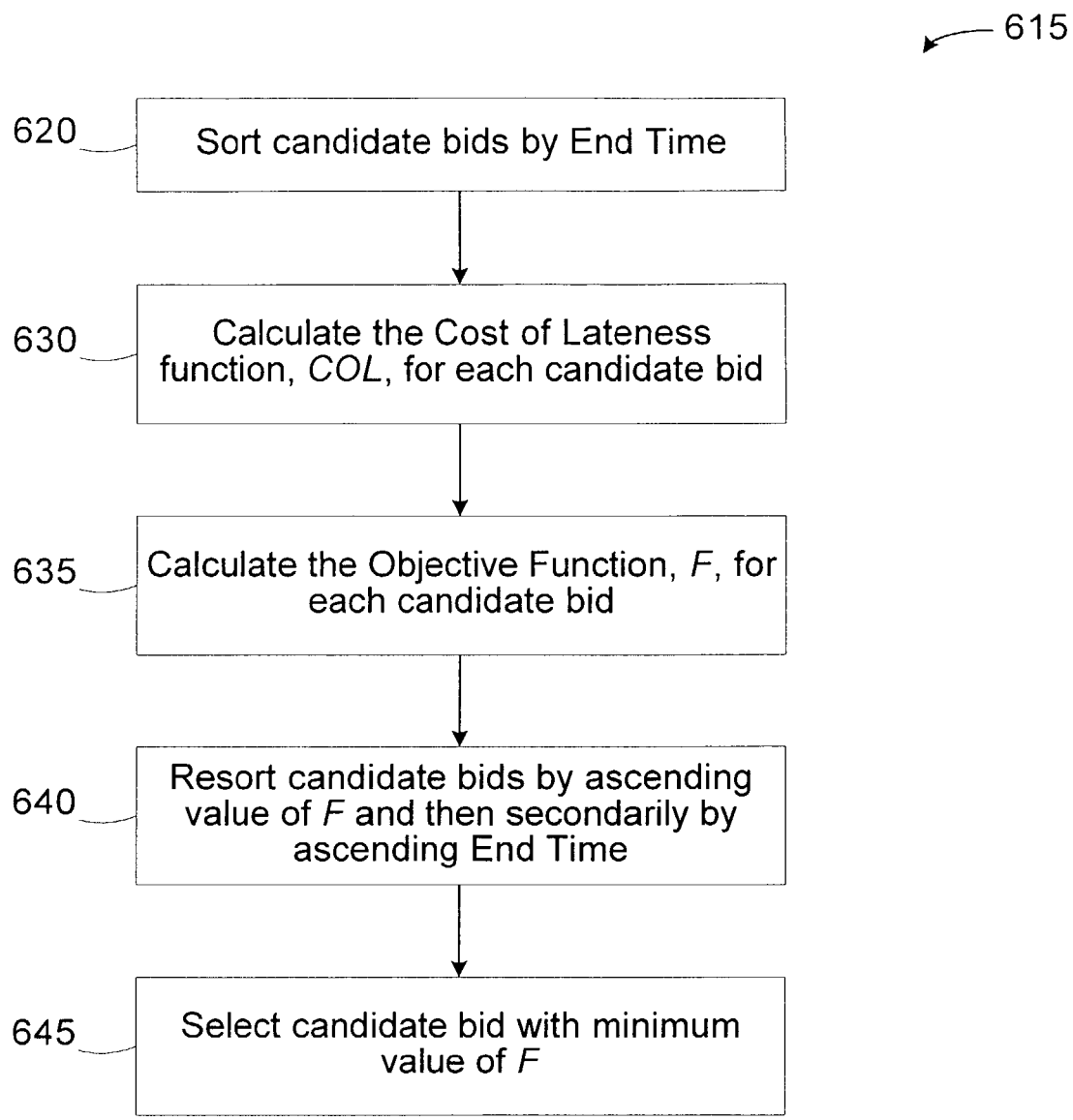

A method 600 illustrating the overall negotiation strategy used by the lot scheduling agent 405 is shown in FIGS. 6A and 6B. Referring first to FIG. 6A:

a) Request bids 435 from all capable process tools 115 for the process-operation. (Box 605)
b) Generate candidate bids using a BCF search against each bid returned by each process tool 115. (Box 610)
c) Evaluate the candidate bids based on the Objective Function, F. (Box 615) The lot scheduling agent 405 considers the Bid End Time, TE, and Bid Cost (i.e., $C_e$) for each bid and selects a bid using the logic outlined in FIG. 6B. Referring now to FIG. 6B:
  1) Sort candidate bids by End Time. (Box 620).
  2) Calculate the Cost of Lateness function, COL(TE), for each candidate bid. (Box 630) COL is calculated once for each Bid End Time, TE since the COL is the same.
  3) Calculate the Objective Function, F, for each candidate bid. (Box 635)
  4) Resort candidate bids ascending by the value of F and secondarily ascending by Bid End Time. (Box 640)
  5) Select candidate bid with minimum value of F. (Box 645) If more than one candidate bid has the same minimum value of F, the candidate bid with the earliest End Time is selected.
    As the estimated committed capacity, $CC_e$, caused by adding the engagement approaches the maximum process tool capacity it presents a greater challenge for machine scheduling. Such engagements are more likely to result in Regions of Violation (ROV) (i.e., where actual committed capacity exceeds the maximum capacity of the process tool 115) and ultimately may cause cancellations if the ROV cannot be resolved.
d) Returning to FIG. 6A, after the lot scheduling agent 405 selects a bid 435, it implements the next phase of the Contract Net protocol by sending an award message 440 to the machine scheduling agent 410 for the process tool 115 associated with the selected bid 435. (Box 650)
e) If the lot 130 can still afford the cost of the engagement, and the bid cost has not increased by more than a configurable percentage of the original estimated cost, the machine scheduling agent 410 schedules the engagement and sends a confirmation message 455 for the process tool 115 to the lot scheduling agent 405 and the negotiation for this process-operation is completed. (Box 655) The lot scheduling agent 405 pays the process tool 115 the actual cost of adding the engagement. The actual cost may be different than the cost the lot scheduling agent 405 estimated. If the actual cost is higher and the lot 130 does not have sufficient budget to afford the time slot, the machine scheduling agent 410 does not confirm the bid 435.

The lot scheduling agent 405 should take initiative to improve its schedule if it has to select a bid 435 that will not keep it on schedule. The machine scheduling agent 410 may also want to initiate negotiation when openings occur. Machine-initiated negotiation provides a stimulus for the lot scheduling agent 405 to improve its schedule.

If the machine scheduling agent 410 does not confirm the selected bid 435 in box 655, then the lot scheduling agent 405 determines whether it needs to start the bidding over (i.e., return to box 605) or select the next best bid 435. If the bid 435 is not confirmed, the lot scheduling agent 405 compares the number of remaining bids 435 to a configurable control, "RebidThreshold." If the number of remaining bids 435 is greater than the RebidThreshold, the lot scheduling agent 405 returns to the bid selection process described and selects the next best bid 435 (i.e., returns to box 645 in FIG. 6B). The lot scheduling agent 405 calculates the objective function F (discussed above) for the new bid 435. If the value of F has not increased by more than a configurable percentage of the objective function F for the best bid 435, the lot scheduling agent 405 attempts to confirm the next bid 435. Otherwise, if the remaining bids 435 are less than the RebidThreshold or the objective function F for the next bid 435 has increased too much, the lot scheduling agent 405 begins the entire process over again by requesting bids 435 from all capable process tools 115 with a wider commitment window [TST, LDT] created by increasing the LDT (i.e., returns to box 605). In some embodiments, the lot scheduling agent 405 may be configured to rebid after every confirmation denial by simply setting the RebidThreshold to an arbitrarily high value.

When rebidding is required, the new value of LDT for the wider commitment window is calculated by decreasing the Critical Ratio associated with LDT by a configurable percentage $CR_{rebid}$. Assuming $0<CR_{rebid}<1$ and $CR_{old}$ is the Critical Ratio corresponding to the old value of $LDT_{old}$ (i.e., $CR_{old}$ is CR calculated with $T_e$=LDT), then the new Critical Ratio, $CR_{new}$, and $LDT_{new}$ are:

$$CR_{new}=CR_{old}*CR_{rebid}; \text{ and}$$

$$LDT_{new}=\text{DueDate}-CR_{new}*(SCTR*\beta)-(CRA*DFLTLD+CRB).$$

The rebid algorithm described above is a mechanism intended to prevent the selection of sub-optimal bids 435, while guarding against excessive communications overhead. Several alternative approaches are possible. The more process tools 115 there are, the more expensive it is to rebid, and the less often one wants to do it. The following strategies may be used in determining whether to rebid.

Rebid when the remaining bids 435 are older than a predetermined time threshold.

Rebid after a certain number of bids 435 have been rejected. Repeated rejections indicate that the bids 435s currently in hand are out of synch with the real world:

Returning to FIG. 4, the lot scheduling agent 405 may schedule process-operations in advance of the current required process step. A configurable "Lookahead" parameter that specifies the number of operations that should be scheduled in advance may be used. "Hot" lots 130 may have a different "Lookahead" value than normal lots 130. In some implementations, the lot scheduling agent 405 may dynamically increase the "Lookahead" for a lot 130 as it approaches a batching operation to increase effective utilization of the batching tool.

Various exception conditions may require adjustments to current or future engagements. The number and identity of such exceptions is implementation specific. In the illustrated embodiment, for instance, exceptions include, but are not limited to, cancellation, finishing early, scrapping, lot priority changes, lot placed on hold, lot reworking, etc. A number of these exceptions are discussed in greater detail below. These exceptions may cause changes in scheduling, both the engagements already booked and those to be booked. One such exception condition occurs when an engagement is cancelled by a process tool II 5. The machine scheduling agent 410 sends a "cancel contract" message 482 indicating that the process tool 115 is canceling an engagement. The lot 130 is refunded the cost it paid for the engagement plus a "penalty refund" that depends on how much time remains before the engagement. The penalty refund is a value that increases as the delta time (time between current time and the start of the engagement) decreases and is also proportional to the priority of the lot 130 according to a "penalty factor." The formula for the penalty refund, for a Delta Time (in minutes) is:

$$\text{Penalty Refund}=P(\text{Delta Time})*PO\_budget*(\text{Penalty Factor}).$$

Figure 7:
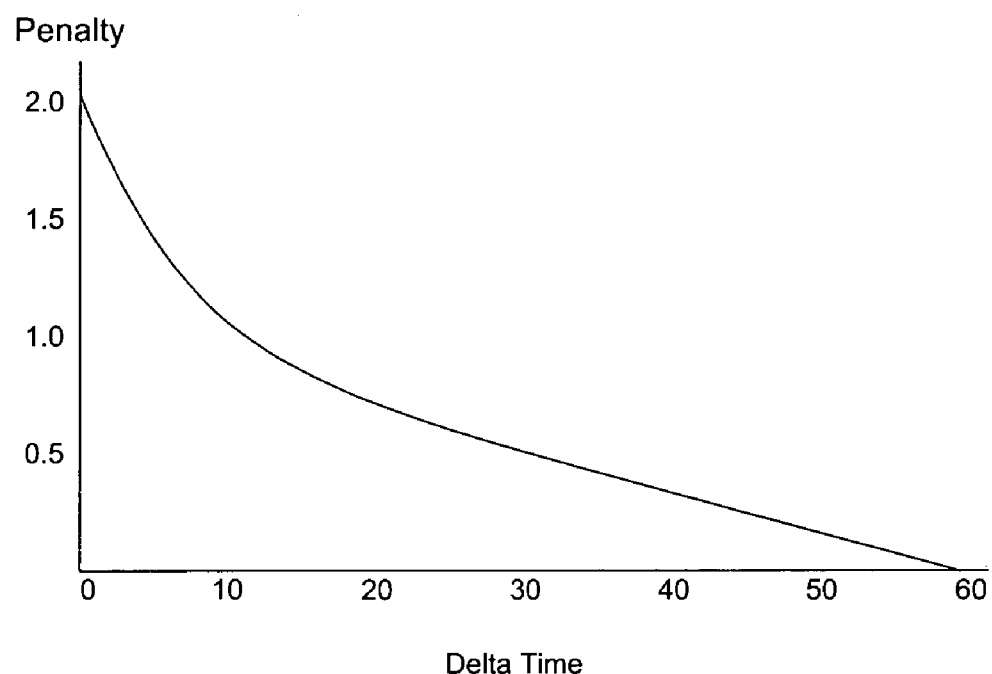
FIG. 7 is a graph of a penalty function.

The Penalty Factor is a multiplier that may be configured based on the type of lot 130. For example, the penalty factor for a normal lot 130 may be 1.0 and the penalty factor for a hot lot 130 may be 1.25. FIG. 7 illustrates shows a graph of an exemplary Penalty Function, P(Delta Time). In the illustrated embodiment, the penalty function is a decreasing convex (decV) function that may be constructed by specifying PEF parameters, as described above (see FIG. 5A).

The cancellation approach described above assumes that the lot scheduling agent 405 pays for a bid 435 at the machine scheduling agent 410 confirms the bid 435, thus requiring the machine scheduling agent 410 to refund the original payment. In an alternative embodiment, the actual payment may be deferred until the engagement starts or completes. Accordingly, it would be unnecessary to refund the original price. Also, the actual price may be reduced if subsequent engagements with the same setup or batch requirements may be scheduled proximate the subject engagement.

When the lot scheduling agent 405 receives a cancel contract message 482, it removes the cancelled engagement and begins rescheduling. In one embodiment, a total rescheduling approach may be used. The lot scheduling agent 405 cancels all of its subsequent engagements by sending a "cancel award" message 483 to all of the machine scheduling agents 410 representing the scheduled process tools 115 and begins the entire scheduling process again. The machine scheduling agent 410 does not pay a penalty refund if the engagement is cancelled by the lot scheduling agent 405. The machine scheduling agent 410 only pays a penalty refund when it initiates the cancellation. In another embodiment, an iterative rescheduling approach may be used. First, bids 435 are solicited to replace the cancelled engagement. If the cancelled engagement can be replaced without overlapping the next engagement scheduled for the lot 130 then rescheduling is completed. If there is an overlap, a cancel award message 483 is sent to the machine scheduling agent 410 representing the process tool 115 for the next, overlapping engagement. The cancelled engagement is in turn replaced, and any overlap with the next scheduled engagement is identified. The rescheduling process continues until there are no overlaps or there are no more engagements scheduled for the lot 130.

Another exception situation occurs when a lot 130 finishes processing earlier than expected (i.e., prior to the end time of the commitment window). When this occurs, the lot scheduling agent 405 notifies the next process tool 115 that it can arrive earlier. The lot scheduling agent 405 sends an "update commitment window" message 484 to the process tool 115 including the following parameters:

Process-operation;

EST=Earliest Start Time of current commitment window;

Transport Start Time (TST)–updated based on early finish of prior PO; and

Location where transport will begin.

The machine scheduling agent 410 for the process tool 115 returns the new EST of the commitment window as:

$$EST=TST+\text{Transport Time}+\text{Loading Time}$$

The lot scheduling agent 405 may also choose to rebid the next process-operation with a $LDT_{new} < LDT_{old}$ for the commitment window. Rebidding allows the lot 130 to preserve the time it has gained by finishing early rather than potentially losing this advantage by allowing more time at the next process-operation.

Another exception occurs when all the wafers in a lot 130 are scrapped or "sold" to engineering. The lot scheduling agent 405 needs to cancel all future engagements and stop scheduling. In the event of a partial lot scrap or sale, the kernel size, k, (processing time) for future commitments may change. If the kernel size changes, the lot 130 needs to notify all machines involved in its future commitments. The lot scheduling agent 405 sends a "change contract" message 486 for the contract net protocol. The lot scheduling agent 405 sends the change contract 486 message to the process tool 115 to provide the revised kernel size and possibly a new earliest start time (EST).

Other exceptions include placing the lot 130 on hold or reworking the lot 130. If a lot 130 is placed on hold, the lot scheduling agent 405 cancels all of its future engagements by sending cancel award messages 483 to the machine scheduling agents 410 representing the affected process tools 115 and stops scheduling. When the lot 130 is released from hold, the lot scheduling agent 405 begins scheduling the required process-operations. If a lot 130 requires rework, the lot scheduling agent 405 cancels future engagements by sending a cancel award message 483 to the machine scheduling agent 410 representing each of the process tools 115 and schedules new engagements for the rework operations.

In some cases, a lot 130 may be split. If the main lot 130 is terminated after the split, its lot scheduling agent 405 cancels all future engagements by sending a cancel award message 483 to the machine scheduling agent 410 representing each of the process tool 115 and stops scheduling. If the main lot 130 still exists with fewer wafers, the situation is treated like a partial lot scrap as described above. A new lot scheduling agent 405 is created for each of the split lots 130 to begin scheduling for them. In some cases, the product for the new split lot 130 may be different than the product associated with the parent lot 130.

Extra wafers may be bonused or bought into an existing lot 130. If the processing kernel, k, for any future engagement increases, the lot scheduling agent 405 must either pay a fee or reschedule the engagement. The fee to keep the engagement is the cost of an engagement with the same commitment window and a kernel size equal to the change of the kernel size. The lot scheduling agent 405 requests the change by sending the Change Contract message 486 to the machine scheduling agent 410 representing the process tool 115. If the new kernel does not fit within the commitment window or the working window the machine scheduling agent 410 may deny the change. In a case where multiple lots 130 are merged, the remaining, larger lot 130 is treated like a bonused lot 130, and the other lots 130 are terminated and treated like a scrapped lot 130.

Exception conditions may also occur if the due date or priority of a lot 130 is changed. The lot scheduling agent 405 may reschedule its engagements if the new due date is earlier or its new priority is higher.

Still referring to FIG. 4, the operation of the machine scheduling agent 410 is now discussed in greater detail. The machine scheduling agent 410 attempts to maximize its profits by adjusting the prices it offers in bids 435. The machine scheduling agent 410 maintains several data structures in order to compute prices and keep track of its engagements. Each engagement is tracked with the following information:

cws=Earliest Start Time of commitment window;
cwe=Latest Delivery Time of commitment window;
k=kernel, i.e., the actual processing time for the engagement;
wws=Earliest Start Time of the working window; and
wwe=Latest Delivery Time of the working window.

Initially, wws=cws and wwe=cwe. The machine scheduling agent 410 may increase wws and reduce wwe unilaterally without violating the cws and cwe negotiated with the lot 130 (i.e., cws≦wws<wwe≦cwe).

Figure 8A:
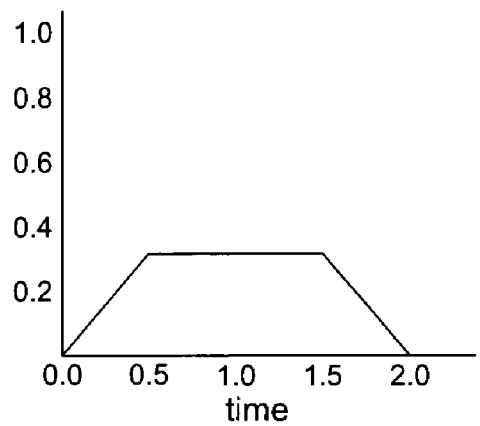
FIGS. 8A–8C are graphs of exemplary engagement density curves.
Figure 8B:
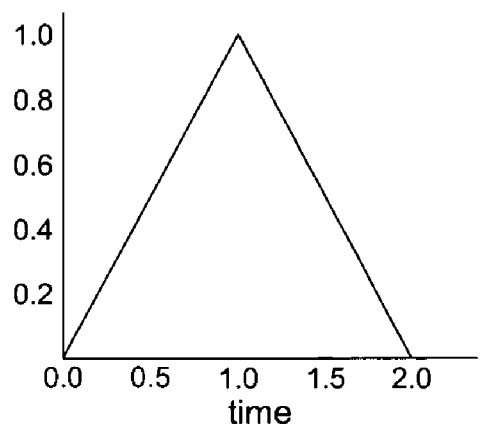
Figure 8C:
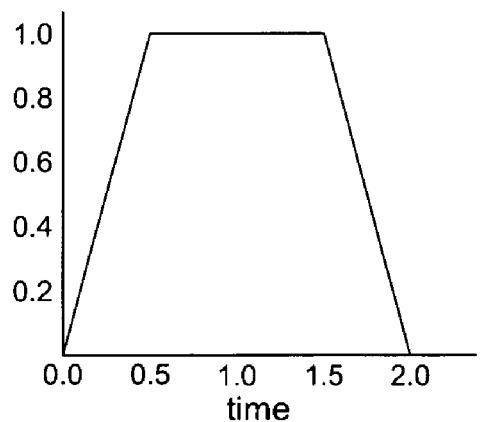

The machine scheduling agent 410 maintains an engagement density curve for each individual engagement FIG. 8A illustrates a first case where the size of the working window is large compared to the size of the kernel (i.e., wws+k<wwe−k). In the density curve of FIG. 8A, the ratio between the kernel width and the working window width is about 25%. The height of the density curve represents the likelihood that the kernel will be processed by the process tool 115 at the given time. As the width of the working window shrinks compared to the size of the kernel, the height of the trapezoid increases until a boundary condition is reached (i.e., wwe−k=wws+k: ratio=50%), and the density curve becomes triangular, as shown in FIG. 8B. As the width of the working window continues the shrink (i.e., $t_e$−k<wws+k), the density curve resumes a trapezoidal form, as shown in FIG. 8C. As seen in FIG. 5C, the kernel is sure to be executed by the process tool process tool 15 during the plateau region (i.e., probability=1). In the density curve of FIG. 8C, the ratio between the kernel width and the working window width is about 75%.

In the illustrated embodiment, the density curve for each engagement is represented as a piecewise linear function comprised of three segments of the form:

$$E(t) = mx + b.$$

Each segment has a segment start time, $s_s$, and a segment end time, $s_e$, and each segment is one of an Initial, Final, or Medial segment of the engagement. Thus, a segment of an engagement is stored as an ordered list with an engagement id, eid, and a segment id, seg (I, F, M):

Engagement Segment=<eid, seg, $s_s$, $s_e$, m, b>.

The parameters for the engagement curves for the first case (i.e., wws+k<wwe−k) are summarized below in Table 1.

TABLE 1

Engagement Density Curve Parameters (Case 1)

| Segment ID | Density(t,k,wws, wwe) = | Condition | Parameters for E(t) = mx + b |
|---|---|---|---|
| Initial | (t − wws)/(wwe − wws − k) | wws ≦ t < wws + k | $s_s$ = wws, $s_e$ = wws + k, |

TABLE 1-continued

Engagement Density Curve Parameters (Case 1)

| Segment ID | Density(t,k,wws, wwe) = | Condition | Parameters for E(t) = mx + b |
|---|---|---|---|
| Medial | k/(wwe − wws − k) | wws + k ≤ t < wwe − k | m = 1/(wwe − wws − k), b = −wws/(wwe − wws − k) $s_s$ = wws + k, $s_e$ = wwe − k, m = 0, b = k/(wwe − wws − k) |
| Final | (wwe − t)/(wwe − wws − k) | wwe − k ≤ t < wwe | $s_s$ = wwe − k, $s_e$ = wwe, m = −1/(wwe − wws − k), b = wwe/(wwe − wws − k) |

The parameters for the engagement curves for the second case (i.e., $t_e$−k<wws+k), are summarized below in Table 2.

TABLE 2

Engagement Density Curve Parameters (Case 2)

| Segment ID | Density(t,k,wws, wwe) = | Condition | Parameters for E(t) = mx + b |
|---|---|---|---|
| Initial | (t − wws)/(wwe − wws − k) | wws ≤ t < wwe − k | $s_s$ = wws, $s_e$ = wwe − k, m = 1/(wwe − wws − k), b = −wws/(wwe − wws − k) |
| Medial | 1 | wwe − k ≤ t < wws + k | $s_s$ = wwe − k, $s_e$ = wws + k, m = 0, b = 1 |
| Final | (wwe − t)/(wwe − wws − k) | wws + k ≤ t < wwe | $s_s$ = wws + k, $s_e$ = wwe, m = −1/(wwe − wws − k), b = wwe/(wwe − wws − k) |

In another boundary case, where the kernel width is the same as the working window width (i.e., wwe−wws=k), the engagement density curve has initial and final segments with zero length and infinite slope. The curve is rectangular with a height of 1 and a width equal to the width of the kernel.

The sum of the engagement density curves for the scheduled engagements of the process tool 115 is referred to as the committed capacity of the process tool 115. A committed capacity curve (CCC) represents the committed capacity as a function of date/time, cc(t). The individual engagements do not include setup time, so the CCC does not reflect process tool capacity that is consumed by setups. This discrepancy may be handled by adjusting the threshold used to determine when the committed capacity is too high, as discussed in greater detail below.

The CCC may be represented as a piecewise linear function computed as the sum of the Engagement Density Curves. To compute this curve, observe first that the sum of two line segments $m_1t+b_1$ and $m_2t+b_2$ is $(m_1+m_2)t+(b_1+b_2)$, so that the sum of a set of linear segments has a slope that is the sum of their slopes and an intercept that is the sum of their intercepts. Thus, an ordered list of all the points in time at which a segment either begins or ends is generated. Each successive pair of such points defines a line segment of cc(t) whose slope is the sum of the slopes of all segments that begin at or before the first point and end at or after the second (i.e., with some minor adjustments to be outlined later).

One technique for managing the CCC process is to form a table with a separate row for each segment start, $s_s$, and each segment end, $s_e$. Thus, each segment generates two rows in the table. The table has one column for each segment currently scheduled on the process tool 115. In addition, the initial column time point, tp, is the $s_s$ or $s_e$ that generated the row. The machine scheduling agent 410 processes the table in the following manner:

1. Sort the table by tp.
2. Delete all but one of any rows with the same tp. Thus, each successive pair of rows corresponds to one linear component in the CCC.
3. For each row, mark each segment's column with '1' if $s_s \leq tp < s_e$, and '0' otherwise. Note that segments with $s_s=s_e$ will all be marked '0' by this rule.
4. The slope of the component in the CCC beginning with a given row is the sum of the slopes of the segments marked '1' in that row, and its intercept is the sum of the intercepts of those segments. Since no segment with $s_s=s_e$ will ever be marked '1', Initial or Final segments with infinite slopes are excluded from this summation and do not cause any problems. The CCC may have vertical steps, but its value at a time, t, that falls at the junction of two segments is the value of the segment that starts at t, so these vertical steps do not cause problems.

Mathematically, this computation can be expressed as a matrix multiplication. Let T be an {r×s} matrix defined using the table described above, without its first column (i.e., containing only the 1's and 0's, with the r rows indexed by time and the s columns by segment). Let S be a {s×2} matrix with one row for each segment, containing the segment's slope in the first column and the segment's intercept in the second. Then, T×S is a {r×2} matrix whose first column describes the slope of the CCC component beginning at the time represented by that row, and whose second column is the intercept of that component.

Each segment is of the form:

Committed Capacity=$m$*Time+$b$

Each segment is represented as:
$T_s$=starting date/time of line segment;
$T_e$=ending date/time of line segment;
m=slope; and
b=intercept,
where $T_s<T_e$.

For batching or setup optimization, a separate CCC is maintained for each type of lot 130.

Two lots 130 are of the same type with respect to batching if they could be in the same batch.

Two lots 130 are of the same type with respect to setup optimization if they could share a setup.

When constructing a bid 435 for a lot 130 of a given type for a process tool 115 that must support batching or setup optimization, the machine scheduling agent 410 adds all the CCCs that are not of the type under consideration into a CCC that defines ccDiff (i.e., the percentage of the resource's capacity over time that is committed to engagements of a different type). The CCC for the lots 130 of the same type is then defined as ccSame. The total utilization is the sum of the same and different components:

$$cc = ccDiff + ccSame.$$

Each ccDiff or ccSame is made up of contiguous segments $ccDiff_i$ or $ccSame_i$, and each segment has its own slope $mDiff_i$ or $mSame_i$ and intercept $bDiff_i$ or $bSame_i$. Segment i applies to all times $t_i$ such that:

(start of segment $i$) $\leq t_i <$ (end of segment $i$).

The equations for segments of ccDiff and ccSame are:

$$CcDiff_i(t_i) = mDiff_i * t_i + bDiff_i; \text{ and}$$

$$CcSame_i(t_i) = mSame_i * t_i + bSame_i,$$

where ($mDiff_i$, $bDiff_i$) are computed by considering all segments that differ in kind from the lot 130 and ($mSame_i$, $bSame_i$) are computed by considering all segments that are of the same kind.

The slope, m, and intercept, b, and their related mDiff and bDiff can be viewed as functions of time whose values are constant over each segment. Thus, the CCC can be represented as:

$$cc(t) = m(t) * t + b(t),$$

and similarly for ccSame and ccDiff.

If a process tool 115 is being optimized for both batching and setup, four cc curves need be represented: ccSameBatch, ccDiffBatch, ccSameSetup, and ccDiffSetup, each with its own set of segments and associated values for (m, b).

The discussion now turns to a more detailed description of the RTU function. As introduced above, the machine scheduling agent 410 uses the RTU function to define the dollar rate per unit of processing time based on the committed capacity of the process tool 115. RTU is represented as a normalized sum of one or more convex exponential functions. The specific characterization of the exponential functions is application dependent, as the desired bidding behavior may vary depending on the particular implementation. In general, the RTU is designed such that the sum of the individual functions reflects the desired bidding behavior. The entire sum is then normalized to the desired rates. Hence, different embodiments may include different numbers of functions with different parameters.

In one embodiment, a simple RTU for a process-operation with no batching and no setup optimization may consist of a single increasing convex exponential of total process tool utilization, U. The increasing nature of the RTU raises the price as the process tool 115 becomes more fully committed. This basic RTU is also the foundation of RTUs for batching or setup optimization, since they must also take account of congestion.

To encourage lots 130 of the same type to move close to one another (for batching or setup optimization), several component functions are defined and summed to generate the RTU:

incV(cc)—the base RTU, to avoid congestion;
decV(ccSame)—to encourage lots 130 of the same type to schedule engagements near each other; and
incV(ccDiff)—to discourage lots 130 of different types from scheduling engagements near each other.

In some embodiments, it is useful to use two decreasing functions of ccSame with different steepness parameters. A high steepness parameter gives a sharp drop-off so that once one lot 130 of a given type is scheduled on the process tool 115, other lots 130 will be strongly attracted. The bottom of such a curve is relatively flat. An additional function with a low steepness parameter helps ensure that the bottom of the curve is sloped, so that as the concentration of lots 130 of a given type grows, new lots 130 are even more likely to be attracted.

Figure 9:
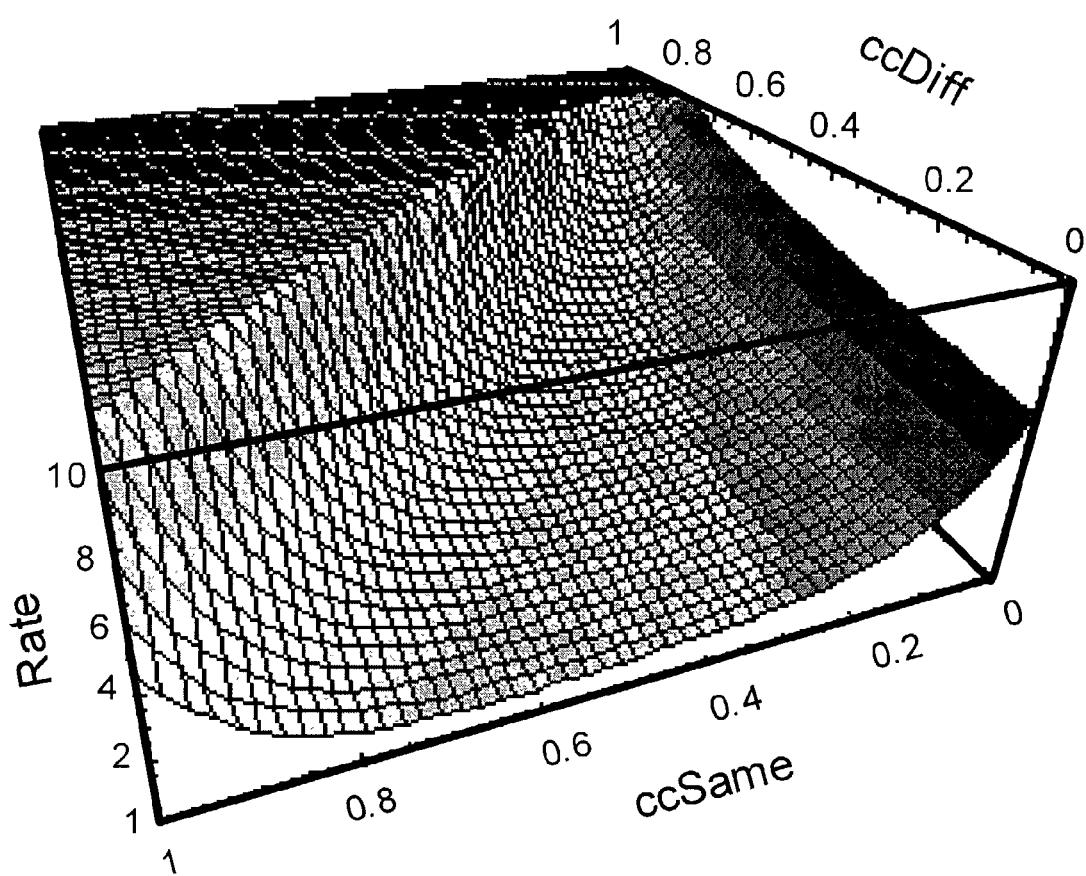
FIG. 9 is a graph illustrating a rate per time unit function.

The result of summing these three functions is a function of two variables, ccSame and ccDiff (i.e., cc is just the sum of these two). Such an RTU function may be graphed as a surface over an x-y plot using a mathematical tool such as Microsoft® Excel® or Mathematica®, and the surface may be manipulated in such a tool to select the correct parameters. The objective of such a characterization step is to get an RTU of the correct shape without focusing on the exact values. FIG. 9 illustrates an exemplary RTU function as a function of ccSame and ccDiff.

To optimize both setup and batch optimization, additional parameterized exponential functions are included in the RTU. The fixed parameters provided below are merely illustrative values that may vary depending on the particular implementation. The RTU includes a congestion factor, batch factors and setup factors. The congestion factor is the same for either Same/Different pair, since either pair sums to the same overall utilization.

Congestion Factor:
incV[ccSameSetup+ccDiffSetup, 10, 1, 100,0]
Batch factors:
decV[ccSameBatch, 10, 0, 100,0] (i.e., to favor same type)
decV[ccSameBatch, 1, 0, 50,0] (i.e., to add a decreasing slope)
incV[ccDiffBatch, 1, 1, 200,0] (i.e., to discourage different type)
Setup factors:
decV[ccSameSetup, 10, 0, 100,0] (i.e., to favor same type)
decV[ccSameSetup, 1, 0, 50,0] (i.e., to add a decreasing slope)
incV[ccDiffSetup, 1, 1, 200,0] (i.e., to discourage different type)

The sum of the congestion batch and setup factors is normalized on the basis of desired minimum and maximum values, desMin and desMax, described above, and the observed Min and Max values of the raw sum of PEFs. Since the RTU is made up of convex PEFs, the maximum of the sum is meaningful only over a given range of arguments, which is also specified. In the illustrated examples the value of the sum when all arguments are 0 is defined as the Max. Then, the normalized RTU is given by:

desMin+(desMax−desMin)*(sum(PEFs)−Min)/(Max−Min).

A process tool 115 that is underutilized in the near future has little time to find engagements that can use that capacity, and may choose to offer an "urgency discount" during that period to attract engagements. The urgency discount is applied as a multiplicative factor to the BCF. The urgency discount is an increasing function of both cc and time, with a maximum value of 1. However, since cc is a function of time, the urgency discount may be expressed as a function of time alone.

The machine scheduling agent 410 computes the urgency discount as the minimum of 1 and the sum of two incC PEFs. The argument of one PEF is cc(t), while the argument of the other is simply t. In general, parameter selection for the PEFs is guided by the factors:

$x_0=0$ for both PEFs $y_0$ is chosen for each PEF so that the sum of $y_0$ for both functions is the maximum discount permitted (e.g., for a 50% discount at t=0 and 0 utilization, $y_0=0.25$ on both PEFs)

steepness, s, is greater for the cc(t) PEF than for the PEF driven solely by t.

The urgency discount function, UDF(t), used in the illustrated embodiment is:

$$UDF(t)=\text{Min}(1, \text{incC}(cc(t), 3, 0, 0.25, 1)+\text{incC}(t, 0.1, 0, 0.25, 0.75)) \quad (1)$$

Since the machine scheduling agent 410 knows cc(t), it can build the urgency discount into the BCF that it reports to the lot 130. The urgency discount reflects the cc(t) of the process tool 115 without the new lot 130, since its function is to attract the lot 130 to the process tool 115 to fill otherwise unused capacity.

The machine scheduling agent 410 may wish to give a flexibility discount (or inflexibility penalty) to engagements depending on the flexibility. The lower the ratio of kernel width to total window width for an engagement, the more flexibility the process tool 115 has to avoid conflicts by shifting the kernel. The flexibility factor is defined by:

$p\text{Wind}=\text{kernel width/window width}.$

A simple flexibility discount may be implemented by multiplying the BCF by an inc V function, such as the one shown in FIG. 5B. The desired level of flexibility is constrained by an x-factor of the process flow 100. The x-factor of the process flow 100 is the ratio of a planned cycle time to a theoretical cycle time. The planned cycle time is the expected elapsed time between starting and finishing a lot 130 of the given product and lot priority in the process flow 100 for the product. The theoretical process time is the sum of the processing times, or kernels, for all the process steps in the process flow 100. In the illustrated embodiment, the planned cycle time is distributed across process-operations, and the average commitment window is the kernel width times the x-factor. Thus, the appropriate p Wind value for a given x-factor is just 1/x-factor. For example, if the target x-factor of the process flow 100 is 4, an exemplary FDF may be defined as:

$$FDF(p\text{Wind})=\text{inc}V(p\text{Wind}, 1.5, 0.25, 1, 0). \quad (2)$$

In an alternative embodiment, each process-operation may have a queue time, which is the expected time a lot waits before processing starts. In such an embodiment, pWind may be calculated by:

$p\text{Wind}=\text{kernel time/(queue time+kernel time)}.$

Figure 10:
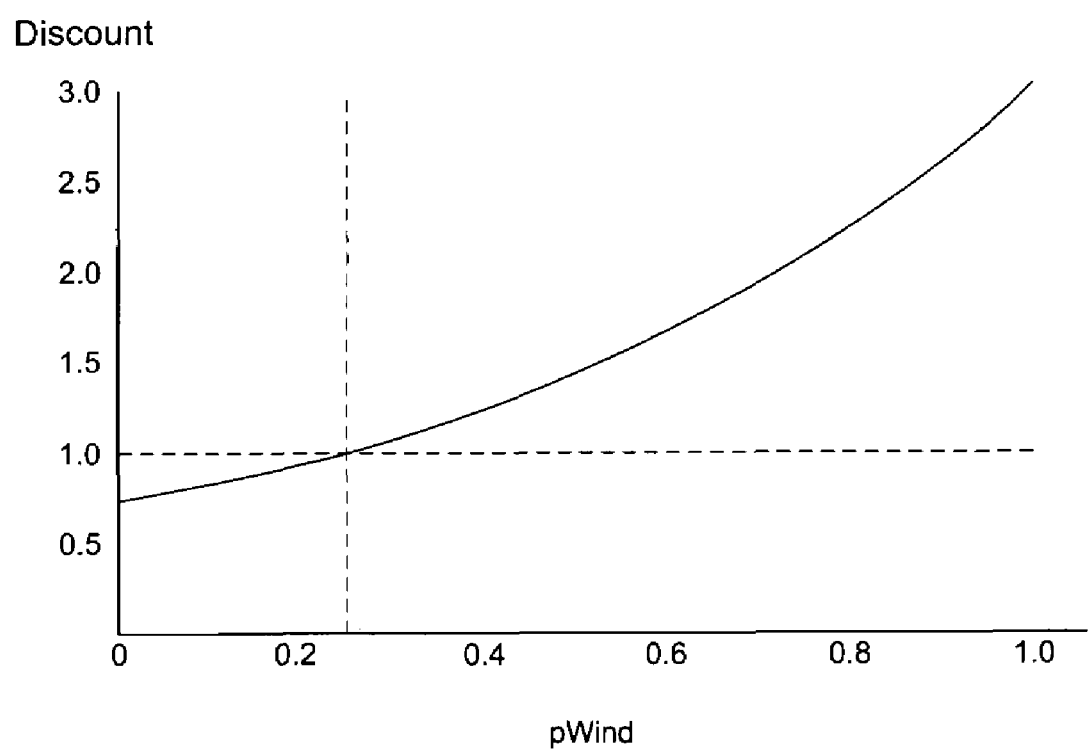
FIG. 10 is a graph illustrating a flexibility discount function.

FIG. 10 illustrates the shape of this exemplary FDF. In this example, the FDF returns a multiplier of 1 for pWind=0.25 (i.e., where the dashed lines intersect, representing an x-factor of 4). Lots 130 that offer more flexibility than this level (i.e., pWind<0.25) have their costs multiplied by a factor less than 1. Thus, they receive a discount. Conversely, lots 130 that offer less flexibility than this level (pWind>0.25) see their costs multiplied by a factor greater than 1, and thus experience a penalty.

The relationship, pWind=1/x-factor, suggests that these penalties and discounts are backwards, since we are giving a discount for pWind less than the target, which corresponds to a higher x-factor. The expected x-factor helps predict what level of flexibility is expected, and enables allocation of flexibility fairly across lots 130. But the more flexibility a process tool 115 is given, the better throughput and utilization it can achieve, and the lower its contribution to the overall x-factor.

The machine scheduling agent 410 cannot know what pWind a consumer may choose. Thus, it cannot build the FDF into the BCF, but must pass the FDF to the consumer, which evaluates it and multiplies the BCF by the FDF in estimating the desirability of various candidate engagements.

The BCF, discussed above, defines the cost of processing per unit time (hourly rate) as a function of the date/time when processing occurs. The BCF is represented as an x/y table over evenly spaced time intervals. If the time interval is small enough, the BCF may be considered constant within the interval. This approach may allow the BCF math to be performed with simple matrix algebra operations. Interpolation between coarsely spaced points is not generally conducted, because the BCF may reverse its direction frequently.

The BCF is computed by applying the RTU function to the Committed Capacity Curve (CCC) as follows. In the following example, it is assumed that optimizing for both batching and setup occurs. If not, the unused values are omitted. The x values of the BCF table are computed at intervals of $\Delta t$ at times, $t_i=t0+i*\Delta t$, where i ranges from 0 to N−1 for a table with N entries, and with $\Delta t$ chosen small enough that the cost at $t_i$ is an acceptable estimate for the entire interval $t_i \leq t < t_{i+1}$. For notational clarity, mX and bX are represented as functions of time. The procedure for computing the BCF includes:

1. Compute the various cc(t) values:

$$cc\text{SameBatch}(t_i)=m\text{SameBatch}(t_i)*t_i+b\text{SameBatch}(t_i) \quad (3)$$

$$cc\text{DiffBatch}(t_i)=m\text{DiffBatch}(t_i)*t_i+b\text{DiffBatch}(t_i) \quad (4)$$

$$cc\text{SameSetup}(t_i)=m\text{SameSetup}(t_i)*t_i+b\text{SameSetup}(t_i) \quad (5)$$

$$cc\text{DiffSetup}(t_i)=m\text{DiffSetup}(t_i)*t_i+b\text{DiffSetup}(t_i) \quad (6)$$

$$cc(t_i)=cc\text{SameBatch}(t_i)+cc\text{DiffBatch}(t_i) \quad (7)$$

2. Evaluate the RTU at the appropriate cc(t) values and multiply by the urgency discount, UDF(t). This multiplication may take place either in the lot scheduling agent 405 or in the machine scheduling agent 410. The UDF describes the state of the process tool 115, not the lot 130, so philosophically this computation belongs in the machine scheduling agent 410. However, the machine scheduling agent 410 is more likely to be constrained by computational capacity than the lot scheduling agent 405. In general, it is expected that the number of lots 130 considering using a process tool 115 at a given time will be greater than the number of process tools 115 available to a lot 130 for a given process-operation, so lots 130 will have fewer bids 435 to evaluate per bidding cycle than will process tool 115. Hence, the load may be better balanced if the lot scheduling agent 405 performs some computations that might typically be associated with the machine scheduling agent 410. However, in some embodiments, the machine scheduling agent 410 may be configured to compute the UDF.

$$BCF(t_i)=UDF(t)*RTU(cc(t_i), cc\text{SameBatch}(t_i), cc\text{DiffBatch}(t_i), cc\text{SameSetup}(t_i), cc\text{DiffSetup}(t_i)) \quad (8)$$

To evaluate the BCF at time t, $t_i$ is chosen such that $t_i \leq t < t_{i+1}$, and the value in the BCF table at time $t_i$ is used.

Figure 11:
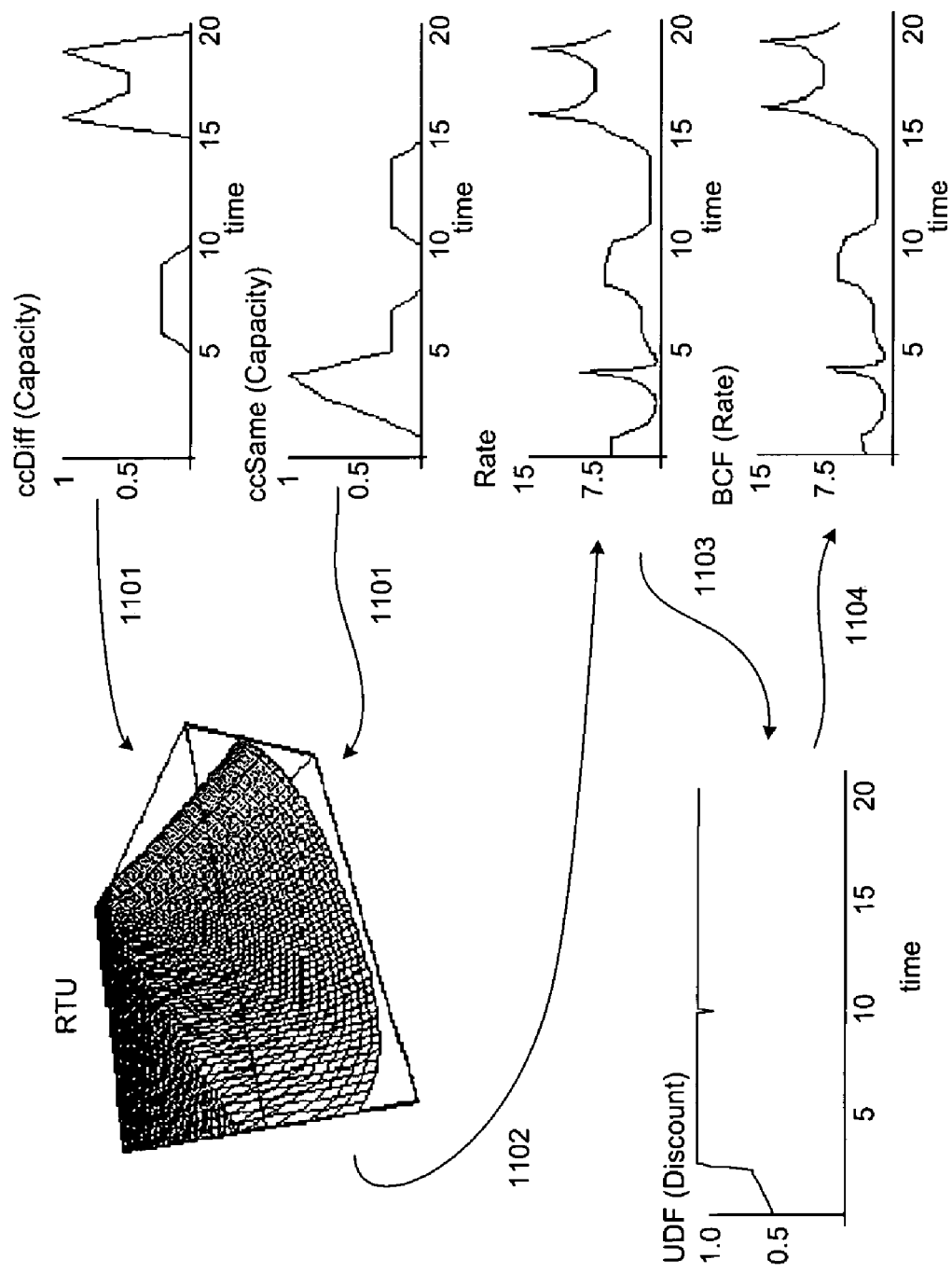
FIG. 11 is a simplified flow diagram illustrating the computing of a basic cost function.

FIG. 11 conceptually illustrates the flow for computing the BCF. The machine scheduling agent 410 passes the values for ccSame and ccDiff to the RTU function in step 1101. In step 1102, the machine scheduling agent 410 calculates a rate function using the RTU. In step 1103, the machine scheduling agent 410 multiples the rate by the urgency discount function (UDF) and generates the BCF in step 1104. Subsequently, the machine scheduling agent 410 passes the BCF to the lot scheduling agent 405 which, in turn, searches the BCF to identify candidate bids. The lot scheduling agent 405 may also apply a flexibility discount, FDF depending on the size of the commitment window it selects.

The bid construction phase of the machine scheduling agent 410 is now described in greater detail. The machine scheduling agent 410 receives a request bid message 425 and responds by returning the bid 435.

In its bid 435, the machine scheduling agent 410 returns a slice of the RTU function at the current ccDiff$_{avg}$, as well as the portion of the BCF function that includes the time interval [EST, LDT]. This "slicing" is illustrated using the joint batch/setup scenario RTU discussed above. The normalization constants are not affected by slicing, and only the unnormalized sum is considered here. The machine scheduling agent 410 computes the constants ccDiffBatch$_{avg}$ and ccDiffSetup$_{avg}$ over the time period [EST, LDT]. Then the unnormalized sum becomes the following (where underlined expressions become constants because of the slicing):

Congestion factor:
incV[ccSameSetup, 10, 1−ccDiffSetup$_{avg}$, 100,0]
Batch factors:
decV[ccSameBatch, 10, 0, 100,0];
decV[ccSameBatch, 1, 0, 50,0];
incV[ccDiffBatch$_{avg}$, 1, 1, 200,0];
Setup factors:
decV[ccSameSetup, 10, 0, 100,0];
decV[ccSameSetup, 1, 0, 50,0];
incV[ccDiffSetup$_{avg}$, 1, 1, 200,0].

If the process tool 115 is not capable of batch processing, the three batch factors are eliminated. If the process tool 115 does not require setup time to change setups, the three setup factors are eliminated.

The machine scheduling agent 410 computes EST by determining the expected Transport Time, TT, between the last location and the current process tool 115 and then adds this Transport Time, TT, to the Transport Start Time, TST, provided in the request bid message 425. If the process tool 115 requires loading time, then the expected loading time, ELT, is also added $$EST = TST + TT + ELT.$$

The machine scheduling agent 410 computes the average committed capacities ccSameSetup$_{avg}$ and ccDiffSetup$_{avg}$ (as well as ccSameBatch$_{avg}$ and ccDiffBatch$_{avg}$ if it is a batching machine) within the time window [EST, LDT] using the data maintained in the list of engagements for the process tool 115. Each average is the weighted average of the segments of the corresponding Committed Capacity Curve in the interval [EST, LDT]. The average committed capacity of each segment is weighted by the size of the time interval that defines the endpoints of the segment. For each complete segment, the average committed capacity ccX$_{seg}$ for the segment defined by the interval [$t_s$, $t_e$] (where X is SameBatch, DiffBatch, SameSetup, or DiffSetup) is:

$$ccX_{seg} = ccX[(t_s + t_e)/2],$$

and the weight of the segment is:

$$W_{seg} = (t_e - t_s).$$

The average committed capacity, ccX$_{avg}$, is computed from all whole segments between EST and LDT plus at most two partial segments if EST and/or LDT fall within the time boundaries of a segment. Assuming EST falls within a segment $y = a_s x + b_s$ bounded by [$ts_s, te_s$] and LDT falls within a segment $y = a_e x + b_e$ bounded by [$ts_e, te_e$]. The average committed capacity, ccX, and weight W of these partial segments EST and LDT are:

$$ccX_{EST} = (ccX[EST] + ccX[te_s])/2;$$

$$ccX_{LDT} = (ccX[ts_e] + ccX[LDT])/2;$$

$$W_{EST} = (te_s - EST); \text{ and}$$

$$W_{LDT} = (LDT - ts_e).$$

Then, the average committed capacity, ccX$_{avg}$, within the interval [EST, LDT] is:

$$ccX_{avg} = (ccX_{EST} * W_{EST} + ccX_{LDT} * W_{LDT} + \Sigma(ccX_{seg,i} * W_{seg,i}))/(W_{EST} + W_{LDT} + \Sigma W_{seg,i}),$$

where the summation is over all whole segments between EST and LDT.

The discussion now turns to the actions of the lot scheduling agent 405 and the machine scheduling agent 410 in confirming a bid 435. When a lot scheduling agent 405 awards a bid 435 to a process tool 115, the machine scheduling agent 410 confirms the award if the lot 130 can afford the actual cost of the bid 435 and the actual cost has not increased by more than a configurable percentage of the original cost. The engagement returned by the lot scheduling agent 405 to the machine scheduling agent 410 for bid confirmation defines a piecewise linear function of time E(t), as outlined in further detail below.

The machine scheduling agent 410 calculates the actual cost of the engagement using the following steps. In recalculating various functions, the machine scheduling agent 410 must cache the previous values and be able to restore them in case the bid 435 is not confirmed.

a) Recalculate the urgency discount as outlined above in Equation 1 using the cc(t) function in effect at the time the lot 130 awards the bid 435 to the process tool 115. Note that this may be a different cc(t) function than the one used in computing the urgency discount originally offered to the lot, since if the lot has been sluggish in responding, other lots 130 may have filled up the short-term lack of work. However, this engagement is not included in the cc(t) function used in computing the urgency discount. Thus, this step must precede the following one.

b) Recalculate the ccSameX(t), ccdiff(X(t), and cc(t) functions including the new engagement, as defined in Equations 3–7 above. Note that ccDiffX(t), where X=batch or setup, does not change as a result of the lot 130, and therefore, it may not require recalculation.

c) Calculate a new BCF as defined in Equation 8 above by evaluating the RTU function with the new committed capacity values calculated in step b.

d) Calculate the flexibility discount FD on the basis of the new engagement, as defined by Equation 8 above.
e) Compute the total cost of the engagement:

$$C=FD*\Sigma(BCF(t)*E(t)),$$

where the summation is over all entries in the BCF table such that $t_s \leq t < t_e$.

The machine scheduling agent 410 denies the award if the lot 130 does not have sufficient budget to afford it or if the actual cost has increased more than a configurable percentage of the original cost.

Another important feature of the machine scheduling agent 410 is to monitor the committed capacity of the process tool 115 to determine if it has overcommitted its resources. Each time a change occurs to the committed capacity of the process tool 115, the machine scheduling agent 410 runs a background task that looks for regions of violation (ROVs) where the committed capacity curve exceeds the maximum capacity of the machine, and generates candidate moves of selected engagements to try to reduce or eliminate each ROV.

The "maximum capacity" of process tool 115 i is defined as:

$$MaxCap_i = MaxLots_i - SetupAllowance_i - SafetyAllowance_i, \text{ where}$$

MaxLots is the maximum number of lots 130 that the process tool 115 can process concurrently. For non-batching process tools 115, MaxLots=1. For batching process tools 115, MaxLots is the size of a full batch.

SetupAllowance adjusts for the fact that the kernels for individual lots 130 do not include setup (because an individual lot 130 cannot know whether or not it will need a new setup). Computation of the SetupAllowance is discussed below.

SafetyAllowance is a tuning factor. The Committed Capacity curve is a heuristic estimate of the availability of the process tool 115. Sometimes a process tool 115 may not be able to process a lot 130 even in a period where there is no ROV. Increasing the SafetyAllowance reduces the likelihood of such an event. Conversely, a negative SafetyAllowance permits a process tool 115 to overbook intentionally. Initially, SafetyAllowance should be set to a value reflecting the historical level of unplanned downtime on the resource.

To compute the SetupAllowance, observe that a setup can be viewed as a task that completely consumes the capacity of the process tool 115 (MaxLots) for the duration of the setup. If, on average, the process tool 115 spends s % of its time in setup operations, its overall capacity is reduced by:

$$SetupAllowance = s*MaxLots/100.$$

Each process tool 115 maintains a Exponentially Weighted Moving Average (EWMA) of the percentage of its time it spends in setup, and uses the latest value of this average to compute MaxCap each time it scans its schedule of engagements for ROVs. For example, if the ith estimate of s is $s_i$ and the resource has spent x % of its time in setup since $s_i$ was calculated, the next estimate of s is given by:

$$s_{i+1} = (1-\lambda)s_i + \lambda x = 0.8 s_i + 0.2 x,$$

where Lambda is set at 0.2 in the illustrated embodiment. Of course other values of Lambda may be used for the EWMA.

The process the machine scheduling agent 410 uses for selecting candidate moves to reduce an ROV includes the following steps:

a) Find a region where the CCC exceeds MaxCap.
b) Calculate the ROV Area, the area of the CCC above MaxCap.
c) Identify all engagements with working windows that overlap the region of violation, and compute their contribution to the ROV. The contribution of engagement i to the ROV is $ROV_i$.
d) For each engagement i with an overlapping working window, determine zero or more moves the engagement could make to reduce $ROV_i$. An engagement can provide more than one move. Moves can be:
  shift left (move the entire WW left without changing its size);
  shift right (move the entire WW right without changing its size);
  shrink left (shrink the WW by moving its right end to the left); and
  shrink right (shrink the WW by moving its left end to the right).
  A move to expand left or right is typically not permitted in order to avoid oscillation. The following heuristics should be used for moves depending on the way the working window (WW) overlaps with the ROV. There are four cases:
  Case 1: WW overlaps from left side of ROV.
    Options are shift or shrink left.
  Case 2: WW overlaps from right side of ROV.
    Options are shift or shrink right.
  Case 3: WW overlaps entirely within ROV.
    Options are shift left or right.
  Case 4: WW overlaps from both sides of ROV.
    Options are shift left, shrink left, shrink right, or shift right.
  An exemplary technique for computing the amount of shift or shrinkage necessary on a given engagement to release a specified amount of ROV area is discussed in greater detail below. In general, the technique includes, for each engagement i, computing each candidate move j to provide the maximum area $\Delta A_{i,j}$, up to the total contribution available from engagement i $ROV_i$, allowed within the constraints of engagement i's commitment window.
e) Compute the change in cost for each move i considered.
  To compute the change in cost:
  Compute the base $C_1$, the cost of the unmodified engagement using its BCF and the flexibility discount, FDF, appropriate to its pWind. This cost is the same for all candidate moves generated from a single engagement.
  Compute the new BCF that would be in effect for the moved engagement. This computation involves computing the new ccX curves, evaluating the RTU, and applying the urgency discount.
  Compute $C_{2i}$, the cost of the new engagement generated by move i, using the new BCF and the flexibility discount appropriate to the new pWind.
  The change in cost is $\Delta C_i = C_{2i} - C_1$.
  The machine scheduling agent 410 chooses the one move that provides the minimum cost per area resolved $\Delta C_i / \Delta A_i$ and executes that move.

This ends an iteration of ROV resolution. The machine scheduling agent 410 may decide that it is not feasible to resolve an ROV. A configurable control MinROVpercent defines the minimum percentage of the ROV area that a candidate move must return. If the process tool 115 has no move options, or if the best move option returns less than MinROVpercent of the ROV area, the process tool 115 gives up on resolving the ROV and cancels one of the engagements contributing to the ROV, paying the penalty refund described above. The engagement cancelled should be the engagement with the lowest priority, which means the lot 130 with the minimum "normalized" budget, i.e., budget per unit of processing (kernel) time.

Figure 12:
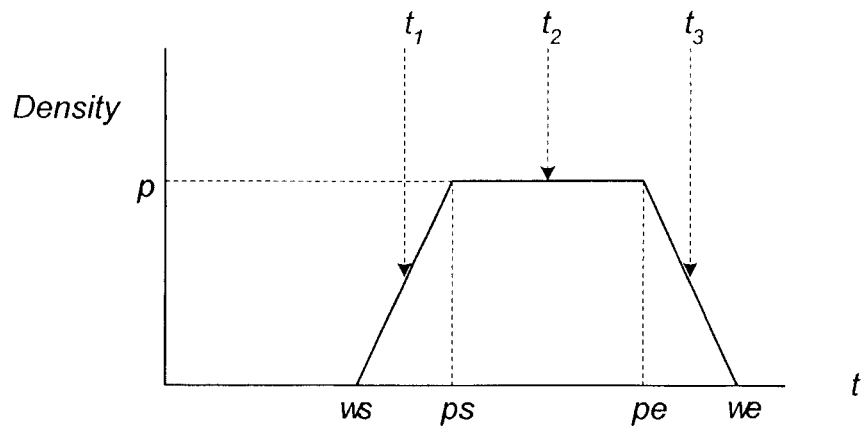
FIG. 12 is a diagram illustrating parameters for defining an engagement density curve.

The technique for resolving ROVs is now described in greater detail in reference to FIG. 12, which shows an exemplary engagement density curve. In general, the engagement density curve is a trapezoid (i.e., although in a special case, it may be a triangle), with the distinguishing parameters shown in FIG. 12. Three items constitute the definition of an engagement:
ws: window start
we: window end
k: kernel width (not visible in FIG. 12).
Several other parameters can be derived from these:
s: slack=we−ws−k (excess room in the window). The slack, s, is a critical factor in the overall shape of the curve. When s=k, the engagement is a triangle, otherwise it is a trapezoid, but the parameters of the trapezoid differ depending on whether s<k or s>k.
p: plateau height=Min(k/s, 1). When s<k, p=1, otherwise p=k/s.
ps: plateau start=Min(ws+k, we−k). When s<k, ps=we−k, otherwise ps=ws+k.
pe: plateau end=Max(ws+k, we−k). When s<k, pe=ws+k, otherwise pe=we−k.

Note that s*p=Min(s, k), as this will be used in simplifying equations below.

Figure 13:
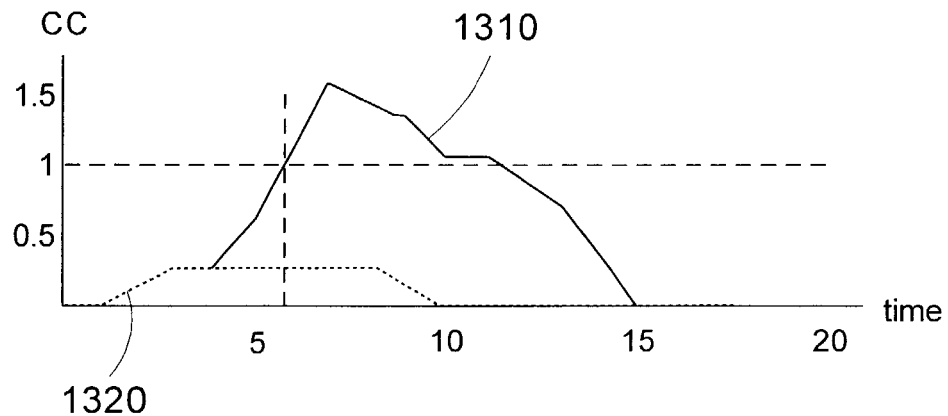
FIG. 13 is a diagram of an engagement density curve for a process tool with multiple scheduled engagements that exceed the capacity of the process tool.

FIG. 12 also identifies three possible time intervals:
ws<$t_1$<ps
ps<$t_2$<pe
pe<$t_3$<we The curve is constructed so that the total area under it is k. When it partially overlaps an ROV, we need to compute the area it contributes to the overlap. This computation amounts to evaluating the area between t and one end or the other of the engagement, where t is the edge of the ROV. Without loss of generality, the case where the ROV is to the right of t, so that the area required is between t and we is considered. FIG. 13 illustrates a prototypical situation with an ROV. The curve 1310 is the overall cc(t) curve, the horizontal and vertical lines show where cc(t)>1 at t=5.76, and the trapezoid 1320 is one of the engagements that make up cc(t), with ws=1, we=10, and k=2.

To determine the amount of overlap between the trapezoid 1320 and the ROV, a function to compute the area extending into the ROV is developed.

RightArea(t, ws, we, k).

All of the functions defined below are functions of (t, ws, we, k), but at this point only the dependence on t is examined. For clarity and ease of illustration the last three arguments are omitted.

The area of the curve can be divided into the plateau region and the two ramps. The ramps are symmetrical. Each has the area:

RampArea=$p*(ps-ws)/2$.

The second factor may be simplified as:

$(ps-ws)$=Min$(ws+k, we-k)-ws$=Min$(k, we-ws-k)$
=Min$(k, s)=s*p$.

Substituting this result into the RampArea equation yields:

RampArea=Min$(k/s, 1)*$Min$(k, s)/2=s*p^2/2$.

The central plateau has the area:

PlateauArea=$p*(pe-ps)$.

Again, the equation may be simplified as:

$(pe-ps)$=Max$(ws+k, we-k)-$Min$(ws+k, we-k)=|(ws+k)-(we-k)|=|k-(we-ws-k)|=|k-s|$, resulting in:

PlateauArea=Min$(k/s, 1)*|k-s|=p*|k-s|$.

Note that when s<k, $|k-s|=k-s$, otherwise $|k-s|=s-k$.

Figure 14:
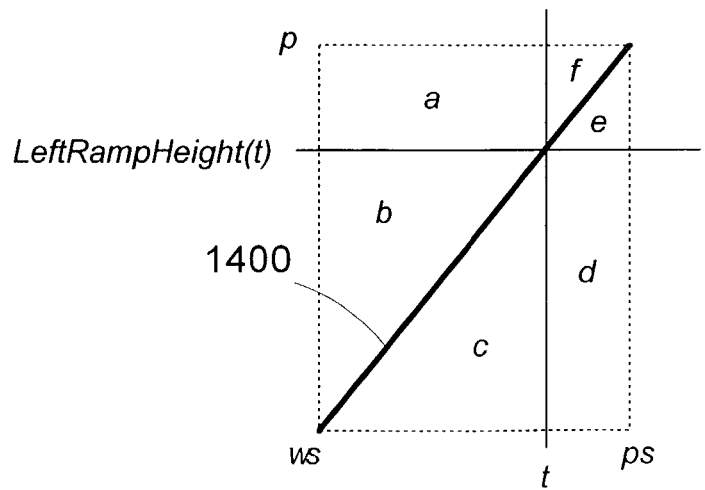
FIG. 14 is a diagram of a portion of an engagement density curve used to calculate an area under the curve.

Partial overlap regions may occur if t falls in the middle of a ramp or of a plateau. If t occurs somewhere in the middle of a ramp, the ramp is divided into two parts. Consider a left-hand ramp 1400, between ws and ps, as shown in FIG. 14. The ramp 1400 is linear, so for ws<t<ps, the height of the ramp at t is just the total height multiplied by the proportion of the distance that t is from ws to ps.

LeftRampHeight$(t)=p*(t-ws)/(ps-ws)=(t-ws)/s$

The ramp 1400, the vertical line at t, and the horizontal line at LeftRampHeight divide the box p*(ps−ws) into six lettered regions a-e. The area to the left of t, area c, is referred to as the LeftRampLeftArea(t), and is defined by:

LeftRampLeftArea$(t)$=LeftRampHeight$(t)*(t-ws)/2=(t-ws)^2/(2*s)$.

The area of the remaining portion of the ramp 1400, areas d and e may be calculated by:

LeftRampRightArea$(t)$=RampArea$(t)-$LeftRampLeftArea$(t)=s*p^2/2-(t-ws)^2/(2*s)$ By symmetry, the right ramp parameters are:

RightRampHeight$(t)=(we-t)/s$,

RightRampRightArea$(t)$=RightRampHeight$(t)*(we-t)/2=(we-t)^2/(2\ s)$, and

RightRampLeftArea$(t)=s\ p^2/2-(we-t)^2/(2\ s)$.

The other partial overlap situation occurs when t is in the middle of the plateau. This case is simpler, since the plateau height is a constant. The partial plateau area is computed by:

$$PlateauLeftArea(t) = PlateauArea*(t-ps)/(pe-ps)$$
$$= \text{Min}(k/s, 1)*|k-s|*(t-ps)/|k-s|$$
$$= \text{Min}(k/s, 1)*(t-ps)$$
$$= p*(t-ps); \text{ and}$$
$$PlateauRightArea(t) = PlateauArea*(pe-t)/(pe-ps)$$
$$= \text{Min}(k/s, 1)*(pe-t)$$
$$= p*(pe-t).$$

As FIG. 12 shows, the shape of the curve changes discontinuously at ps and pe. Four cases may be distinguished, depending on where t falls on the engagement being evaluated. In each case, the overall area to the right or left of t may be determined either by adding together a combination of whole and partial regions, or by subtracting a partial region from the known area k of the whole trapezoid.

Case 1: ws<t<ps:

RightArea1(*t*)=*k*−LeftRampLeftArea(*t*)=*k*−(*t*−*ws*)²/(2\**s*)

LeftArea1(*t*)=LeftRampLeftArea(*t*)=(*t*−*ws*)²/(2\**s*)

Case 2: ps<t<pe:

RightArea2(*t*)=PlateauRightArea(*t*)+RampArea=*p*\*(*pe*−*t*)+*s*\**p*²/2

LeftArea2(*t*)=RampArea+PlateauLeftArea(*t*)=*s*\**p*²/2+*p*\*(*t*−*ps*)

Case 3: pe<t<we:

RightArea3(*t*)=RightRampRightArea(*t*)=(*we*−*t*)²/(2*s*)

LeftArea3(*t*)=*k*−RightRampRightArea(*t*)=*k*−(*we*−*t*)²/(2*s*)

Case 4: t<ws (ww overlaps entirely within ROV):

RightArea4(*t*)=*k*

LeftArea4(*t*)=0

The situation shown in FIG. 13 falls in Case 2, and RightArea2(t=5.76, 1, 10, 2)=0.93.

There are two mechanisms for reducing the area that an engagement contributes to cc(t): shifting the whole engagement (presumably because the working window is smaller than the commitment window) and shrinking the working window. In the example scenario of FIG. 13, where the engagement is on the left end of the ROV, the engagement may be shifted left or shrunk by moving its right end to the left. The machine scheduling agent 410 calculates how much to shift or shrink the working window to realize a required amount of ROV reduction.

The excess area in the ROV is shown in FIG. 13 (the area under cc(t) but above cc(t)=1) is 6.24. By shifting the engagement represented by the trapezoid 1320 entirely out of the ROV area, 0.93 could be recovered as indicated above. However, in general, it may be desirable to take only a portion of the available area reduction. Up to now the functions have been in the form of area=f(t). To determine desired area recoveries, functions of the form t=g(area) are developed.

Figure 15:
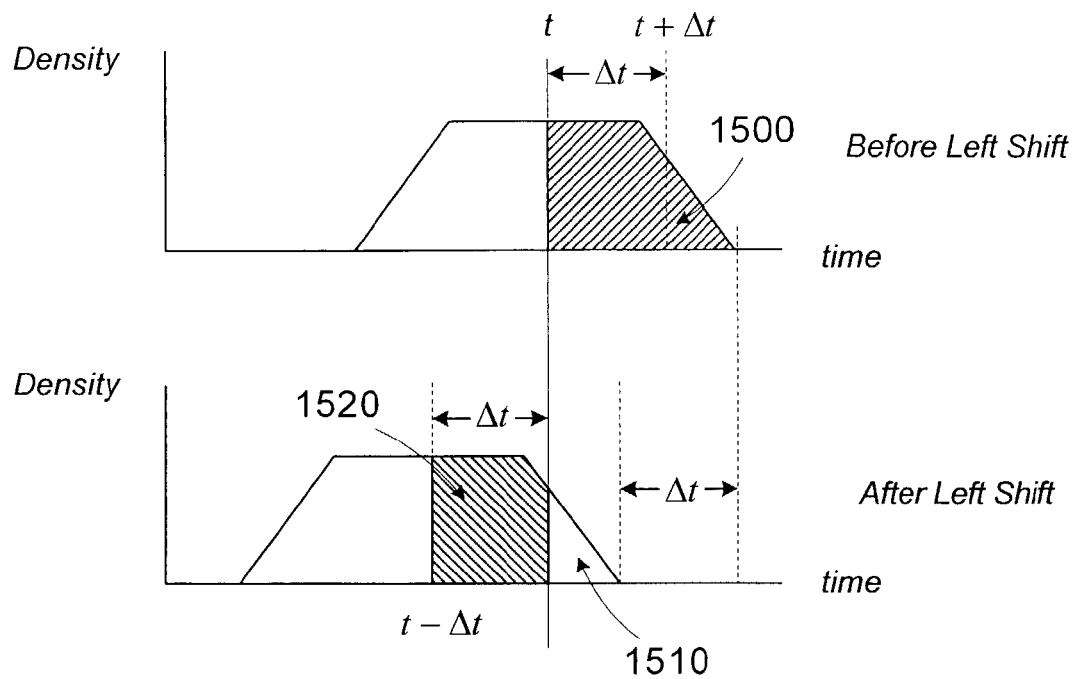
FIGS. 15–18 illustrate the effects of shifting or changing the widths of engagements on representative engagement density curves.

FIG. 15 shows the effect of shifting the engagement to the left by Δt. The upper picture shows the initial position of the engagement. The CCC (not shown) begins to exceed the threshold at time t, and the ROV is to the right of t. The total contribution of the engagement to the ROV is the shaded portion 1500 to the right of t. The lower picture shows the engagement after being shifted Δt to the left. Now the only contribution of the engagement to the ROV is the small triangle 1510 that remains to the right of t. The area that has been removed from the ROV is the shaded region 1520 between t and t−Δt. The same area on the original trapezoid is delimited by t and t+Δt. Thus, the saved area on the original engagement can be computed as:

SavedArea=RightArea(*t*)−RightArea(*t*+Δ*t*), leaving the parameters that describe the engagement (ws, we, k) unchanged.

Figure 16:
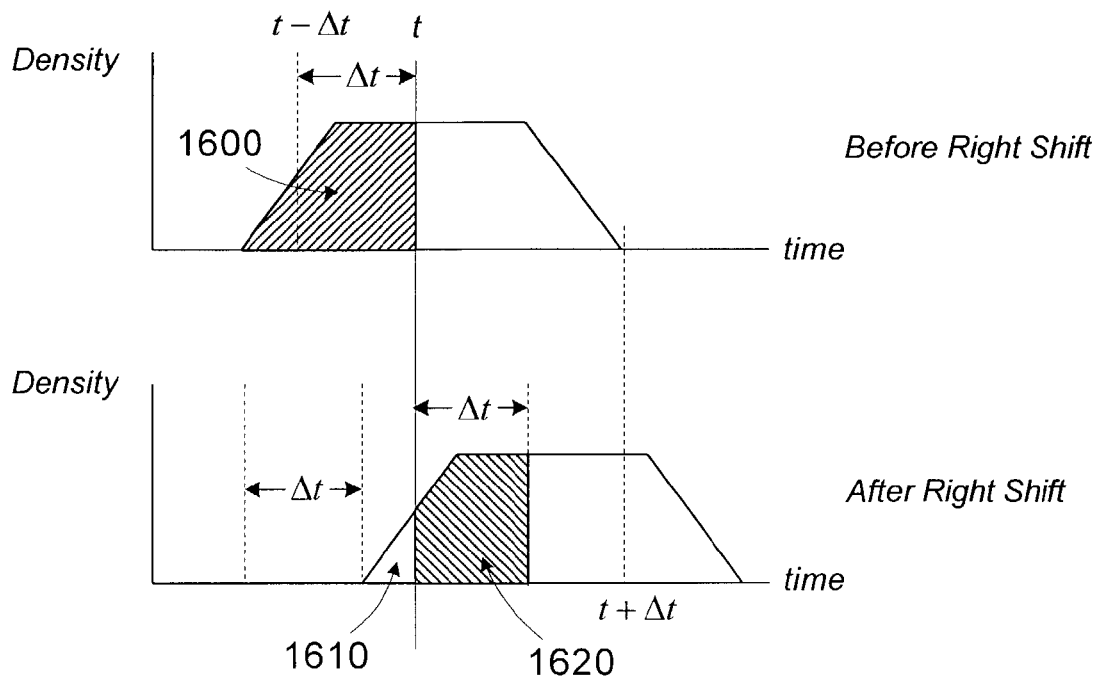

FIG. 16 shows the effect of shifting the engagement to the right by Δt. The upper picture shows the initial position of the engagement. The CCC (not shown) begins to exceed the threshold at time t, and the ROV is to the left of t. The total contribution of the engagement to the ROV is the shaded portion 1600 to the left of t. The lower picture shows the engagement after being shifted Δt to the right. Now the only contribution of the engagement to the ROV is the small triangle 1610 that remains to the left of t. The area that has been removed from the ROV is the shaded region 1620 between t and t+Δt. The same area on the original trapezoid is delimited by t and t−Δt. Thus the saved area on the original engagement can be computed as:

SavedArea=LeftArea(*t*)−LeftArea(*t*−Δ*t*), leaving the parameters that describe the engagement (ws, we, k) unchanged.

The time difference, Δt, required to move an engagement depends on two factors: which case t satisfies, and how much area is needed, AreaNeeded. Of course, Δt time may not be available to shift, but for the moment this case is ignored to simplify the discussion here. The discussion below presents exemplary cases for each equation. These cases are based on the engagement (ws,we,k)=(1,10,2), whose plateau begins at 3 and ends at 8. Total area available is equal to the kernel, 2.

Case 1: ws<t<ps (ROV to Right).

An engagement that overlaps an ROV to the right of it has three components that may contribute to the ROV: LeftRampRightArea(t), PlateauArea, and RampArea. Depending on the AreaNeeded, part or all of these components may be required. For purposes of the following example, let t=2.

Subcase 1.1: If AreaNeeded<LeftRampRightArea(t), then both t and t+Δt fall in the left ramp, and Δt must satisfy:

$$\begin{aligned}AreaNeeded &= RightArea1(t) - RightArea1(t+\Delta t)\\&= k-(t-ws)^2/(2*s)-k+(t+\Delta t-ws)^2/(2*s)\\&= [(t+\Delta t-ws)^2-(t-ws)^2]/(2*s)\\&= \Delta t(\Delta t + 2(t-ws))/(2s).\end{aligned}$$

This formula is quadratic with respect to Δt, and so yields two solutions. The solution that yields Δt>0 is:

Δ*t*=*ws*−*t*+√(2·*AreaNeeded*·*s*+(*t*−*ws*)²).

Example: A shift of 0.5 yields area of 0.089.

Subcase 1.2: If LeftRampRightArea(t)<AreaNeeded<LeftRampRightArea(t)+PlateauArea, then t+Δt falls in the plateau, and Δt must satisfy:

$$\begin{aligned}AreaNeeded &= LeftRampRightArea(t) + PlateauLeftArea(t+\Delta t)\\&= s*p^2/2 - (t-ws)^2/(2*s) + p*(t+\Delta t - ps),\end{aligned}$$

which can be solved to yield:

Δ*t*=AreaNeeded/*p*−*t*+*ps*−*s*\**p*/2+(*t*−*ws*)²/(2 *s*\**p*).

Example: A shift of 2 yields area of 0.5.

Subcase 1.3: If LeftRampRightArea(t)+PlateauArea<AreaNeeded<LeftRampRightArea(t)+PlateauArea+RampArea, then t+Δt falls in the right ramp, and Δt must satisfy:

$$AreaNeeded = LeftRampRightArea(t) + PlateauArea +$$
$$RightRampLeftArea(t + \Delta t)$$
$$= s*p^2/2 - (t-ws)^2/(2*s) + p|k-s| + s*p^2/2 -$$
$$(we-t-\Delta t)^2/(2*s)$$
$$= s \cdot p^2 + p \cdot |k-s| - \frac{(t-ws)^2 + (we-t-\Delta t)^2}{2 \cdot s}.$$

Again, the equation is quadratic in $\Delta t$, and both solutions yield positive $\Delta t$, but the valid solution is:

$$\Delta t = we - t - \sqrt{2 \cdot AreaNeeded \cdot s + 2p \cdot s \cdot |k-s| + 2p^2 s^2 - (t-ws)^2}.$$

Example: A shift of 7 yields area of 1.86.

Subcase 1.4: If LeftRampRightArea(t)+PlateauArea+RampArea<AreaNeeded, the engagement must be moved completely out of the ROV, so $\Delta t$=we–t, and other sources must be found if additional area is needed.

Case 1': ws<t<ps (ROV to Left)

An engagement that overlaps an ROV to the left of it contributes at most LeftRampLeftArea(t), yielding two subcases.

Subcase 1'.1: If AreaNeeded<LeftRampLeftArea(t), then t–$\Delta t$ falls in the left ramp, and $\Delta t$ must satisfy:

$$AreaNeeded = LeftRampLeftArea(t) - LeftRampLeftArea(t - \Delta t)$$
$$= \text{Min}(k/s, 1) * ((t-ws)^2 - (t-\Delta t - ws)^2)/$$
$$(2*\text{Min}(k,s))$$
$$= \text{Min}(k/s, 1) * (\Delta t * (2*t - 2*ws - \Delta t))/$$
$$(2*\text{Min}(k,s)),$$

which can be expressed as:

$$AreaNeeded = (t-ws) \cdot \frac{\Delta t}{s} - \frac{\Delta t^2}{2 \cdot s},$$

a quadratic that can be solved as:

$$\Delta t = t - ws - \frac{\sqrt{\text{Min}(k/s, 1) \cdot [\text{Min}(k/s, 1) \cdot (t-ws)^2 - 2 \cdot AreaNeeded \cdot \text{Min}(k, s)]}}{\text{Min}(k/s, 1)}$$

or $$\Delta t = t - ws - \sqrt{(t-ws)^2 - 2 \cdot s \cdot AreaNeeded}.$$

Subcase 1'.2: If LeftRampLeftArea(t)<AreaNeeded, then the engagement must be moved completely out of the ROV, so $\Delta t$=t–ws, and other sources must be found if additional area is needed.

Case 2: ps<t<pe (ROV to Right).

An engagement that overlaps an ROV to the right of it contributes at most PlateauRightArea(t)+RampArea, yielding three subcases. For purposes of this illustration, let t=4.

Subcase 2.1: If AreaNeeded<PlateauRightArea(t), then t+$\Delta$falls in the plateau, and $\Delta t$ must satisfy:

$$AreaNeeded = PlateauRightArea(t) - PlateauRightArea(t + \Delta t)$$
$$= p(pe - t) - p(pe - t - \Delta t) = p\Delta t,$$

yielding:

$\Delta t$=AreaNeeded/$p$.

Example: A shift of 2 yields area of 0.57.

Subcase 2.2: If PlateauRightArea(t)<AreaNeeded<PlateauRightArea(t)+RampArea, then t+$\Delta t$ falls in the right ramp, and $\Delta t$ must satisfy:

$$AreaNeeded = PlateauRightArea(t) + RightRampLeftArea(t + \Delta t)$$
$$= p(pe - t) + s*p^2/2 - (we - t - \Delta t)^2/(2s).$$

The valid solution to the quadratic is:

$$\Delta t = we - t - \sqrt{2 \cdot s \cdot AreaNeeded + 2p \cdot s \cdot pe + p^2 s^2 - 2p \cdot s \cdot t}.$$

Example: A shift of 5 yields area of 1.36.

Subcase 2.3: If PlateauRightArea(t)+RampArea<AreaNeeded, then the engagement must be moved completely out of the ROV, so $\Delta t$=we–t, and other sources must be found if additional area is needed.

Case 2': ps<t<pe (ROV to Left).

An engagement that overlaps an ROV to the left of it contributes at most PlateauLeftArea(t)+RampArea, yielding three subcases.

Subcase 2'.1: If AreaNeeded<PlateauLeftArea(t), then t–$\Delta t$ falls in the plateau, and $\Delta t$ must satisfy:

AreaNeeded=PlateauLeftArea($t$)–PlateauLeftArea($t$–$\Delta t$)=Min($k/s$, 1)*($t$–$ps$)–($t$–$\Delta t$–$ps$))=$\Delta t$*Min($k/s$, 1), yielding:

$\Delta t$=AreaNeeded/Min($k/s$, 1)=AreaNeeded/$p$.

Subcase 2'.2: If PlateauLeftArea(t)<AreaNeeded<PlateauLeftArea(t)+RampArea, then t–$\Delta t$ falls in the left ramp, and $\Delta t$ must satisfy:

$$AreaNeeded = PlateauLeftArea(t) + LeftRampRightArea(t - \Delta t)$$
$$= \text{Min}(k/s, 1) * (t - ps) + (ps - t + \Delta t) *$$
$$(p + \text{Min}(k/s, 1) * (t - \Delta t - ws)/\text{Min}(k, s))/2,$$

which can be expressed as:

$$AreaNeeded = p \cdot (t - ps) + (ps - t + \Delta t) \cdot \frac{p \cdot s + t - \Delta t - ws}{2 \cdot s}.$$

The quadratic equation of Δt, can be rewritten as:

$$\Delta t^2 - (p*s+2*t-ps-ws)*\Delta t - (t-ps)*(p*s-t+ws) + 2*s*\text{AreaNeeded} = 0,$$

and solved for Δt to yield:

$$\Delta t = \frac{a - \sqrt{b}}{2},$$

where
a=p·s+2·t−ps−ws, and
b=(p·s+2·t−ps−ws)$^2$−8·s·AreaNeeded+4·(t−ps)·(p·s−t+ws).

Subcase 2'.3: If PlateauLeftArea(t)+RampArea<AreaNeeded, then the engagement must be moved completely out of the ROV, so Δt=t−ws, and other sources must be found if additional area is needed.

Case 3: pe<t<we (ROV to Right).

An engagement that overlaps an ROV to the right of it contributes at most RightRampRightArea(t), yielding two subcases. For purposes of this illustration, let t=8.5.

Subcase 3.1: If AreaNeeded<RightRampRightArea(t),then t+Δt falls in the right ramp, and Δt must satisfy:

$$\text{AreaNeeded} = \text{RightRampRightArea}(t) -$$
$$\text{RightRampRightArea}(t + \Delta t)$$
$$= ((we - t)^2 - (we - t - \Delta t)^2)/(2s),$$

which is a quadratic equation of Δt that can be solved to yield:

$$\Delta t = we - t - \sqrt{(we-t)^2 - 2 \cdot s \cdot \text{AreaNeeded}}.$$

Example: A shift of 1 yields area of 0.14.

Subcase 3.2: If RightRampRightArea(t)<AreaNeeded, then the engagement must be moved completely out of the ROV, so Δt=we−t, and other sources must be found if additional area is needed.

Case 3': pe<t<we (ROV to Left).

An engagement that overlaps an ROV to the left of it may contribute three components to the ROV: RightRampLeftArea(t), PlateauArea, and RampArea. Depending on AreaNeeded, part or all of these components may be required.

Subcase 3'. 1: If AreaNeeded<RightRampLeftArea(t), then t−Δt falls in the right ramp, and Δt must satisfy:

$$\text{AreaNeeded} = \text{RightRampLeftArea}(t) - \text{RightRampLeftArea}(t + \Delta t)$$
$$= (t - pe)*\text{Min}(k/s, 1)*(1 + (we - t)/\text{Min}(k, s))/2 -$$
$$(t - \Delta t - pe)*\text{Min}(k/s, 1)*(1 + (we - t + \Delta t)/\text{Min}(k, s))/2,$$

which can be rewritten as:

$$\text{AreaNeeded} = \frac{t - pe}{2} \cdot \left(p + \frac{we - t}{s}\right) - \frac{t - \Delta t - pe}{2} \cdot \left(p + \frac{we - t + \Delta t}{s}\right).$$

This quadratic may be simplified to:

$$\Delta t^2 + (s \cdot p + pe + we - 2 \cdot t) \cdot \Delta t - 2 \cdot s \cdot \text{AreaNeeded} = 0,$$

and solved for Δt to yield:

$$\Delta t = \frac{-(s \cdot p + pe + we - 2 \cdot t) + \sqrt{(s \cdot p + pe + we - 2 \cdot t)^2 + 8 \cdot s \cdot \text{AreaNeeded}}}{2}.$$

Subcase 3'.2: If RightRampLeftArea(t)<AreaNeeded<RightRampLeftArea(t)+PlateauArea, then t−Δt falls in the plateau, and Δt must satisfy:

$$\text{AreaNeeded} = \text{RightRampLeftArea}(t) + \text{PlateauLeftArea}(t - \Delta t)$$
$$= (t - pe)*\text{Min}(k/s, 1)*(1 + (we - t)/\text{Min}(k, s))/2 +$$
$$\text{Min}(k/s, 1)*(pe - t + \Delta t)$$
$$= \text{Min}(k/s, 1)*((t - pe)*(1 + (we - t)/\text{Min}(k, s))/2 +$$
$$(pe - t + \Delta t)),$$

which can be rewritten as:

$$\text{AreaNeeded} = \frac{t - pe}{2} \cdot \left(p + \frac{we - t}{s}\right) + p \cdot (pe - t + \Delta t),$$

and solved to yield:

$$\Delta t = (t-pe)*(t-we)/(2*\text{Min}(k,s)) - (pe-t)/2 + \text{AreaNeeded}/\text{Min}(k/s,1)$$

or $$\Delta t = \frac{(t - pe) \cdot (p \cdot s + t - we)}{2 \cdot s \cdot p} + \frac{\text{AreaNeeded}}{p}.$$

Subcase 3'. 3: If RightRampLeftArea(t)+PlateauArea<AreaNeeded<RightRampLeftArea(t)+PlateauArea+LeftRampArea, then t−Δt falls in the left ramp, and Δt must satisfy:

$$\text{AreaNeeded} = \text{RightRampLeftArea}(t)\text{PlateauArea} + \text{LeftRampRightArea}(t - \Delta t)$$
$$= (t - pe)*\text{Min}(k/s, 1)*(1 + (we - t)/\text{Min}(k, s))/2 +$$
$$\text{Min}(k/s, 1)*|k - s| + (ps - t + \Delta t)*(p + \text{Min}(k/s, 1)*$$
$$(t - \Delta t - ws)/\text{Min}(k, s))/2,$$

which can be expressed as:

$$AreaNeeded = (t-pe)\cdot\frac{p\cdot s+we-t}{2\cdot s}+p\cdot|k-s|+(ps-t+\Delta t)\cdot\frac{p\cdot s+t-\Delta t-ws}{2\cdot s}$$

and simplified to yield:

$$\Delta t^2-(s\cdot p+2\cdot t-ps-ws)\cdot\Delta t+2\cdot s\cdot AreaNeeded+(t-ps)-(s\cdot p+t-ws)-2\cdot s\cdot p\cdot|k-s|-(t-pe)\cdot(s\cdot p+we-t)=0$$

Solving for $\Delta t$ yields:

$$\Delta t=\frac{a}{2}-\frac{\sqrt{a^2-8\cdot s\cdot AreaNeeded-4\cdot[(t-ps)\cdot(s\cdot p+t-ws)-2\cdot s\cdot p|k-s|-(t-pe)\cdot(p\cdot s+we-t)]}}{2}$$

where $a=(s\cdot p+2\cdot t-ps-ws)$.

Subcase 3'.4: If RightRampLeftArea(t)+PlateauArea+RampArea<AreaNeeded, then the engagement must be moved completely out of the ROV, so $\Delta t$=t−ws, and other sources must be found if additional area is needed.

Case 4: t<ws (WW overlaps entirely within ROV and shift engagement left).

An engagement that entirely overlaps an ROV has three components that may contribute to the ROV: LeftRampArea, PlateauArea and RightRampArea. Depending on the AreaNeeded, part or all of these components may be required. The total shift $\Delta t$ in this case has two parts: $\Delta t_1$=ws−t (which does not reduce any ROV) and $\Delta t_2$=t−ws' (which is the special case of Case 1 when t=ws), where ws' is the new window start after the shift. Thus there are four subcases.

Subcase 4.1: If AreaNeeded<LeftRampArea, then $\Delta t_2$ can be derived directly from the subcase 1.1 with t=ws, and that yields:

$$\Delta t_2=\sqrt{2*AreaNeeded*s}.$$

Thus, $$\Delta t=\Delta t_1+\Delta t_2=ws-t+\sqrt{2*AreaNeeded*s}.$$

Subcase 4.2: If LeftRampArea<AreaNeeded<LeftRampArea+PlateauArea, then $\Delta t_2$ can be derived directly from the subcase 1.2 with t=ws, and that yields:

$$\Delta t_2=\frac{AreaNeeded}{p}-t+ps-\frac{s*p}{2}.$$

Thus, the total shift is $$\Delta t=\Delta t_1+\Delta t_2=ws-t+\frac{AreaNeeded}{p}-t+ps-\frac{s*p}{2}.$$

Subcase 4.3: If LeftRampArea+PlateauArea<AreaNeeded<LeftRampArea+PlateauArea+RightRampArea, then $\Delta t_2$ can be derived from the subcases 1.3 with t=ws, and that yields:

$$\Delta t_2=we-ws-\sqrt{2*p*s*|k-s|+2*p^2*s^2-2*s*AreaNeeded}.$$

Thus, the total shift is:

$$\Delta t=\Delta t_1+\Delta t_2=we-t-\sqrt{2*p*s*|k-s|+2*p^2*s^2-2*s*AreaNeded}.$$

Subcase 4.4: If LeftRampArea+PlateauArea+RightRampArea<AreaNeeded, the engagement must be moved completely out of the ROV, so $\Delta t$=we−t, and other sources must be found if additional area is needed.

Case 4': we<t (WW overlaps entirely within ROV and shift engagement right).

Similar to the case 4, an engagement that entirely overlaps an ROV has three components that may contribute to the ROV: LeftRampArea, PlateauArea and RightRampArea. Depending on the AreaNeeded, part or all of these components may be required. The total shift $\Delta t$ in this case has two parts: $\Delta t_1$=t−we (which does not reduce any ROV), and $\Delta t_2$=we'−t (which is the special case of Case 3' when t=we), where we' is the new window end after the shift. Thus, there are four subcases.

Subcase 4'.1: If AreaNeeded<RightRampArea, then $\Delta t_2$ can be derived directly from the subcase 3'.1 with t=we, and that yields:

$$\Delta t_2=\frac{-(s*p+pe-t)+\sqrt{(s*p+pe-t)^2+8*s*AreaNeeded}}{2}.$$

Thus, the total shift is given by:

$$\Delta t=\Delta t_1+\Delta t_2=t-we+\frac{-(s*p+pe-t)+\sqrt{(s*p+pe-t)^2+8*s*AreaNeeded}}{2}.$$

Subcase 4'2: If RightRampArea<AreaNeeded<RightRampArea+PlateauArea, then $\Delta t_2$ can be derived directly from the subcase 3'.2 with t=we, and that yields:

$$\Delta t_2=\frac{(t-pe)*p*s}{2*s*p}+\frac{AreaNeeded}{p}.$$

Thus, the total shift is given by:

$$\Delta t=\Delta t_1+\Delta t_2=t-we+\frac{(t-pe)*p*s}{2*s*p}+\frac{AreaNeeded}{p}.$$

Subcase 4'3: If RightRampArea+PlateauArea<AreaNeeded<LeftRampArea+PlateauArea+RightRampArea, then $\Delta t_2$ can be derived directly from the subcase 3'.3 with t=we, and that yields:

$$\Delta t_2 = \frac{A}{2} - \frac{\sqrt{\begin{array}{c} A^2 - 8*s*AreaNeeded - 4*[(t-ps)* \\ (s*p+t-ws) - 2*s*p*|k-s| - (t-pe)*p*s] \end{array}}}{2}$$

where $A = s*p + 2*t - ps - ws$.

Thus, the total shift is then:

$$\Delta t = \Delta t_1 + \Delta t_2 = t - we + \frac{A}{2} - \frac{\sqrt{\begin{array}{c} A^2 - 8*s*AreaNeeded - 4*[(t-ps)* \\ (s*p+t-ws) - 2*s*p*|k-s| - \\ (t-pe)*p*s] \end{array}}}{2}$$

Subcase 4'4: If LeftRampArea+PlateauArea+RightRampArea<AreaNeeded, then the engagement must be moved completely out of the ROV, so $\Delta t = t - ws$, and other sources must be found if additional area is needed.

Figure 17:
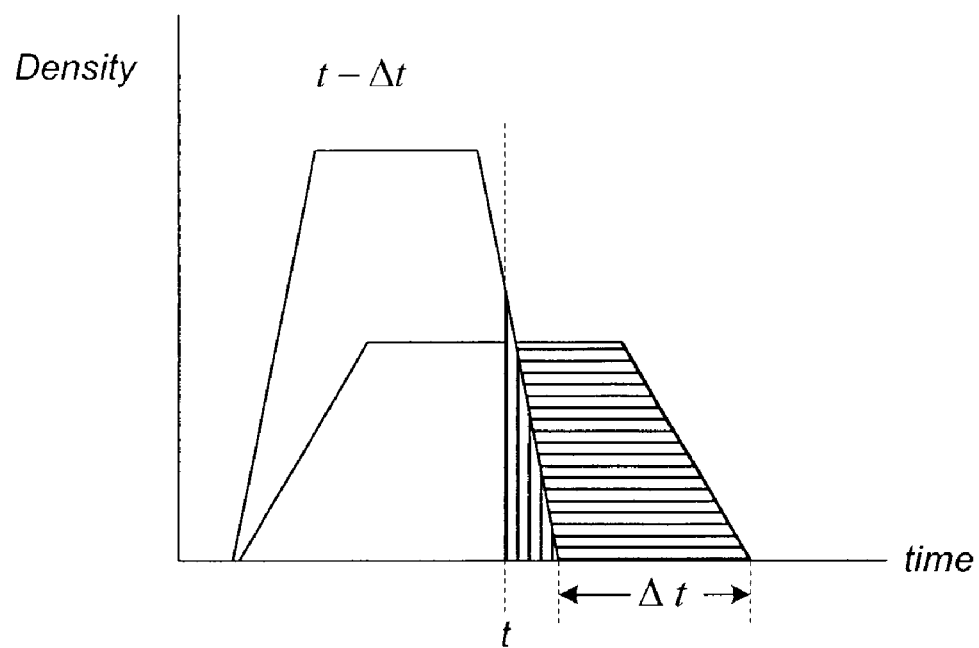

The other option for reducing the ROV is to shrink an engagement. When shrunk, the engagement density changes shape, and computation of the needed area can no longer be restricted to the original engagement. The computation is illustrated by considering the case of a shrink left. Analgous equations define the behavior of a shrink right. Instead of computing RightArea(t)–RightArea(t+$\Delta t$) as described for shift left, the required computation for shrink left is RightArea(t, ws, we, k)–RightArea(t, ws, we–$\Delta t$, k), as illustrated in FIG. 17.

In the new (shrunk) engagement, relative to the original engagement, 1. ws remains unchanged;
2. we is decreased by $\Delta t$;
3. as long as p<=1 (s>=k), ps is constant at ws+k, and pe decreases monotonically, pe'=we–$\Delta t$–k;
4. as long as p=1 (s<=k), pe is constant at ws+k, and ps decreases monotonically, ps'=we–$\Delta t$–k.

In discussing the dynamics as $\Delta t$ increases, it is sometimes useful to view t as advancing to the right, passing successive landmarks (ps, pe, we), although, in fact, these landmarks are moving toward t as the engagement shrinks.

An engagement has three regions, ordered from left to right as <LeftRamp, Plateau, RightRamp>. As a consequence of the previous four observations, for a shrink left, if t falls in one of these regions on the original engagement, it can only fall in the same region or a region more to the right on the shrunken engagement. For a shrink right, t can only fall in the same region or a region more to the left on the shrunken engagement.

The equation needed to solve for $\Delta t$ (for a shrink left) is:

AreaNeeded=RightArea(t, ws, we, k)–RightArea(t, ws, we–$\Delta t$, k).

Similarly, for a shrink right, the equation needed to solve for $\Delta t$ is:

AreaNeeded=LeftArea(t, ws, we, k)–LeftArea(t, ws+$\Delta t$, we, k).

As discussed above, each instance of RightArea or LeftArea may be computed using three possible techniques, depending on the region in which t falls. Thus, a maximum of nine combinations of algorithms must be considered, and the circumstances in which each of them holds must be identified. Because t can only move rightward through the regions of the engagement, three of these combinations cannot occur. Primed variables (s', ps', pe', we') refer to the shrunk engagement. Each combination has at most three subcategories. Two of these occur when the original and shrunk engagement are both on the same side of the s=k phase transition (one subcase for s<k and one for s>k), and the third occurs when the original engagement has s>k and the shrunk engagement has s'<k. In some cases, a particular subcategory may not occur. The subcategories permit resolution of the nonlinear functions (Min, Max, and absolute value) in the basic equation. Further simplification is possible by noting that:

s'=we–$\Delta t$–ws–k=s–$\Delta t$.

Operationally, the machine scheduling agent 410 attempting to resolve an ROV knows the area needed, the maximum area available from a candidate engagement, where t falls in that engagement, and what the state of s is for the engagement. The decision process of the machine scheduling agent 410 is driven by these variables, and the following discussion is organized around this decision sequence.

Case 1: ws<t<ps (shrink left)

Figure 18:
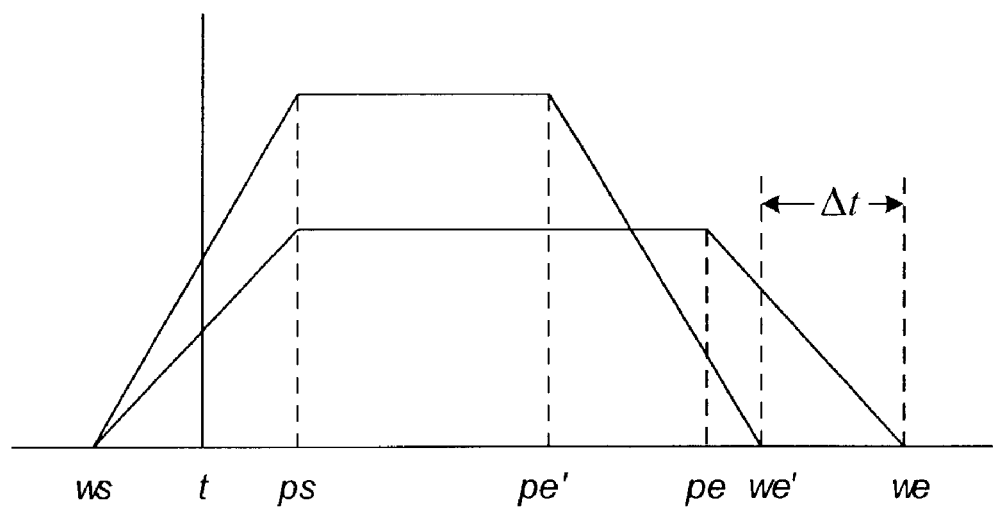

This case is illustrated in FIG. 18. There are two subcases, depending on whether t<ps' or t>ps'. Because t<ps, the formula for RightArea(t, ws, we, k) can be expressed as:

RightArea(t, ws, we, k)=k–(t–ws)$^2$/(2 s).

The formula for RightArea(t, ws, we', k) depends on whether t<ps' or t>ps'. For the subcase t<ps', the RightArea is:

RightArea(t, ws, we', k)=k–(t–ws)$^2$/(2 s).

However, to reach the subcase t>ps', ps' must have moved to the left, so p'=1, pe'=ws+k, and t is in the plateau, yielding:

RightArea(t, ws, we', k)=pe'–t+s'/2=ws+k–t+s'/2.

This equation can be evaluated to determine the maximum area available in a given region. For example, the equation used above:

AreaNeeded=RightArea(t, ws, we, k)–RightArea(t, ws, we–$\Delta t$, k), can be evaluated when ps'=t. If the AreaNeeded is less than that value, the case t<ps' is present. If AreaNeeded is larger than that value, the equation can be further evaluated when ps'=ws (s'=0). If AreaNeeded is less than this value, the case t>ps' is present. Otherwise, even if the window is shrunk to its kernel size, the required area cannot be recovered, and other sources must be found if additional area is needed.

Subcase 1.1: t<ps'.

The required area equation becomes:

$$AreaNeeded = k - (t-ws)^2/(2s) - [k - (t-ws)^2/(2s')]$$
$$= (t-ws)^2/(2s') - (t-ws)^2/(2s)$$
$$= (t-ws)^2(s-s')/(2s*s')$$

Replacing s' by s−Δt and solving for Δt yields:

$$\Delta t = \frac{2 \cdot s^2 \cdot AreaNeeded}{(t-ws)^2 + 2 \cdot s \cdot AreaNeeded}.$$

Example: RightArea(2, 1, 10, 2)−RightArea(2, 1, 9, 2)=0.012 at Δt=1.

Subcase 1.2: t>ps'.

The area needed equation becomes:

$$AreaNeeded = k - (t-ws)^2/(2s) - [ws + k - t + s'/2]$$
$$= k - (t-ws)^2/(2s) - (ws + k - t + (s - \Delta t)/2)$$
$$= -(t-ws)^2/(2s) - (s-\Delta t)/2 + t - ws.$$

Replacing s' by s−Δt and solving for Δt yields:

$$\Delta t = 2 \cdot AreaNeeded + \frac{(s-t+ws)^2}{s}.$$

Example: RightArea(2, 1, 10, 2)−RightArea(2, 1, 3.5, 2)=0.68 at Δt=6.5.

Case 1': ws<t<ps (shrink right).

The maximum area that can be recovered is when ws'=t. If the maximum area available is less than the AreaNeeded, other sources must be found if additional area is needed. The equations for LeftArea(t, ws, we, k) and LeftArea(t, ws', we, k) are given by:

LeftArea(t, ws, we, k)=p*(t−ws)/2=(t−ws)²/(2*s); and

LeftArea(t, ws, we, k)=p'*(t−ws)/2=(t−ws−Δt)²/(2*(s−Δt)).

The area needed equation becomes:

AreaNeeded=(t−ws)²/(2*s)−(t−ws−Δt)²/(2*(s−Δt)).

The quadratic equation of Δt, may be simplified to yield:

s*Δt²−[2*s*AreaNeeded+(t−ws)*(ws+2*s−t)]*Δt+ 2*s²*AreaNeeded=0, and solved to yield:

$$\Delta t = \frac{a - \sqrt{a^2 - 8 \cdot s^3 \cdot AreaNeeded}}{2 \cdot s},$$

where a=2·s·AreaNeeded+(t−ws)·(ws+2·s−t).

Case 2: ps<t<pe (shrink left).

For this case, it must be distinguished whether s>k or s<k in the original engagement.

Subcase 2.1: s>k

Figure 19:
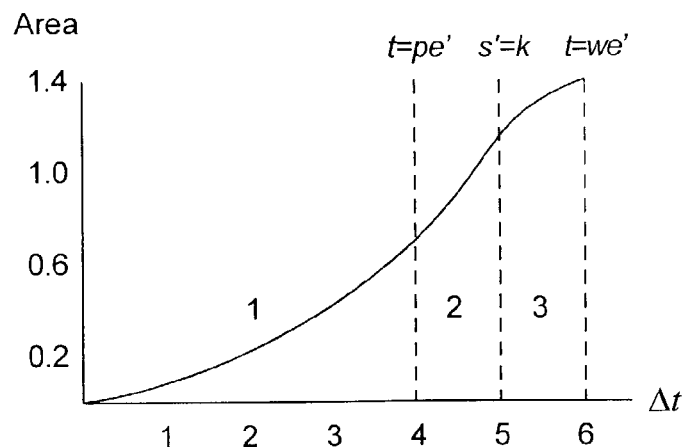
FIGS. 19–21 illustrate the engagement density area that may be recovered by shrinking engagement windows.

FIG. 19 illustrates the three subregions in this subcase. As the engagement shrinks, first t meets pe' and falls off the end of the plateau. Subsequently s'=k, and, finally, t runs into we', and the engagement no longer intersects the ROV. If t is in the plateau with s>k, it is to the right of ps=ws+k. When s'=k, then ps'=pe'=ws+k, so pe' has already passed t.

Subcase 2.1: ps<t<pe, s>k, (example: t=4, ws=1, we=10, k=2).

At the end of region 1, t=pe'=we'−k, so we'=t+k, and the maximum area available is:

RightArea(t, ws, we, k)−RightArea(t, ws, t+k, k).

The end of region 2 occurs when s'=k, or we'=ws+2*k, so the area available is:

RightArea(t, ws, we, k)−RightArea(t, ws, ws+2*k, k).

Region 3 ends when t=we', yielding the maximum area:

RightArea(t, ws, we, k)−RightArea(t, ws, t, k).

Each of these three regions is considered in turn.

Subcase 2.1.1: s'>k, t<pe'.

The AreaNeeded Equation becomes:

AreaNeeded=(k/s)*[(we−k−t)+k/2]−k/(s−Δt)*[(we−k−Δt−t)+k/2], which can be solved to yield:

$$\Delta t = \frac{s^2 \cdot AreaNeeded}{s \cdot AreaNeeded + k \cdot (k/2 + ws - t)}.$$

Example: RightArea(5,1,10,2)−RightArea(5,1,9,2)=0.143 at Δt=1.

Subcase 2.1.2: s'>k, t>pe'.

Now t has fallen off the plateau and entered the right ramp. The AreaNeeded Equation becomes:

AreaNeeded=(k/s)*((we−k−t)+k/2)−(k/(s−Δt))*(we−Δt−t)²/(2*k), which can be simplified to yield:

s*Δt²−[k²+2*(t−we)*(k−s)+2*s*AreaNeeded]*Δt+s* [k²+(t−we)*(t+2*k−we)+2*s*AreaNeeded]=0, and solved to yield:

$$\Delta t = \frac{a}{2 \cdot s} - \frac{\sqrt{a^2 - 4 \cdot s^2 \cdot [k^2 + (t-we) \cdot (t+2 \cdot k - we) + 2 \cdot s \cdot AreaNeeded]}}{2 \cdot s},$$

where
a=k²+2·(t−we)·(k−s)+2·s·AreaNeeded.

Example: RightArea(7, 1, 10, 2)−RightArea(7, 1, 8, 2)=0.471 at Δt=2.

Subcase 2.1.3: s'<k, t>pe'.

The AreaNeeded Equation becomes:

AreaNeeded=(k/s)*[(we−k−t)+k/2]−(we−Δt−t)²/(2*(s−Δt)), which can be solved to yield:

$$\Delta t = \frac{A + 2 \cdot (k-s)(t-we) - \sqrt{\begin{array}{l}-4 \cdot s^2 \cdot (A + (t-we)(2k+t-we)) + \\ (k^2 + 2 \cdot (k-s) \cdot (t-we) + 2 \cdot s \cdot AreaNeeded))^2\end{array}}}{2s}$$

where $A = k^2 + 2 \cdot AreaNeeded \cdot s$.

Example: RightArea(3.5, 1, 10, 2)−RightArea(3.5, 1, 4, 2)=1.446 at $\Delta t$=6.

Subcase 2.2: s<k

As FIG. 18 illustrates, if t starts in the plateau with s<k, it never leaves, since pe is fixed at ws+k. So this subcase has only one region, which ends when s'=0 and we'=ws+k. Thus the maximum area available is:

RightArea(t, ws, we, k)−RightArea(t, ws, ws+k, k).

The AreaNeeded equation takes the form:

AreaNeeded=$\Delta t$/2, which yields the immediate solution:

$\Delta t$=2*AreaNeeded.

Example: RightArea(2.5, 1, 4, 2)−RightArea(2.5, 1, 3.5, 2)=0.25 at $\Delta t$=0.5.

Case 2':ps<t<pe (shrink right).

Similarly, it must be distinguished whether s>k or s<k in the original engagement.

Subcase 2'. 1: s>k

Figure 20:
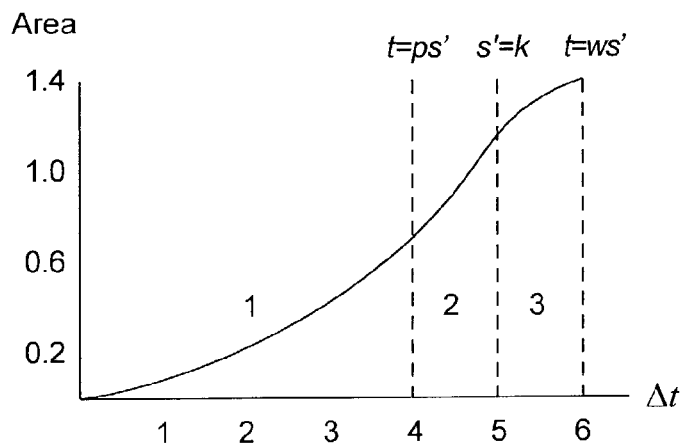

FIG. 20 illustrates the three subregions in this subcase. As the engagement shrinks, t first meets ps' and then falls off the end of the plateau. Subsequently s'=k, and, finally, t runs into ws', and the engagement no longer intersects the ROV. If t is in the plateau with s>k, it is to the left of pe=we−k. When s'=k, then ps'=pe'=we−k, so ps' has already passed t.

Subcase 2'.1: ps<t<pe, s>k(example: t=4, ws=1, we=10, k=2).

At the end of region 1, t=ps'=ws'+k, so ws'=t−k, and the maximum area available is:

LeftArea(t, ws, we, k)−LeftArea(t, t−k, we, k).

The end of region 2 occurs when s'=k or ws'=we−2*k, so the area available is:

LeftArea(t, ws, we, k)−LeftArea(t, we−2*k, we, k).

Region 3 ends when t=ws', yielding the maximum area:

LeftArea(t, ws, we, k)−LeftArea(t, t, we, k).

Each of these regions is considered in turn.

Subcase 2'.1.1: s>k t>ps'.

The AreaNeeded equation takes the form:

AreaNeeded=$(k/s)$*[(t−ws−k)+k/2]−k/(s−$\Delta t$)*[(t−ws−$\Delta t$−k)+k/2], which can be solved to yield:

$\Delta t$=2*AreaNeeded*$s^2$($k^2$+2*AreaNeeded*s+2*k*(ws+s−t)), or $$\Delta t = \frac{2 \cdot s^2 \cdot AreaNeeded}{2 \cdot s \cdot AreaNeeded - k \cdot (k - 2 \cdot we + 2 \cdot)}.$$

Subcase 2'.1.2: s>k, t<ps'.

Now t has fallen off the plateau and entered the left ramp, and AreaNeeded equation takes the form:

AreaNeeded=$(k/s)$*((t−ws−k)+k/2)−(t−ws−$\Delta t$)$^2$/(2*(s−$\Delta t$)), which can be simplified to yield:

s*$\Delta t^2$−[2*s*AreaNeeded+$k^2$+2*(t−ws)*(s−k)]*$\Delta t$+s*[(ws+k−t)$^2$+2*s*AreaNeeded]=0, and solved to yield:

$$\Delta t = \frac{k^2 + 2 \cdot (t - ws) \cdot (s-k) + 2 \cdot s \cdot AreaNeede}{2 \cdot s} - \frac{\sqrt{[k^2 + 2 \cdot (t - ws) \cdot (s-k) + 2 \cdot s \cdot AreaNeeded]^2 - 4 \cdot s^2 \cdot [(ws+k-t)^2 + 2 \cdot s \cdot AreaNeeded]}}{2 \cdot s}$$

Subcase 2'.2: s<k

Symmetric to the ROV to Right case, if t starts in the plateau with s<k, it never leaves, since ps is fixed at we−k. So this subcase has only one region, which ends when s'=0 and ws'=we−k. Thus the maximum area available is:

LeftArea(t, ws, we, k)−LeftArea(t, we−k, we, k), and the AreaNeeded equation takes the form:

AreaNeeded=$\Delta t$/2, which yields the immediate solution:

$\Delta t$=2*AreaNeeded.

Case 3: pe<t<we (shrink left).

This is the simplest case. The maximum area we can reduce is when we'=t. If the maximum area available is less than the AreaNeeded, other sources must be found if additional area is needed. The equations for RightArea(t, ws, we, k) and RightArea(t, ws, we, k) are given by:

RightArea(t, ws, we, k)=p*(we−t)/2=(we−t)$^2$/(2*s), and

RightArea(t, ws, we, k)=p'*(we'−t)/2=(we−$\Delta t$−t)$^2$/(2*(s−$\Delta t$)).

Thus, the AreaNeeded equation becomes:

AreaNeeded=(we−t)$^2$/(2*s)−(we−$\Delta t$−t)$^2$/(2*(s−$\Delta t$)), which may be simplified to yield:

$$s^* \Delta t^2 - [2^*s^* \text{AreaNeeded} + (we-t)^*(t+2^*s-we)]^* \Delta t + 2^*s^{2*} \text{AreaNeeded} = 0,$$

and solved to yield:

$$\Delta t = \frac{a - \sqrt{a^2 - 8 \cdot s^3 \cdot \text{AreaNeeded}}}{2 \cdot s}$$

where a=2·s·AreaNeeded+(we−t)·(t+2·s−we).

Example: RightArea(8.5, 1, 10, 2)−RightArea(8.5, 1, 9, 2)=0.140 at Δt=1

Case 3': pe<t<we (shrink right)

Figure 21:
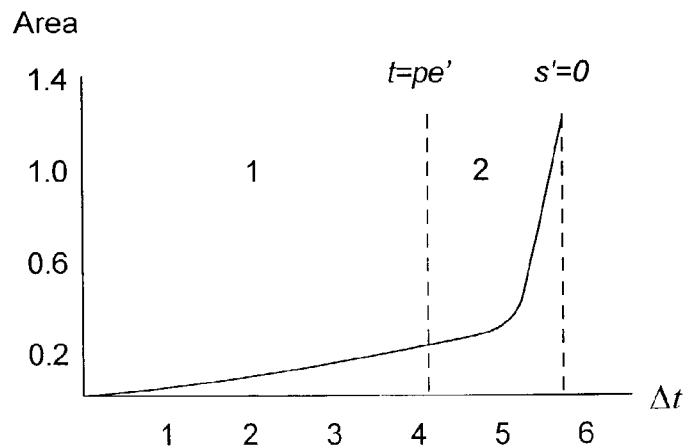

There are two subcases, depending on whether t<pe' or t>pe'. FIG. 21 illustrates the two subregions in this case. Similar to the cases of ROV to Right, the formula for LeftArea(t, ws, we, k) can be expressed as:

LeftArea(t, ws, we, k)=k−(we−t)²/(2*s).

The formula for the LeftArea(t, ws', we, k) depends on whether t<pe' or t>pe'. For the subcase t>pe', the LeftArea equation is:

LeftArea(t, ws', we, k)=k−(we−t)²/(2*s).

For the subcase t<pe', p'=1, which yields:

LeftArea(t, ws', we, k)=k−(s'/2+pe'−t).

As pe' increases and passes the point t=pe, the t=pe' phase transition is reached. The AreaNeeded equation can be evaluated to learn the maximum area available in a given region. For example, the AreaNeeded equation can be evaluated when pe'=t. If AreaNeeded is less than that value, the case t>pe' is present. If AreaNeeded is larger than that value, the AreaNeeded can be further evaluated when pe'=we (s'=0). If AreaNeeded is less than this value, the case t<pe' is present. Otherwise, even if the window is shrunk to its kernel size, no more area reduction can occur from this engagement, and another source must be found if additional area is needed.

Subcase 3'.1: t>pe'

The AreaNeeded equation takes the form:

$$\text{AreaNeeded} = k - (we-t)^2/(2*s) - [k - (we-t)^2/(2*s')]$$

$$= (we-t)^2/(2*s') - (we-t)^2/(2*s).$$

Replacing s' by s−Δt yields:

Δt(we−t)²−2s(s−Δt)AreaNeeded=0.

Solving for Δt yields:

$$\Delta t = \frac{2 \cdot s^2 \cdot \text{AreaNeeded}}{(we-t)^2 + 2 \cdot s \cdot \text{AreaNeeded}}.$$

Subcase 3'.2: t<pe'

The AreaNeeded equation takes the form:

$$\text{AreaNeeded} = k - (we-t)^2/(2*s) - [k-s'/2-(pe'-t)] = s'/2 + (we-s'-t) - (we-t)^2/(2*s).$$

Replacing s' by s−Δt, and simplifying the equation yields:

$$\Delta t - \frac{(s+t-ws)^2}{s} - 2 \cdot \text{AreaNeeded} = 0.$$

Solving for Δt yields:

$$\Delta t = 2 \cdot \text{AreaNeeded} + \frac{(s+t-ws)^2}{s}.$$

This completes the discussion of the equations needed to compute the time differential to be used when shifting or shrinking the working window of an engagement to achieve a desired area reduction for an ROV.

Returning to FIG. 4, the discussion now shifts to how the machine scheduling agent 410 decides which of the engagements are to be executed. When a process tool 115 is idle (or is about to become idle), the machine scheduling agent 410 selects an engagement from its schedule of engagements to execute. Before making this selection, the machine scheduling agent 410 may wish to merge several engagements into one optimized for batching and/or setup. If the process tool 115 is not capable of processing batches, only setup optimization is needed. If the process tool 115 is capable of processing batches, two lots 130 may differ in setup type and/or batch membership. If two lots 130 are in the same batch, they necessarily have the same setup. Thus, there are only three cases for lots 130 on a process tool 115 capable of batching: same batch, different batch but same setup (for example, when two lots 130 must run for different periods of time), and different batch with different setup.

Figure 22:
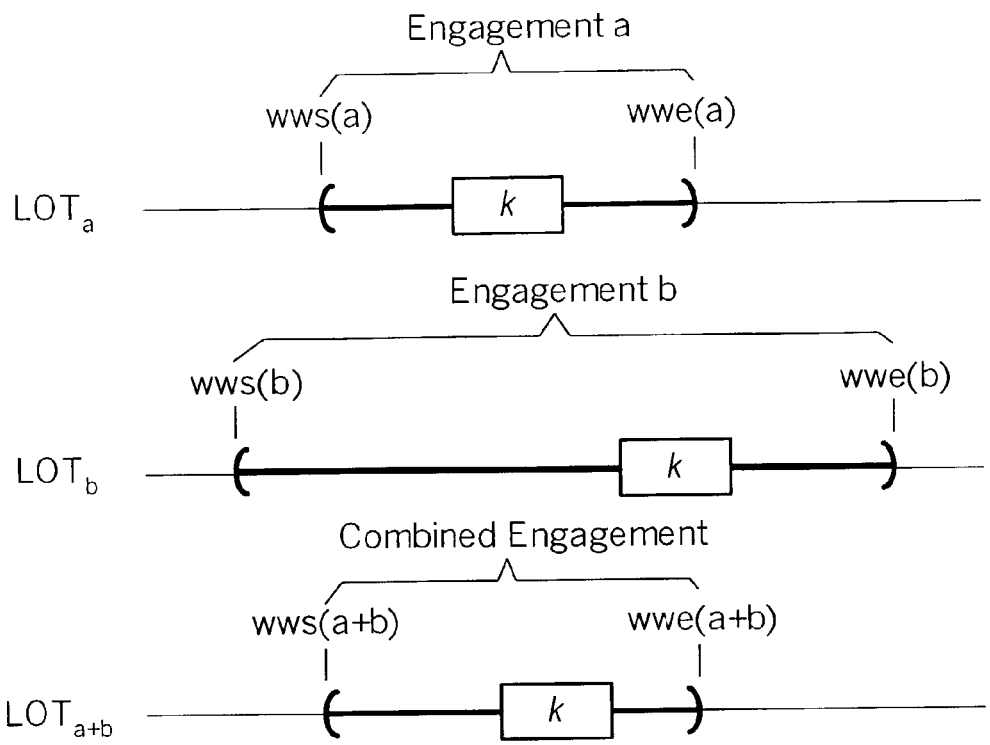
FIG. 22 is a diagram illustrating the combining of engagements in a batching optimization.

The discussion of this operation of the machine scheduling agent 410 begins with batching and setup mergers, and then describes how the next engagement (whether atomic or merged) is selected to run. FIG. 22 illustrates the effects of joining two lots 130 into a single batch. To be eligible for a batching process, the kernels, k, of the lots 130 to be batched are equal in length to one another and to the kernel of the resulting batch. For two lots, a and b, to be batched together without violating either of their working windows, wws(x), wwe(x), there must be enough time between the latest of their start times and the earliest of their end times to complete the kernel. In terms of the notation of FIG. 22, this requirement is:

Min(wwe(a), wwe(b))−Max(wws(a), wws(b))≥k.

The result of joining two lots 130 under this condition is a batch with the following window limits:

wws(a+b)=Max(wws(a), wws(b))
wwe(a+b)=Min(wwe(a), wwe(b))

In some cases, as discussed below, it may be desirable to violate the window limits of a lot 130 in order to make up a batch, and in these cases the limits would not apply.

To grow a batch, the machine scheduling agent 410 selects a batch type to grow, a seed time, to, and a seed engagement whose working window includes to. The machine scheduling agent 410 then adds engagements one by one until the batch is full or there are no more candidate engagements. In an alternative embodiment, a second layer of bidding may be introduced. After lots 130 have successfully bid for access to a resource, they would bid for access to a batch. In the following discussion, the seed technique is discussed. Implementing the seed strategy involves the definition of techniques for selecting the batch type and to, for selecting among alternative candidates for the seed, and for selecting successive engagements to add to the batch.

Two exemplary approaches to selecting the batch type and to include one that looks ahead over a fixed time horizon to look for candidate engagements and a second that sets the horizon dynamically. Both cases take into account the committed capacity for each possible batch type and a normalized process-operation budget (PO_Budget) for that type, which is the PO_Budget divided by the kernel time. In general, types that have higher $cc_{batchType}$ are favored to form larger batches and thus increase process tool utilization. In addition, higher normalized process-operation budgets are also favored to accommodate higher priority lots. If all lots 130 of a given batch type had the same normalized process-operation budget, the revenue of the process tool 115 could be maximized by choosing the batch type that maximizes $PO\_Budget_{batchType} * cc_{batchType}/kernel_{batchType}$. The committed capacity is divided by the kernel width because cc is normalized by time, while the PO_Budget is not. Each lot 130 of a given batch type may have a different PO_Budget, due to differences in priority, so the process tool 115 uses an average PO_Budget over the lots 130 of the specified batch type:

$$BatchPriority_{batchType}(t) = cc_{batchType} \cdot \Sigma(PO\_Budget)/(numLots_{batchType}(t) \cdot kernel_{batchType})$$

where the sum is over lots of the given batch type within whose working windows t falls.

Using the fixed horizon approach, the machine scheduling agent 410 looks ahead over a predefined time horizon and selects the batch type that has the highest BatchPriority within that horizon. The machine scheduling agent 410 then selects $t_0$ as the point in time within the horizon for which BatchPriority(t) is maximum. The time horizon over which the search is conducted reflects the length of time the process tool 115 can be left idle, since on average to can be expected to fall in the center of this time period.

Using the dynamic horizon approach, the machine scheduling agent 410 sets to $t_0$ the time when the resource is expected to be available, and identifies the batch type as the type with the highest BatchPriority($t_0$). The machine scheduling agent 410 then looks ahead over the kernel width of this batch type (plus setup time, if a new setup is required), and selects the batch type with the highest BatchPriority within that period, resetting to $t_0$ the time at which this BatchPriority is maximum.

The seed engagement is selected from those engagements whose working window includes to. Several alternative selection criteria are possible. Exemplary selection criteria are provided in order of priority as implemented in the illustrated embodiment. Of course other selection criteria and different priorities may be used, depending on the particular implementation.

Criterion 1: Select the engagement with the highest normalized budget, since it is the highest priority.

Criterion 2: Select the engagement with the earliest wws, to minimize idle time on the machine.

Criterion 3: Select the engagement with the narrowest working window, since it will be the hardest to accommodate in a later batch.

Criterion 4: Select the engagement with the widest working window, since it will generate the largest set of other engagements that will be eligible to join this batch.

The machine scheduling agent 410 may also make the choice based on a weighted function of an engagement's wws, working window width, and normalized budget.

The machine scheduling agent 410 grows the batch by adding engagements until the batch is full or until there are no more candidate engagements. Engagements are added one by one from those candidates that meet the eligibility requirements outlined above. The criteria for selecting among multiple candidate engagements in the illustrated embodiment are qualitatively similar to those used for selecting the seed. An additional criterion that may be considered is selecting the engagement whose working window overlaps the most with the batch's current working window. This criterion may have a priority between criteria 1 and 2 listed above. However, in some embodiments, the best criterion for growing the batch may not be the same as the best one for initiating it. For example, the seed may be selected based on working window width, but successive additions may be selected based on earliest wws. A weighted combination of criteria, such as normalized lot budget and overlap, may be considered.

In cases where the batch cannot be filled at the time it is created, the machine scheduling agent 410 may elect to delay the processing of the batch so that other engagements may be added. An incomplete batch (lacking N lots) can start at wws (which is designated $t_0$), or wait for up to N lots $L_i$ to become available for inclusion at known times $t_i$, $i=\{1,n\}$. These additional lots 130 may already be scheduled on one of the process tools 115, but their earliest start times (ESTs) are too late to satisfy the eligibility requirements outlined above. In determining whether to wait for additional engagements to fill up the batch, the machine scheduling agent 410:

defines the costs borne by the process tool 115 if it starts the batch at each possible time $t_i$, $i=\{0 \ldots n\}$;

defines the costs borne by the lots (both those in the original batch and $L_i$, $i=\{1 \ldots n\}$ as well as lots 130 not in the original batch whose engagements are delayed) if the batch starts at each time $t_i$, $i=\{0 \ldots n\}$; and starts the batch at the $t_i$ for which the total cost (process tool 115 plus lots) is least.

In determining the cost borne by the process tool 115, the machine scheduling agent 410 may assume that the process tool 115 has a known cost per unit time. This cost can either be considered a constant rate R (assumed hereinafter for the sake of simplicity) or a rate R(t) that varies over time depending on the moment-by-moment utilization of the process tool 115 (i.e., similar to the urgency discount described above). The rate, R, has three potential components.

1. The capital cost, $R_{capital}$, is typically amortized over the expected life of the process tool 115, and is often charged against the lots that use the process tool 115. However, this is a sunk cost that does not vary with load, and thus is not necessary to factor into decisions about allocating lots to process tools 115. Accordingly, it may be excluded from the rate determination.

2. The operating cost, $R_{operating}$, is made up of expenses directly related to the load on the individual process tool 115, and includes consumables, power, and the cost of cycle-dependent PMs. This factor is included in the rate determination.

3. The opportunity cost, $R_{opportunity}$, reflects the cost of making the process tool 115 unavailable to other lots in order to service a given lot, and depends dynamically on the relationships among various process tools 115 in the fab. In general, different opportunity costs may be appropriate for bottlenecks and non-bottlenecks.

If a process tool 115 is a bottleneck, it restricts the flow of the entire process flow 100. Any delay that a lot 130 accumulates waiting for such a process tool 115 is added directly to its overall residency time in the fab, and will delay the delivery of that lot's dollar value at the end of the line. Thus, $R_{opportunity}$ for a bottleneck process tool 115 may be set as the final dollar value of the fab's output per unit time. For example, if the fab produces one lot 130 per hour and each lot has a value of $1M, then the opportunity cost of idling a bottleneck is $1M/hour.

If a process tool 115 is not a bottleneck, idle time on it is free, until it attracts so much work that it becomes the bottleneck, at which point its $R_{opportunity}$ becomes the rate of the bottleneck.

In practice, such a step function between bottlenecks and non-bottlenecks is likely to introduce instabilities to the system. Accordingly, $R_{opportunity}$ is assigned to non-bottleneck process tools 115 based on how close they are to being a bottleneck. A "busyness" estimator, $b_i$, may be computed for each process tool 115, i, in the range [0, 1], as the ratio of some operating parameter on the process tool 115 in question to the comparable parameter on a bottleneck. If the parameter increases with busyness:

$b_i$=parameter(machine$_i$)/parameter(bottleneck).

If it decreases with busyness:

$b_i$=parameter(bottleneck)/parameter(machine$_i$).

Five exemplary parameters that may be used are:
1. Percent idle time (bottleneck/machine$_i$);
2. The percent utilization (machine$_i$/bottleneck);
3. 1-percent idle time (like utilization, but accounts for differences in downtime and PM) (machine$_i$/bottleneck);
4. The ratio between average batch size and full batch size for batching machines (machine$_i$/bottleneck); and
5. The input queue length (machine$_i$/bottleneck).

The opportunity cost is then:

$R_{opportunity}=R_{opportunityBottleneck}*b_i^a$, where a≧1 is a tuning parameter that determines the convexity of the curve relating busyness to rate. For a=1, the rate increases linearly with busyness, while for a>1, the curve is convex, and increasingly so as a increases.

Finally, the overall rate is defined as:

$R=R_{operating}+R_{opportunity}$.

The cost incurred by a process tool 115 in waiting until start time $t_w$ to start a batch scheduled to start at time $t_0$ has two components:
1. The wait cost of staying idle until $t_w$ waiting for later lots to arrive is:

$MW(t_w)=(t_w-t_0)*R$.

2. The run cost of running with an incomplete batch results from the need to run another batch later to accommodate lots that could have been processed in this batch. This cost depends on A (average batch size required from the machine), C (batch size), and $t_b$ (time to run a batch), and is:

$MR(t_w)=[(C(t_0)-C(t_w))*t_b/A]*R$.

Note that C is a function of time. Note also that if $C(t_w)>C(t_0)$, this cost is negative, reflecting the fact that the process tool 115 is ahead.

The total process tool cost is thus:

$M(t_w)=R*[(t_w-t_0)-(t_b/A*(C(t_w)-C(t_0)))]$.

It is worthwhile waiting as long as this value is decreasing, a condition that is satisfied while its first derivative with respect to $t_w$ is less than 0. That is:

$1-C'(t_w)*t_b/A<0$, $C'(t_w)>A/t_b$.

Batch start decisions may cause two kinds of lots to incur waiting costs. If the batch waits, lots already in the batch may be delayed. Once the batch starts, following lots cannot begin until this batch finishes, and hence they may be delayed. In both cases, lateness costs may be computed using the cost of lateness function, $COL(t_a)$, function defined above. This function defines a multiplier to the PO budget if the lot completes at $t_a$. With floating tasks, the end time is not nailed down, but must be no later than LDT. The lateness cost is always relative to a reference time (e.g., $t_w$, relative to $t_0$). Thus, computing the cost of delaying a lot 130 involves:

computing $COL(t_w+k)-COL(t_0+k)$; and multiplying this difference by the process-operation budget (PO_Budget) to get a cost that can be combined with MW and MR. For the purpose of making batching decisions, this budget is adjusted by a configurable factor, COLF, as discussed below:

Cost of delay=$(COL(t_w+k)-COL(t_0+k))$
 $*PO\_Budget*COLF$

Another kind of lot 130 may experience a reduction in waiting costs. Lots 130 whose current start time is $t_i$ and are not currently in the batch because they cannot start at time $t_0$, but can be added to the batch if the start is delayed to $t_w$, can finish earlier if $t_0<t_w<t_i$. For these lots 130, the machine scheduling agent 410 calculates the difference in the cost of lateness function, COL, at the current start time $t_i$ of the lot 130 and the earlier time $t_w$, $COL(t_w+k)-COL(t_i+k)$, and then multiply this result (typically negative) by the PO_Budget and the adjustment factor COLF:

Cost of delay=$(COL(t_w+k)-COL(t_i+k))$
 $*PO\_Budget*COLF$.

Note that the lots 130 that may experience a reduction in waiting costs need not have engagements with the same process tool 115 for which the start or delay decision is contemplated. These lots may have engagements on other process tools 115, but they can be attracted by machine-initiated negotiation.

This computation may be conducted by the lot scheduling agent 405. The machine scheduling agent 410 may provide the lot scheduling agent 405 with two end times, and the lot scheduling agent 405 may reply with the cost to delay from the first end time to the second end time. Now, this mechanism is applied to each class of delayed lot.

Lots currently in the batch incur a wait cost $LW(t_w)$ of staying idle until $t_w$ waiting for later lots to arrive. This cost is equal to the sum of the cost of delay values calculated using the function described above over those lots currently in the batch for which $LDT<t_w+t_b$. The run cost $LR(t_w)$ of starting the batch at $t_w$ (whether complete or incomplete) results from the fact that lots not in the batch now cannot start until the batch completes. To compute this value, all lots $L_j$ not in the batch are identified as the set of lots 130 $L_{late}$ such that $t_w+t_b>LDT_j-t_b$. The effective end time for these lots (and their batches) is thus $t_x=t_w+t_b+k_i$, where $k_i$ is the kernel time for the lot i. Let $t_i$ be the batch start time for $L_i$ before being delayed (which may have been later than $t_0+t_b$). The cost is thus:

$$LR(t_w)=\Sigma(COL(t_x)-COL(t_i+k_i)) \cdot PO\_Budget*COLF$$
over the lots, $L_{late}$.

The budget by which the lateness factor is multiplied may be different for batching decisions than for lot bid evaluation. In lot bid evaluation, the market mechanisms are making a trade-off against other decisions involving this same lot. The cost of the trade-offs is borne by the lot's PO_Budget, which is thus naturally comparable to other factors of the decision. In making decisions about delaying a batch, the trade-offs involve other lots and resources, not just one lot, and the cost is borne by the entire fab. As a result, the "Budget" figure in the previous paragraphs (the batching budget) is adjusted by a configurable factor COLF.

The waiting cost values may be used to determine whether to wait and how long to wait before starting the batch. For each $t_i$, $i=\{0 \ldots n\}$, the cost, $Cost(t_i)=MW(t_i)+MR(t_i)+LW(t_i)+LR(t_i)$, is determined and the start time, $t_i$, for which this cost is minimum is selected. Note that the best solution may be to start the partial batch at the currently scheduled start time, $t_0$, rather than waiting.

This estimate of the cost of waiting considers only the effect of the delay on the batch immediately after the batch we are currently forming. On a heavily loaded resource, delaying that latter batch may in turn delay subsequent batches, leading to a ripple effect. This ripple effect varies with the distance into the future over which the process tool 115 is committed to specific lots. The ripple effect increases in severity if the time to execute a batch $t_b$ is short in comparison with the time window over which lots look ahead to schedule, but relatively insignificant if $t_b$ is long in comparison with look-ahead times.

The machine scheduling agent 410 may also construct setup chains for batching or non-batching process tools 115. A setup chain is a group of engagements with the same setup requirements processed sequentially. In the case of batching process tools 115, batches should be formed first, as outlined in the previous section. Then, these batches may be treated as individual lots for the purposes of setup optimization. One method for constructing setup chains is real-time clustering. When the currently executing engagement is almost finished, the process tool 115 looks for another lot 130 of the same setup type. If a lot 130 of the same setup type is available, the machine scheduling agent 410 selects it for subsequent execution. This simple approach does not permit balancing setup costs against other costs.

Figure 23:
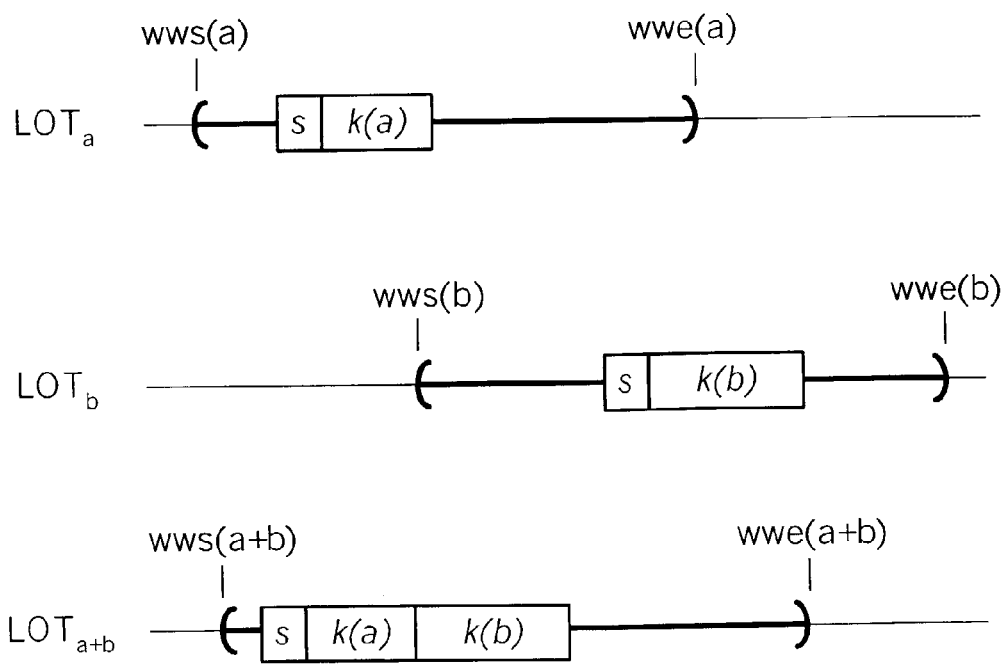
FIG. 23 is a diagram illustrating the combining of engagements in a setup chain optimization.

FIG. 23 illustrates the effects of combining two lots with a common setup. The kernel, $k(x)$, of each independent lot 130 does not contain a setup, s, since only one setup is needed for multiple lots of the same type in sequence, and only the machine scheduling agent 410 can determine which lots can be thus sequenced. As shown in FIG. 23, the machine scheduling agent 410 combines sequential lots of the same type into a single chain whose kernel is the sum of one setup and two processing times. Let $t_{setup}$ be the time required for setup, and k be the processing time. The available time between wws of the earlier lot 130 and wwe of the later lot 130 must be enough to contain this combined kernel:

$$wwe(b)-wws(a)>t_{setup}+k(a)+k(b) \qquad \text{Requirement 1.}$$

To avoid idle time on the process tool 115, the setup and processing intervals should follow one another without interruption. In some cases, a gap, $MaxGap<t_{setup}$, may be permissible. This condition requires that the two working windows overlap:

$$wwe(a)+MaxGap>wws(b) \qquad \text{Requirement 2.}$$

It also restricts the start and end times of the new working window for the combined lots:

$$wws(a+b) \geq wws(b)-(t_{setup}+k(a))-MaxGap \qquad \text{Requirement 3.}$$

$$wwe(a+b) \leq wwe(a)+k(b)+MaxGap \qquad \text{Requirement 4.}$$

For reasons of scheduling flexibility, it is desirable to make the windows as wide as possible. In this case, the new window limits are defined by replacing the inequalities in Requirements 3 and 4 with equalities.

Under these restrictions, the new working window has a width of:

$$wwe(a+b)-wws(a+b) \leq wwe(a)+k(b)-wws(b)+t_{setup}+k(a)+2*MaxGap.$$

The machine scheduling agent 410 may grow setup chains by selecting a seed lot 130 and repeatedly adding one or more new lots with the same setup type. The machine scheduling agent 410 terminates the process when either of two conditions is satisfied:
1. There is no eligible engagement whose addition would reduce the net cost; or
2. Further extension of the setup chain would cause a lot 130 with a different setup type to be late.

As with batching, an alternative approach would be to let lots 130 bid for access to a setup chain. While more flexible, this approach also increases complexity.

To grow a setup chain the machine scheduling agent 410 implements criteria for selecting the seed and subsequent lots. The following discussion outlines several possible heuristics for growing the setup chain. Exemplary heuristics include:
- choosing the lot 130 with the highest normalized budget (PO_Budget/kernel), since that is the one least likely to be bumped;
- choosing the lot 130 with the earliest wws;
- choosing the lot 130 with the earliest wwe, which is the most likely to be made late (however, addition of this lot shrinks the window for the resulting chain to end at wwe, making it more difficult to find another lot 130 to include in the chain. This heuristic is useful if there are many overlapping engagements from which to choose at the next step); or
- choosing the lot 130 with the largest kernel, thus extending the window of opportunity for later engagements to join (This heuristic is useful if subsequent engagements are sparse).

If the relatively simple heuristic of choosing the lot 130 with the earliest wws is not chosen, the machine scheduling agent 410 may construct a setup chain where wws(new)<wws (old), which might result in the need to shuffle kernels after the initial setup. However, the earliest lot 130 might have a window that is too narrow to reach later lots and enable them to join the chain.

Choosing one general rule for making setup chain decisions typically will not address the varying situations expected. The most effective rule depends on factors, such as the empirical state of the schedule of engagements for the process tool 115 or the current priorities of the fab and/or the process tool 115, and may be determined experimentally. As with batching optimization, the heuristic that proves most useful for selecting the initial seed may not be the same heuristic chosen for selecting subsequent additions to the setup chain.

In summary, the technique for growing a setup chain includes the following steps, which are illustrated using a pseudo-code representation:

Select the seed and add the setup time to its kernel (the resulting engagement is called a "chain")
Loop 1: Repeat
Select new candidate engagement to merge. Two cases are possible:
Case 1: Add at end of existing chain if:
[wws(new)≦wws(chain)+k(chain)+maxGap] & [wwe(new)>wwe(chain)+k(new)].
Case 2: Add at beginning of existing chain if:
[$t_0$≦wws(new)≦wws(chain)−k(new)] & [wwe(new)≧wws(chain)−maxGap]
If no such engagement exists for Case 1 or Case 2, then exit Loop 1.
If Cost(chain+new)<Cost(chain)+Cost(new)+Cost(setup) (heuristic: if chains are formed at the last minute before execution, replace this condition with True, since there is no longer any need for cost competition among engagements for the same period of process tool 115 availability)
If adding this lot 130 would cause an engagement of different type to be late, exit Loop 1.
Add this lot 130 to the chain of the previous lots;
Adjust wws, wwe, and k to account for addition. The adjustment depends on the case to which the new engagement belongs.
Case 1:
wws(next)=wws(new)−k(chain);
wwe(next)=wwe(chain)+k(new);
k(next)=k(chain)+k(new)
Case 2:
wws(next)=wws(chain)−k(new);
wwe(next)=wwe(chain);
k(next)=k(chain)+k(new)
Rename "next" to "chain"
If any engagements of Case 2 have been added, sort kernels in the chain in order of their original wws times.

The technique outlined above terminates if adding the next lot 130 would cause a lot 130 of a different setup type to be late. However, if a setup is particularly costly, it may cost less to make another lot 130 late than to interrupt the setup chain.

Consider the case where a chain of type a is being run. The cost of the setup, Cost($setup_a$), is known. Another lot 130 of type a could be added, but doing so would make a lot 130 of a different type late. The cost of such a trade-off can be computed using mechanisms similar to those described above for batching decisions. The cost of lateness function, COL($t_a$) defined above may be used. This function defines a multiplier to the PO_budget if the lot ends at $t_a$. For a floating task, the end time is not nailed down, but must be no later than LDT. Lateness cost is always relative to a reference time (e.g., $t_w$ relative to $t_0$). Thus, to compute the cost of delaying a lot from end time to $t_0$ end time $t_w$:

compute COL($t_w$)−COL($t_0$); and
multiply this difference by the process-operation budget, PO_Budget, to get a cost that can be compared with Cost($setup_a$). (As with batching decisions, this budget may be adjusted by a configurable factor.)

Again, this computation may be performed by the lot scheduling agent 405. The machine scheduling agent 410 may provide the lot scheduling agent 405 with two end times, and the lot scheduling agent 405 may reply with the cost to delay from the first time to the second time.

The discussion now turns to the matter of selecting the next engagement to run. At some point, the machine scheduling agent 410 has a collection of engagements available for execution. These may be atomic engagements from single lots or merged engagements (either batches or setup chains). The machine scheduling agent 410 selects the next engagement to run from the set of scheduled engagements with working window start times prior to or at the time the process tool 115 is expected to become available. If no engagements start this early, the eligible set consists of the engagement(s) with the earliest wws. Exemplary heuristics for selecting the next engagement to execute are provided below.

1. For each candidate engagement, determine the cost of moving it to the position where it would execute next. When an engagement executes, the working window is narrowed to the kernel and any engagements whose working windows overlap with the resulting kernel-size working window must also be moved. Such a cost calculation may include the cost of moving other engagements out of the execution window.
2. Choose the engagement with the maximum pWind. Such an engagement has the least flexibility.
3. Choose the engagement with the highest normalized budget, i.e., budget per unit of kernel time, since budget is correlated with priority.

Of course, different heuristics or combinations thereof may also be used in alternative embodiments.

The above discussions have focused on one particular type of consumer agent 305, the lot scheduling agent 405, and the lot processing engagements it schedules. However, as previously mentioned, other types of consumer agents 305 may be appropriate if there are additional activities that need to be scheduled on the process tool 115. Another exemplary consumer agent 305 is a PM/Qual scheduling agent 490 (shown in FIG. 4) that is responsible for scheduling the preventive maintenance procedures that need to be performed periodically on the process tool 115. The PM/Qual scheduling agent 490 schedules PMs and Quals (qualification procedures). A Qual is a test to ensure that the process tool 115 is performing properly. A PM is a procedure to overhaul and/or replace parts of the process tool 115 so that it will continue to perform properly.

These preventive maintenance procedures, PMs and Quals, must be performed periodically, with a frequency that may be based on elapsed time, wafers/lots/batches processed, processing time, event occurrences, degradation of a measurable parameter or other criteria. Although the PMs and Quals generally need to occur at the specified frequency, it is typical to allow some flexibility in the scheduling. One method of specifying this flexibility is to define a Window Start Offset and a Window End Offset. For example, a 30-day PM that takes 12 hours to perform is scheduled at a frequency of 30 days, and has the flexibility to be performed up to 2 days early and as much as 3 days late. For this 30-day PM the frequency is 30 days, the Window Start Offset is 2 days and the Window End Offset is 3 days. The 30-day PM can therefore be scheduled during any contiguous 12-hour period beginning as early as 28 days after the last 30-day PM or ending as late as 33 days after the last 30-day PM on the same machine.

Therefore when the PM/Qual scheduling agent 490 requests a bid from the machine scheduling agent 410 to schedule the 30-day PM, it specifies a commitment window bounded by an earliest start time (EST) and a latest delivery time (LDT) that are calculated using the frequency, window start offset, window end offset and date of the last occurrence of the 30-day PM as shown below. Note that the EST and LDT may be adjusted to reflect the current time and the kernel, k (duration of the PM/Qual).

$EST$=Max(last occurrence+frequency−window start offset, current time)

$LDT$=Max(last occurrence+frequency+window end offset, current time+$k$)

Each PM/Qual also has a budget for purchasing time from the machine to perform the preventive maintenance procedure. The PM/Qual scheduling agent 490 has a PM budget calculator that can be called by the scheduling agents to calculate the budget for a specific PM/Qual at a particular completion time. The PM budget calculator employs a function that considers the time required to perform the PM (duration) as well as the percentage of the commitment window that has transpired by the completion time (window percentage). To achieve effective scheduling, the PM budget provides more funds for a PM/Qual with a longer duration and the budget for a specific PM/Qual also increases as the window percentage increases. In other embodiments, the PM budget may also consider other factors.

When sending a bid request to the machine scheduling agent 410, the PM/Qual scheduling agent 490 provides the following information:
EST
LDT
Identity of the PM/Qual requesting the bid
PM Budget Calculator The bid returned to the PM/Qual scheduling agent 490 by the machine scheduling agent 410 is similar to the bid returned to the lot scheduling agent 405, with some simplification: there is no potential for batching or setup optimization, since a PM/Qual cannot be "batched" with any other activity scheduled on the machine and a PM/Qual has no "setup". So the bid from the machine scheduling agent 410 contains:
BCF=Basic Cost Function for the time window [EST, LDT]
$ccSameSetup_{avg}$=0
$RTU_{ccDiff}$=Rate per unit time function based on committed capacity, with
ccDiffSetup fixed at $cc_{avg}$, the average committed capacity of all engagements within the time window [EST, LDT] (in this case all engagements are not the same type)
FDF=Flexibility discount function The PM/Qual scheduling agent 490 uses the same algorithm as the lot scheduling agent 405 to generate a collection of candidate bids by sampling the BCF for commitment windows with varying sizes, start times and end times. The PM/Qual scheduling agent 490 also calculates the cost of each candidate bid, again using the same algorithm as the lot scheduling agent 405, with the batching factors eliminated ($ccSameBatch_{avg}$=0).

The PM/Qual scheduling agent 490 then evaluates the candidate bids based on its objective function, which considers the cost of the bid as well as the end (completion) time. The PM/Qual scheduling agent 490 chooses the bid that minimizes the value of the objective function. In one embodiment, the PM/Qual scheduling agent 490 selects the earliest affordable bid, i.e. the earliest bid that can be afforded with its applicable budget for the bid end time.

The PM/Qual scheduling agent 490 then asks the machine scheduling agent 410 to confirm the selected bid. Using the same algorithm as it does when confirming a bid for a lot scheduling agent 405, the machine scheduling agent 410 recalculates the cost of the selected bid based on the current schedule of engagements for the process tool 115. If the cost does not exceed a configurable percentage of the original cost, the bid is confirmed, otherwise it is denied. If the PM/Qual scheduling agent 490 receives a denial, it uses the same algorithm as the lot scheduling agent 405 to determine whether it should attempt to confirm the next best bid or begin over again by requesting new bids with a wider commitment window. A rebid may be initiated due to the remaining bids falling below a configurable RebidThreshold or if the value of the objective function degrades more than a configurable percentage of the value corresponding to the best bid. If a rebid is initiated, the commitment window is widened by increasing the LDT. In one embodiment, the LDT is increased by a configurable percentage of the kernel, k.

As a result of confirming bids for PMs and/or Quals, the schedule of engagements for the process tool 115 may contain engagements for PMs and Quals as well as lots. When calculating committed capacity and costs for lot bids, the engagements corresponding to PMs or Quals are consider a different "type" than any lot bid, and therefore are included in the committed capacity for lots with different setups and/or different batch criteria. When calculating committed capacity and costs for PM/Qual bids, each PM or Qual engagement is considered a different "type" than any other PM, Qual or lot engagement, and therefore every scheduled engagement for the process tool 115 is included in the committed capacity for different setups and/or different batch criteria.

One other type of engagement that can occur in the scheduled engagements for a process tool 115 is a downtime engagement. A downtime engagement is not scheduled in advance; it is scheduled by the machine scheduling agent 410 when the process tool 115 experiences the onset of unscheduled downtime. Unscheduled downtime consumes 100% of the capacity of the process tool 115 and prevents any other activities from occurring until the process tool is repaired. When the machine scheduling agent 410 detects the onset of unscheduled downtime, it schedules a downtime engagement starting at the current time. The kernel time of the downtime engagement is set to the mean-time-to-repair (MTTR) and the commitment window [EST, LDT] is set to the kernel. If there are any other engagements scheduled in this region, a region of violation (ROV) will be created and the machine scheduling agent 410 will use the techniques described earlier to shift, shrink or cancel other engagements in order to resolve the ROV.

Note that some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (e.g., electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. Examples of program storage media, without limitation, are magnetic (e.g., a floppy disk or a hard drive), optical (e.g., a compact disk read only memory, or CD ROM), electrostatic/capacitive, tunneling electro microscope, or some other form, and may be read only, read/write, random access, serial access, etc. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system comprising:
a resource for processing a workpiece; and
at least one scheduling agent configured to provide a plurality of cost function parameters and access a library of parameterized cost function components based on the plurality of cost function parameters to generate a cost function for processing the workpiece using the resource at least one of the cost function parameters defining a shape of the cost function, wherein the scheduling agent is further configured to provide a plurality of sets of cost function parameters, access the library of parameterized cost function components based on the sets of function parameters to generate a plurality of cost function sub-components, sum the plurality of cost function sub-components to generate a composite cost function, and normalize the composite cost function to generate values for the composite cost function within a predetermined range.

2. The system of claim 1, wherein the scheduling agent is further configured to provide at least one of a desired minimum value and a desired maximum value as cost function parameters.

3. The system of claim 2, wherein the scheduling agent is further configured to specify a variable range associated with one of the desired maximum value and the desired minimum value as one of the cost function parameters.

4. The system of claim 2, wherein the scheduling agent is further configured to normalize the sum of the cost function sub-components based on the desired maximum value and the desired minimum value.

5. The system of claim 2, wherein the scheduling agent is further configured to determine a maximum value for the sum of the cost function sub-components, determine a minimum value for the sum of the cost function sub-components, and normalize the sum of the cost function sub-components based on the determined maximum and minimum values and the desired maximum and minimum values.

6. The system of claim 1, wherein the scheduling agent is further configured to determine a fixed value of one of the cost function sub-components and sum the fixed value with the remaining cost function sub-components to generate the composite cost function.

7. A system, comprising:
a resource for processing a workpiece; and
at least one scheduling agent configured to provide a plurality of cost function parameters and access a library of parameterized cost function components based on the plurality of cost function parameters to generate a cost function for processing the workpiece using the resource, at least one of the cost function parameters defining a shape of the cost function, wherein the scheduling agent is further configured to generate a flexibility discount function based on the cost function.

8. The system of claim 7, wherein the scheduling agent is further configured to specify an increasing convex function type as one of the cost function parameters.

9. The system of claim 7, wherein the scheduling agent is further configured to provide a commitment window associated with the processing of the workpiece using the resource, provide a kernel representing a period of time required to process the workpiece using the resource, calculate a flexibility factor based on the commitment window and the kernel, and provide the flexibility factor as one of the plurality of cost function parameters.

10. A system, comprising:
a resource for processing a workpiece; and
at least one scheduling agent configured to provide a plurality of cost function parameters and access a library of parameterized cost function components based on the plurality of cost function parameters to generate a cost function for processing the workpiece using the resource, at least one of the cost function parameters defining a shape of the cost function, wherein the scheduling agent is further configured to generate an urgency discount function based on the cost function.

11. The system of claim 10, wherein the scheduling agent is further configured to specify an increasing concave function type as the cost function parameters.

12. The system of claim 10, wherein the plurality of cost function parameters comprises a first plurality of cost function parameters, the cost function comprises a first cost function, and the scheduling agent is further configured to determine a committed capacity of the resource as a function of time and provide the committed capacity as one of the first plurality of cost function parameters.

13. The system of claim 12, wherein the scheduling agent is further configured to provide a second plurality of cost function parameters, one of the second plurality of cost function parameters comprising a time variable, access the library of parameterized cost function components functions based on the second plurality of cost function parameters to generate a second cost function, and sum the first and second cost functions to generate the urgency discount function.

14. The system of claim 13, wherein the scheduling agent is further configured to select a minimum of 1 and the sum of the first and second cost functions to generate the urgency discount function.

15. The system of claim 13, wherein the scheduling agent is further configured to provide a y-intercept value for each of the first and second pluralities of cost function parameters, the sum of the y-intercept values for the first and second pluralities of cost function parameters specifying a maximum urgency discount value.

16. The system of claim 13, wherein the scheduling agent is further configured to provide a steepness value for each of the first and second pluralities of cost function parameters, the steepness value for the first plurality of cost function parameters being greater than the steepness value for the second plurality of cost function parameters.

* * * * *